(12) United States Patent
Yu et al.

(10) Patent No.: US 11,689,652 B2
(45) Date of Patent: Jun. 27, 2023

(54) HANDS-FREE APPARATUS, DATA TRANSFER METHOD, AND COMPUTER-READABLE MEDIUM

(71) Applicant: Panasonic Intellectual Property Management Co., Ltd., Osaka (JP)

(72) Inventors: Chuntao Yu, Toyko To (JP); Yusuke Saito, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 17/466,385

(22) Filed: Sep. 3, 2021

(65) Prior Publication Data
US 2022/0103674 A1   Mar. 31, 2022

(30) Foreign Application Priority Data
Sep. 25, 2020 (JP) ................. 2020-161426

(51) Int. Cl.
| | |
|---|---|
| *H04M 1/60* | (2006.01) |
| *H04M 1/72403* | (2021.01) |
| *H04W 8/14* | (2009.01) |
| *H04M 1/57* | (2006.01) |

(52) U.S. Cl.
CPC ........... *H04M 1/6091* (2013.01); *H04M 1/57* (2013.01); *H04M 1/72403* (2021.01); *H04W 8/14* (2013.01); *H04M 2250/02* (2013.01)

(58) Field of Classification Search
CPC .. H04M 1/6091; H04M 1/57; H04M 1/72403; H04M 2250/02; H04M 1/72442; H04M 2250/06; H04M 2250/60; H04M 1/2757; H04W 8/14
See application file for complete search history.

(56) References Cited

U.S. PATENT DOCUMENTS

| | | | |
|---|---|---|---|
| 2010/0070637 A1* | 3/2010 | Saito ................... | H04M 1/6066 709/228 |
| 2010/0197362 A1* | 8/2010 | Saitoh ................. | H04M 1/2757 455/569.2 |

(Continued)

FOREIGN PATENT DOCUMENTS

JP     2002-193046     7/2002

*Primary Examiner* — Yuwen Pan
*Assistant Examiner* — Angelica Perez
(74) *Attorney, Agent, or Firm* — Greenblum & Bernstein, P.L.C.

(57) ABSTRACT

A hands-free apparatus includes a memory, and a hardware processor coupled to the memory. The hardware processor is configured to: perform a hands-free connection process of connecting to a mobile phone by using a hands-free communication protocol for performing a hands-free phone conversation; perform a first data transfer process of making a first connection with the mobile phone by using a data transfer protocol for transferring phone data related to phone, and causing the phone data to be automatically or manually transferred from the mobile phone; and depending on a status of a different data transfer process than the first data transfer process, perform transfer control related to transfer by at least one of the first data transfer process and the different data transfer process.

15 Claims, 29 Drawing Sheets

(56) References Cited

U.S. PATENT DOCUMENTS

| | | | | |
|---|---|---|---|---|
| 2012/0207032 A1* | 8/2012 | Chen | .................... | H04W 16/14 |
| | | | | 370/252 |
| 2014/0359139 A1* | 12/2014 | Efrati | ................... | H04L 65/401 |
| | | | | 709/227 |
| 2018/0014220 A1* | 1/2018 | Yabata | ................. | H04W 28/10 |

* cited by examiner

FIG.6A

| OUTGOING CALL HISTORY DATA | | |
|---|---|---|
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |
| JIRO NOMURA | 090×××××××× | AUGUST 10 10:15 |

FIG.6B

| PHONE BOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.6C

| SPECIFIC DATA | |
|---|---|
| JIRO YAMADA | 090×××××××× |
| HANAKO SAITO | 090×××××××× |
| ICHIRO TANAKA | 090×××××××× |
| SHIRO MORI | 090×××××××× |
| JIRO NOMURA | 090×××××××× |

FIG.6D

| OUTGOING CALL HISTORY DATA | PHONE BOOK DATA | INCOMING CALL HISTORY DATA | MISSED CALL HISTORY DATA | SPECIFIC DATA |
|---|---|---|---|---|
| ICHIRO KATO | 090×××××××× | | AUGUST 10 13:40 | |
| TARO ABE | 090×××××××× | | AUGUST 10 12:15 | |
| HANAKO SATO | 090×××××××× | | AUGUST 10 12:00 | |
| TARO ABE | 090×××××××× | | AUGUST 10 11:20 | |
| KAZUO TANAKA | 090×××××××× | | AUGUST 10 11:10 | |
| KAZUO TANAKA | 090×××××××× | | AUGUST 10 10:50 | |

← DISPLAY REGISTERED NAMES IN PHONE BOOK DATA

FIG.6E

| OUTGOING CALL HISTORY DATA | PHONE BOOK DATA | INCOMING CALL HISTORY DATA | MISSED CALL HISTORY DATA | SPECIFIC DATA |
|---|---|---|---|---|
| ★ | JIRO YAMADA | | 090×××××××× | |
| ★ | HANAKO SAITO | | 090×××××××× | |
| ★ | ICHIRO TANAKA | | 090×××××××× | |
| ★ | SHIRO MORI | | 090×××××××× | |
| ★ | JIRO NOMURA | | 090×××××××× | |

FIG.7A

| INCOMING CALL HISTORY DATA | | |
|---|---|---|
| ICHIRO KATO | 090××××××× | AUGUST 10 13:00 |
| AIKO HAYASHI | 090××××××× | AUGUST 10 12:25 |
| ROKURO MORI | 090××××××× | AUGUST 10 11:45 |
| ICHIRO KATO | 090××××××× | AUGUST 10 11:15 |
| SHICHIRO YAMADA | 090××××××× | AUGUST 10 11:10 |
| HACHIRO UEDA | 090××××××× | AUGUST 10 10:20 |

FIG.7B

| OUTGOING CALL HISTORY DATA | PHONE BOOK DATA | INCOMING CALL HISTORY DATA | MISSED CALL HISTORY DATA | SPECIFIC DATA |
|---|---|---|---|---|
| ICHIRO YOSHIMOTO | 090××××××× | | AUGUST 10 13:25 | |
| ICHIRO KATO | 090××××××× | | AUGUST 10 13:00 | |
| AIKO HAYASHI | 090××××××× | | AUGUST 10 12:25 | |
| ROKURO MORI | 090××××××× | | AUGUST 10 11:45 | |
| ICHIRO KATO | 090××××××× | | AUGUST 10 11:15 | |
| SHICHIRO YAMADA | 090××××××× | | AUGUST 10 11:10 | |

← DISPLAY REGISTERED NAMES IN PHONE BOOK DATA

FIG.8A

| MISSED CALL HISTORY DATA | | |
|---|---|---|
| TARO MURAKAMI | 090××××××× | AUGUST 10 12:28 |
| HANAKO SAITO | 090××××××× | AUGUST 10 12:24 |
| HANAKO UEDA | 090××××××× | AUGUST 10 12:06 |
| JIRO OBAYASHI | 090××××××× | AUGUST 10 11:04 |
| HANAKO SAITO | 090××××××× | AUGUST 10 10:54 |
| KAZUO OMURA | 090××××××× | AUGUST 10 10:24 |

FIG.8B

| OUTGOING CALL HISTORY DATA | PHONE BOOK DATA | INCOMING CALL HISTORY DATA | MISSED CALL HISTORY DATA | SPECIFIC DATA |
|---|---|---|---|---|
| SABURO WATANABE | | 090××××××× | AUGUST 10 12:46 | |
| TARO MURAKAMI | | 090××××××× | AUGUST 10 12:28 | |
| HANAKO SAITO | | 090××××××× | AUGUST 10 12:24 | |
| HANAKO UEDA | | 090××××××× | AUGUST 10 12:06 | |
| JIRO OBAYASHI | | 090××××××× | AUGUST 10 11:04 | |
| HANAKO SAITO | | 090××××××× | AUGUST 10 10:54 | |

← DISPLAY REGISTERED NAMES IN PHONE BOOK DATA

FIG.9

| OUTGOING CALL HISTORY DATA | | |
|---|---|---|
| TARO ABE | 090xxxxxxxx | AUGUST 10 12:15 |
| HANAKO SATO | 090xxxxxxxx | AUGUST 10 12:00 |
| TARO ABE | 090xxxxxxxx | AUGUST 10 11:20 |
| KAZUO TANAKA | 090xxxxxxxx | AUGUST 10 11:10 |
| KAZUO TANAKA | 090xxxxxxxx | AUGUST 10 10:50 |
| JIRO NOMURA | 090xxxxxxxx | AUGUST 10 10:15 |

| INCOMING CALL HISTORY DATA | | |
|---|---|---|
| ICHIRO KATO | 090xxxxxxxx | AUGUST 10 13:00 |
| AIKO HAYASHI | 090xxxxxxxx | AUGUST 10 12:25 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |
| HACHIRO UEDA | 090xxxxxxxx | AUGUST 10 10:20 |

| MISSED CALL HISTORY DATA | | |
|---|---|---|
| TARO MURAKAMI | 090xxxxxxxx | AUGUST 10 12:28 |
| HANAKO SAITO | 090xxxxxxxx | AUGUST 10 12:24 |
| HANAKO UEDA | 090xxxxxxxx | AUGUST 10 12:06 |
| JIRO OBAYASHI | 090xxxxxxxx | AUGUST 10 11:04 |
| HANAKO SAITO | 090xxxxxxxx | AUGUST 10 10:54 |
| KAZUO OMURA | 090xxxxxxxx | AUGUST 10 10:24 |

| ALL HISTORY DATA | | |
|---|---|---|
| ICHIRO KATO | 090xxxxxxxx | AUGUST 10 13:00 |
| TARO MURAKAMI | 090xxxxxxxx | AUGUST 10 12:28 |
| AIKO HAYASHI | 090xxxxxxxx | AUGUST 10 12:25 |
| HANAKO SAITO | 090xxxxxxxx | AUGUST 10 12:24 |
| TARO ABE | 090xxxxxxxx | AUGUST 10 12:15 |
| HANAKO UEDA | 090xxxxxxxx | AUGUST 10 12:06 |
| HANAKO SATO | 090xxxxxxxx | AUGUST 10 12:00 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |

DO NOT DISPLAY OUTGOING CALL HISTORY DATA WITH DUPLICATED PHONE NUMBER

FIG.14A

| OUTGOING CALL PHONE NUMBER | OUTGOING CALL DATE AND TIME |
|---|---|
| 09000000005 | MAY 10 17:25 |
| 09000000004 | MAY 10 17:14 |
| 09000000003 | MAY 10 17:12 |
| 09000000002 | MAY 10 17:08 |
| 09000000001 | MAY 10 17:01 |

} OUTGOING CALL HISTORY DATA AUTOMATICALLY TRANSFERRED FROM MOBILE PHONE

FIG.14B

| OUTGOING CALL PHONE NUMBER | OUTGOING CALL DATE AND TIME |
|---|---|
| 09000000100 | MAY 10 17:32 |
| 09000000005 | MAY 10 17:25 |
| 09000000004 | MAY 10 17:14 |
| 09000000003 | MAY 10 17:12 |
| 09000000002 | MAY 10 17:08 |

OUTGOING CALL HISTORY DATA OF HANDS-FREE APPARATUS

OUTGOING CALL HISTORY DATA AUTOMATICALLY TRANSFERRED FROM MOBILE PHONE

FIG.15A

| INCOMING CALL<br>PHONE NUMBER | INCOMING CALL<br>DATE AND TIME |
|---|---|
| 09000000010 | MAY 10 17:45 |
| 09000000009 | MAY 10 17:20 |
| 09000000008 | MAY 10 16:59 |
| 09000000007 | MAY 10 16:52 |
| 09000000006 | MAY 10 16:50 |

} INCOMING CALL HISTORY DATA AUTOMATICALLY TRANSFERRED FROM MOBILE PHONE

FIG.15B

| INCOMING CALL<br>PHONE NUMBER | INCOMING CALL<br>DATE AND TIME |
|---|---|
| 09000000200 | MAY 10 17:50 |
| 09000000010 | MAY 10 17:45 |
| 09000000009 | MAY 10 17:20 |
| 09000000008 | MAY 10 16:59 |
| 09000000007 | MAY 10 16:52 |

} INCOMING CALL HISTORY DATA OF HANDS-FREE APPARATUS

} INCOMING CALL HISTORY DATA AUTOMATICALLY TRANSFERRED FROM MOBILE PHONE

PRESS "HISTORY BUTTON"
PRESS "OUTGOING CALL HISTORY BUTTON"

PRESS "HISTORY BUTTON"
PRESS "INCOMING CALL HISTORY BUTTON"

PRESS "PHONE BOOK"

FIG.19

| PHONE NUMBER | REGISTERED NAME |
|---|---|
| 09000000001 | KAZUO TANAKA |
| 09000000002 | TARO ITO |
| 09000000005 | TARO ABE |
| 09000000006 | SHIRO MORI |
| 09000000007 | GORO KODAMA |
| 09000000009 | HANAKO SAITO |
| ⋮ | ⋮ |

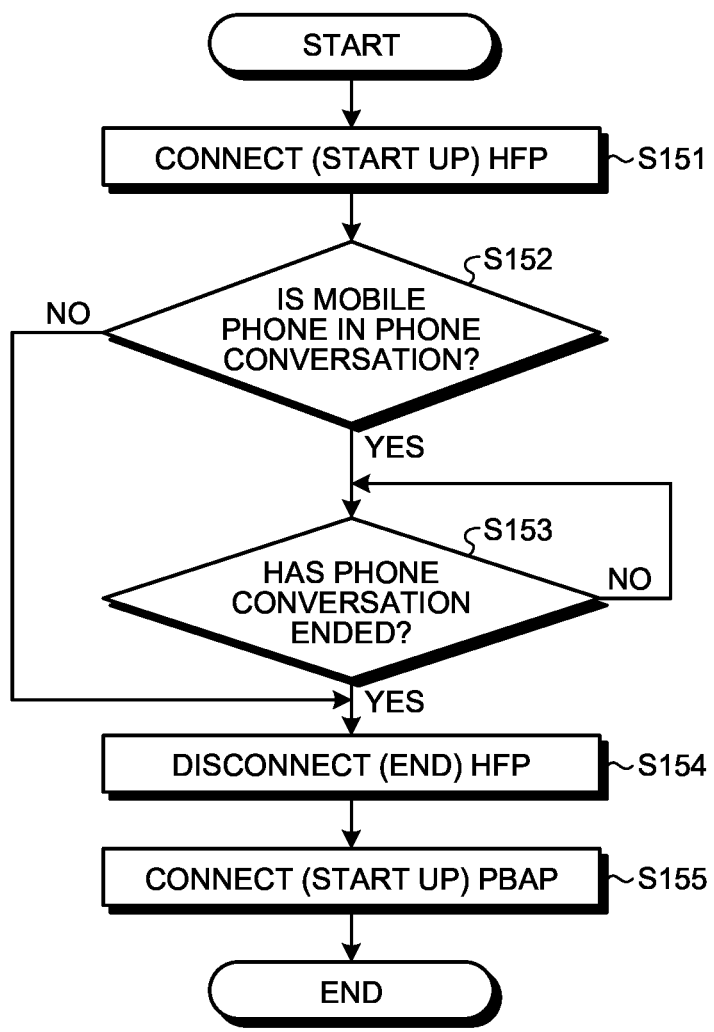

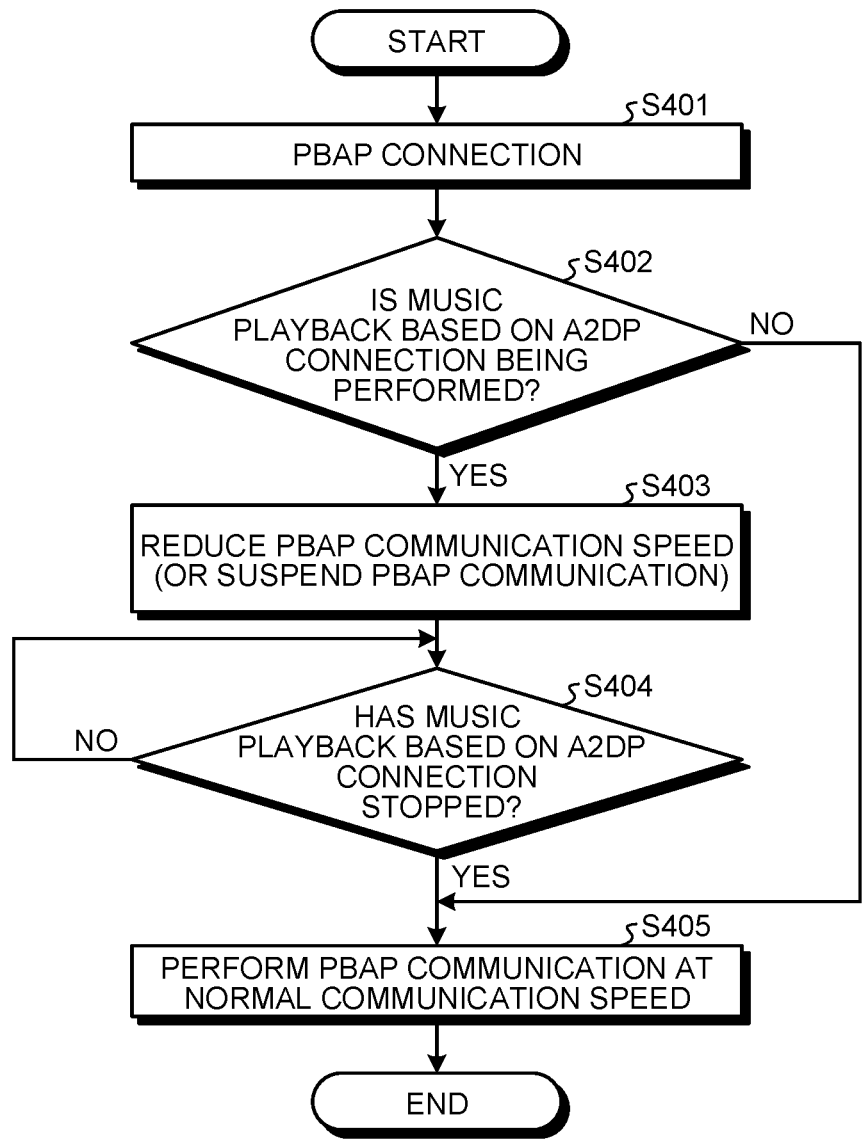

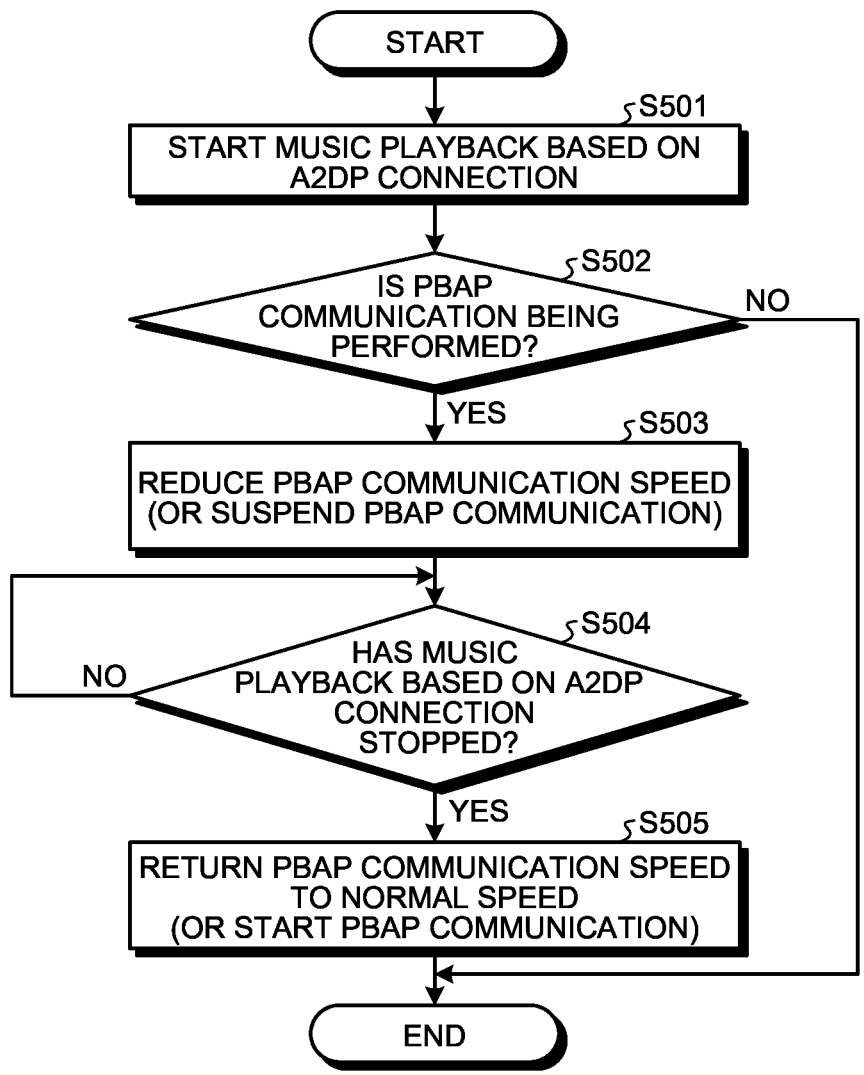

HANDS-FREE APPARATUS, DATA TRANSFER METHOD, AND COMPUTER-READABLE MEDIUM

CROSS-REFERENCE TO RELATED APPLICATIONS

This application is based upon and claims the benefit of priority from Japanese Patent Application No. 2020-161426, filed on Sep. 25, 2020, the entire contents of which are incorporated herein by reference.

FIELD

Embodiments described herein relate generally to a hands-free apparatus, a data transfer method, and a computer-readable medium.

BACKGROUND

There has been known a configuration in which phone data such as phone book data and outgoing/incoming call history data is automatically transferred from a mobile phone to a hands-free apparatus by communication using a wireless data transfer protocol such as a Bluetooth phone book access profile (PBAP). For example, there has been disclosed a technology in which a wireless communication line is established between a mobile phone and a hands-free apparatus located within a near-field coverage area and phone data is transferred from the mobile phone to the hands-free apparatus (for example, see Japanese Patent Application Laid-open No. 2002-193046).

Here, data transfer from a mobile phone to a hands-free apparatus is not limited to the transfer of phone data based on PBAP connection, and wireless communication connection based on a Bluetooth advanced audio distribution profile (A2DP) or wireless fidelity (Wi-Fi) may be made at the same time and various content data such as music, video, and Internet browser screen display may be transferred in parallel. However, since all of these are communications using a 2.4 GHz band, for example, when the PBAP, the A2DP, the Wi-Fi, and the like are simultaneously connected and communicating with each other, interference may occur between these wireless communications, resulting in the deterioration of wireless communication quality, such as skipping sound and noise in music and video playback, or delay in updating browser displays.

An object to be achieved by the present disclosure is to provide a hands-free apparatus, a data transfer method, and a computer-readable medium capable of reducing the deterioration of wireless communication quality due to the simultaneous connection between a plurality of wireless communications in the hands-free apparatus.

SUMMARY

A hands-free apparatus according to the present disclosure includes a memory, and a hardware processor coupled to the memory. The hardware processor is configured to: perform a hands-free connection process of connecting to a mobile phone by using a hands-free communication protocol for performing a hands-free phone conversation; perform a first data transfer process of making a first connection with the mobile phone by using a wireless data transfer protocol for transferring phone data related to phone, and causing the phone data to be automatically or manually transferred from the mobile phone; and depending on a status of a different data transfer process than the first data transfer process, perform transfer control related to transfer by at least one of the first data transfer process and the different data transfer process.

BRIEF DESCRIPTION OF THE DRAWINGS

FIG. 6A is a diagram illustrating an example of a correspondence relation of phone data according to the embodiment;

FIG. 6B is a diagram illustrating an example of a correspondence relation of phone data according to the embodiment;

FIG. 6C is a diagram illustrating an example of a correspondence relation of phone data according to the embodiment;

FIG. 6D is a diagram illustrating an example of a correspondence relation of phone data according to the embodiment;

FIG. 6E is a diagram illustrating an example of a correspondence relation of phone data according to the embodiment;

FIG. 7A is a diagram illustrating an example of incoming call history data according to the embodiment;

FIG. 7B is a diagram illustrating an example of incoming call history data according to the embodiment;

FIG. 8A is a diagram illustrating an example of missed call history data according to the embodiment;

FIG. 8B is a diagram illustrating an example of missed call history data according to the embodiment;

FIG. 9 is a diagram illustrating an example of outgoing call history data, incoming call history data, missed call history data, and all history data according to the embodiment;

FIG. 14A is a diagram illustrating an example of outgoing call history data according to the embodiment;

FIG. 14B is a diagram illustrating an example of outgoing call history data according to the embodiment;

FIG. 15A is a diagram illustrating an example of incoming call history data according to the embodiment;

FIG. 15B is a diagram illustrating an example of incoming call history data according to the embodiment;

FIG. 19 is a diagram illustrating an example of phone book data according to the embodiment;

FIG. 21 is a flowchart illustrating details of the flow of a hands free profile (HFP) process according to the embodiment;

FIG. 23 is a diagram illustrating an example of a processing flow in the case of connecting a plurality of wireless communications and transferring data according to the embodiment;

FIG. 24 is a diagram illustrating an example of a processing flow in the case of connecting a plurality of wireless communications and transferring data according to the embodiment;

DETAILED DESCRIPTION

Figure 1:
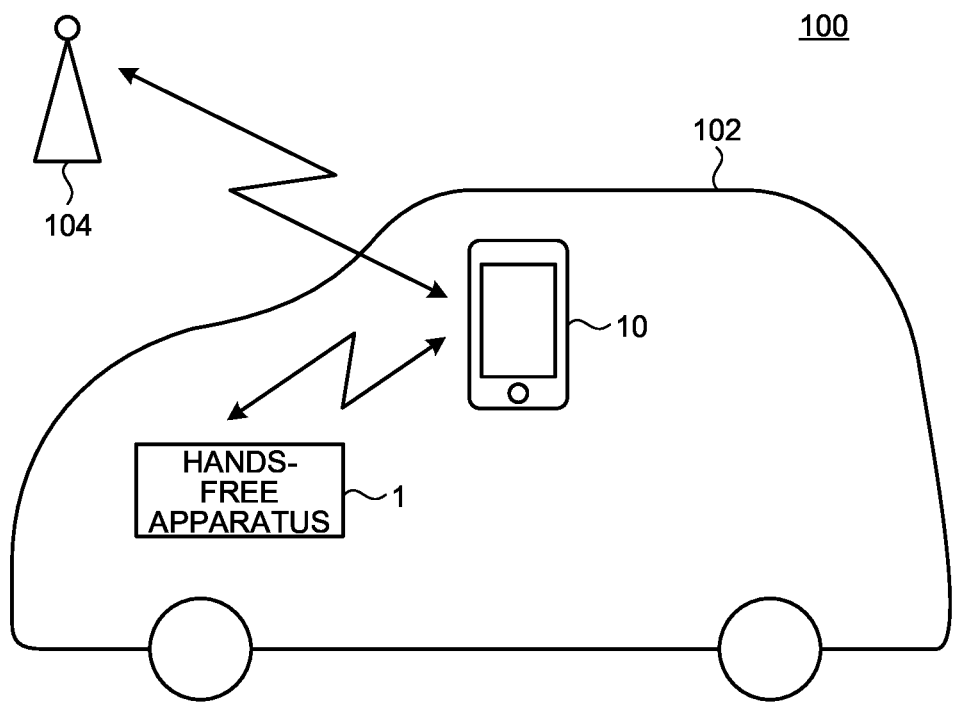
FIG. 1 is a schematic diagram of a hands-free system according to an embodiment.

Hereinafter, embodiments of the present disclosure will be described in detail with reference to the drawings. Note that in each of the following embodiments, the same parts are denoted by the same reference numerals, and redundant description will be omitted.

FIG. 1 is a schematic diagram illustrating an example of a hands-free system 100 of the present embodiment.

The hands-free system 100 includes a hands-free apparatus 1 and a mobile phone 10. The hands-free apparatus 1 and the mobile phone 10 are connected by wireless communication. The mobile phone 10 can communicate with a phone such as another mobile phone 10 via a base station 104 via a phone line.

In the present embodiment, a mode in which the hands-free apparatus 1 is installed in a vehicle 102 will be described as an example. Note that the present disclosure is not limited to the mode in which the hands-free apparatus 1 is installed in the vehicle 102.

The hands-free apparatus 1 is connected for communication to the mobile phone 10. The mobile phone 10 wirelessly communicates with the base station 104 via a mobile phone network. The mobile phone 10 is a smartphone, for example, and has a communication function based on the Bluetooth (registered trademark) system, which is near-field wireless communication means, and a Wi-fi communication function. Note that the mobile phone 10 may be a different type of mobile phone or a different communication terminal device than the smartphone as long as it has a communication function based on the Bluetooth system or the Wi-fi communication function. Furthermore, the hands-free apparatus 1 may be simultaneously connected to a different communication device, than the mobile phone 10, having a communication function based on the Bluetooth system or the Wi-fi communication function, to perform data communication.

The hands-free apparatus 1 connects to the mobile phone network via the mobile phone 10. With this, a driver of the vehicle 102, for example, can make an outgoing call and receive an incoming call by operating the hands-free apparatus 1 even without operating the mobile phone 10. The hands-free apparatus 1 may be implemented as one function of an in-vehicle navigation device installed in the vehicle 102, for example.

Figure 2:
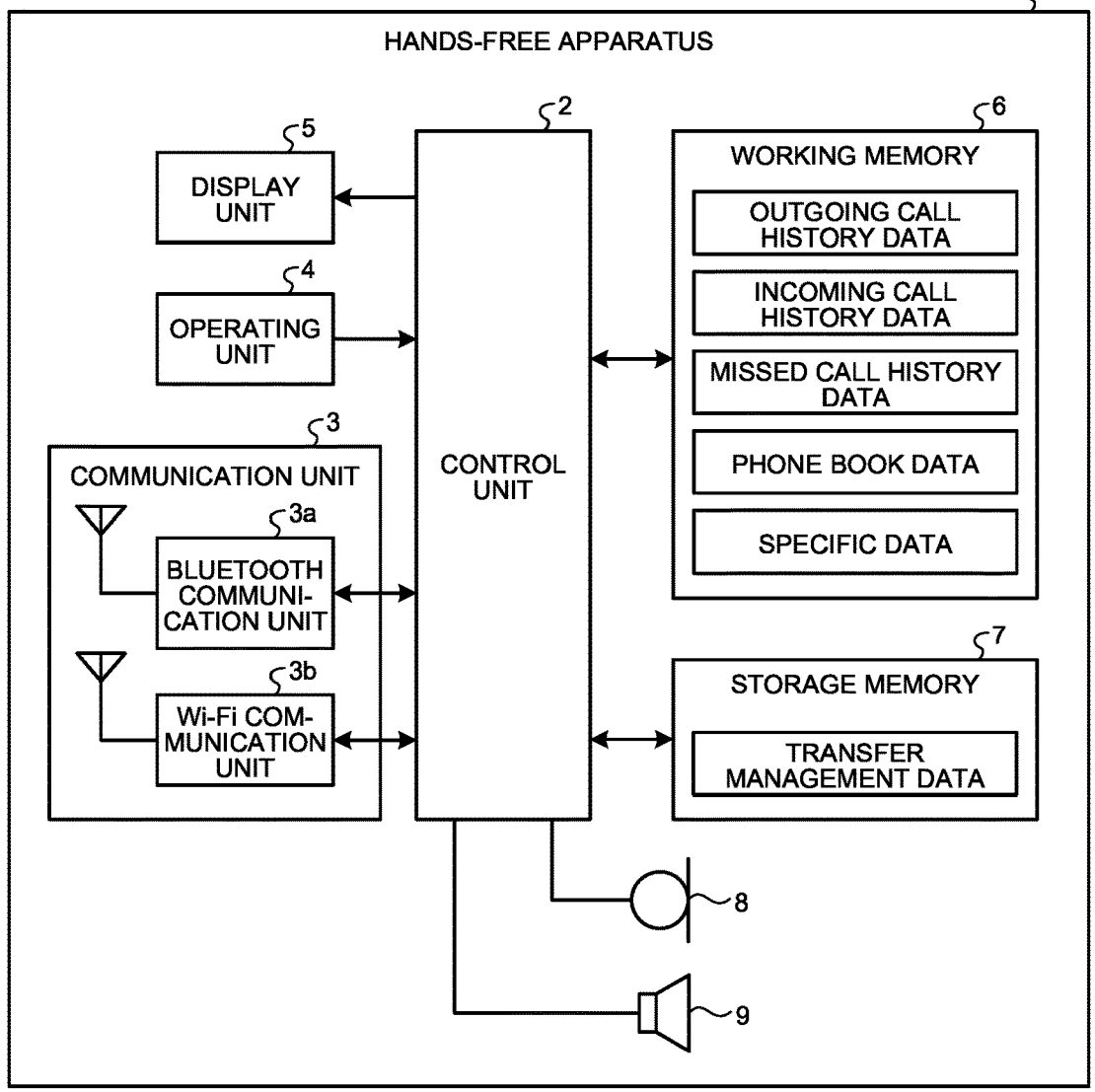
FIG. 2 is a block diagram of the hands-free system according to the embodiment.

FIG. 2 is a block diagram of the hands-free system 100.

The mobile phone 10 establishes a mobile phone line with the base station 104 of the mobile phone network and performs outgoing call processing and incoming call processing.

The outgoing call processing is processing of making an outgoing call using an accepted phone number as an outgoing call destination. For example, it is assumed that a user operates dial keys ("0" to "9" numeric keys) to input a phone number of an outgoing call destination and then operates an outgoing call key. In such a case, the mobile phone 10 performs outgoing call processing of making an outgoing call using the accepted phone number as an outgoing call destination. The outgoing call processing enables the mobile phone 10 to communicate with another mobile phone 10 of the outgoing call destination.

The incoming call processing is processing of receiving an incoming call from another mobile phone 10. For example, the mobile phone 10 receives an incoming call signal from the base station 104 in accordance with an outgoing call from another mobile phone 10. The mobile phone 10 receives the phone number of the another mobile phone 10 of the outgoing call source as an incoming call phone number. Then, the mobile phone 10 performs incoming call processing in response to the mobile phone 10 of the outgoing call source when the user operates an incoming call key. The incoming call processing enables the mobile phone 10 to communicate with the another mobile phone 10 of the outgoing call source.

The call status of the mobile phone 10 transitions due to the outgoing call processing, the incoming call processing, and the like.

The call status means communication status between the mobile phone 10 and the another mobile phone 10 via a phone line. Specifically, the call status is any one of an outgoing call state, an incoming call state, a phone conversation state, and a standby state.

The outgoing call state is a state in which the mobile phone 10 is making an outgoing call using an accepted phone number as an outgoing call destination. The incoming call state is a state in which the mobile phone 10 is receiving an incoming call from the another mobile phone 10. The phone conversation state is a state in which the mobile phone 10 and the another mobile phone 10 are performing voice communication via the base station 104, that is, are holding a phone conversation. The standby state is a state in which a communication state via the telephone line of the mobile phone 10 is neither the outgoing call state, the incoming call state, nor the phone conversation state. In other words, the standby state is a state other than the phone conversation state, which means a state of waiting for an incoming call or an outgoing call.

The mobile phone 10 transitions from any one phone communication of the outgoing call state, the incoming call state, the phone conversation state, and the standby state to another one call status according to communication via the phone line. The mobile phone 10 notifies the hands-free apparatus 1 of the call status by the HFP each time the call status transitions. Therefore, the hands-free apparatus 1 is configured to be able to specify the call status of the mobile phone 10.

The mobile phone 10 stores phone data related to phone. The phone data includes at least one of outgoing call history data (outgoing calls history object), incoming call history data (incoming calls history object), missed call history data (missed calls history object), phone book data (phone book object), and specific data.

The outgoing call history data is data representing the outgoing call history of a phone. Specifically, the outgoing call history data is one or more data in which correspondence between an outgoing call phone number and an outgoing call date and time is set as one item data. The mobile phone 10 has a timepiece unit that counts a date and time. The mobile phone 10 sets correspondence between an outgoing call phone number and an outgoing call date and time as one item data, and stores multiple outgoing call history data. The outgoing call phone number is a phone number accepted from the dial key in the outgoing call processing. The outgoing call date and time is a date and time measured by the timepiece unit during the outgoing call processing.

The incoming call history data is data representing an incoming call history of a phone. Specifically, the incoming call history data is one or more item data in which correspondence between an incoming call phone number and an incoming call date and time is set as one item data. The mobile phone 10 sets correspondence between an incoming call phone number and an incoming call date and time as one item data, and stores multiple incoming call history data. The incoming call phone number is a phone number accepted from the another mobile phone 10 via the base station 104 in the incoming call processing. The incoming call date and time is a date and time measured by the timepiece unit during the incoming call processing.

The missed call history data is data representing incoming call history when making no response to an incoming call from the another mobile phone 10. Specifically, the missed call history data is one or more item data in which correspondence between an incoming call phone number and an incoming call date and time is set as one item data. The mobile phone 10 sets correspondence between an incoming call phone number received when making no response to an incoming call from the another mobile phone 10 and an incoming call date and time as one item data. Then, the mobile phone 10 stores the missed call history data which is one or more data.

The phone book data is multiple item data in which correspondence between phone numbers and registered names is set as one item data. The mobile phone 10 correlates phone numbers and registered names input by a user with each other, and stores, for example, about 500 correlated phone numbers and registered names in a non-volatile memory.

Note that the phone data may also include all history data (combined calls history object) obtained by integrating the outgoing call history data, the incoming call history data, and the missed call history data. Hereinafter, when the outgoing call history data, the incoming call history data, the missed call history data, and all history data are collectively described, they may be simply referred to as history data. Furthermore, the history data may not include all history data.

The outgoing call history data, the incoming call history data, and the missed call history data may further include registered names. That is, item data constituting these history data may be data in which phone numbers (outgoing call phone numbers, incoming call phone numbers, and missed call phone numbers), registered names, and outgoing/incoming call dates and times (outgoing call dates and times or incoming call dates and times) are correlated with each other. In the present embodiment, a mode in which the item data included in these history data includes registered names will be described as an example.

The mobile phone 10 determines whether the phone number of an incoming call phone number received from the base station 104 has been registered in the phone book data. When the phone number has been registered, the mobile phone 10 stores a registered name corresponding to the phone number as incoming call history data in correlation with the phone number and an incoming call date and time. It is sufficient if the mobile phone 10 stores a registered name as missed call history data in correlation with an incoming call phone number and an incoming call date and time, similarly to when making no response to an incoming call from the another mobile phone 10. Furthermore, the mobile phone 10 determines whether the phone number of a transmitted incoming call phone number has been registered in the phone book data. When the phone number has been registered, the mobile phone 10 stores a registered name corresponding to the phone number as outgoing call history data in correlation with the phone number and an outgoing call date and time.

The specific data is one or more item data selected in advance by the user. In other words, the specific data is item data to be watched closely that has been selected in advance by a user. For example, the specific data is item data selected in advance by the user as "frequently used items" or "favorites" among multiple item data included in the history data. Therefore, the specific data is one or more data in which correspondence between a phone number and a registered name is set as one item data, and is item data selected in advance by the user.

For example, by operating the mobile phone 10, the user selects, as the specific data, the one or more item data included in the phone book data and the history data. The mobile phone 10 stores the selected item data as the specific data.

Note that, by operating the mobile phone 10, the user may select, as confidential data, the one or more item data included in the phone book data and the history data. The confidential data is item data selected to be confidential (secret). In such a case, it is sufficient if the mobile phone 10 add, to the item data, a confidential flag indicating that the selected item data is confidential data. Therefore, the item data included in each of the phone book data, the history data, and the specific data may be stored in a state where the confidential flag has been added. Note that the mobile phone 10 may store the one or more item data selected as the confidential data, as confidential data different from the phone book data and the outgoing/incoming call history data.

Furthermore, the confidential flag may be added by the hands-free apparatus 1 side by an operation of the user of the hands-free apparatus 1.

When a display request by a user's operation and the like is accepted, the mobile phone 10 displays the phone book data. The mobile phone 10 accepts the selection of one of the phone numbers included in the phone book data, and accepts an outgoing call instruction. The mobile phone 10 performs outgoing call processing with the selected phone number as an outgoing call destination. Therefore, the user can perform the outgoing call processing to be performed without error by a simple operation even without inputting all numeric keys corresponding to numbers constituting the phone number one by one.

The mobile phone 10 can store, for example, the latest 20 data for each of the outgoing call history data, the incoming call history data, and the missed call history data. The mobile phone 10 automatically deletes the oldest data each time the outgoing call processing, the incoming call processing, and the missed call processing are performed, thereby updating these data. Note that the number of these data stored in the mobile phone 10 is not limited to 20.

In the present embodiment, the mobile phone 10 has a near-field wireless communication function. In the present embodiment, the mobile phone 10 performs near-field wireless communication corresponding to Bluetooth (registered trademark) as a wireless communication standard. The mobile phone 10 connects to and communicates with the hands-free apparatus 1 by using a profile such as a hands-free profile and a phone book access profile. The hands-free profile will be hereinafter referred to as a hands free profile (HFP) for description. The phone book access profile will be hereinafter referred to as a phone book access profile (PBAP) for description.

The HFP is a hands-free communication protocol for performing hands-free communication and is a profile defined by a wireless communication standard. The PBAP is a data transfer protocol for transferring phone data and is a profile defined by a wireless communication standard. These profiles indicate communication protocols defined for each function.

The PBAP is an example of a data transfer protocol for performing data transfer and is a profile defined by a Bluetooth standard. The PBAP is a profile capable of automatically transferring phone data from the mobile phone 10 to the hands-free apparatus 1 without the user operating the mobile phone 10 after connection using the PBAP is made. That is, the mobile phone 10 is configured to be able to automatically transfer the phone data to the hands-free apparatus 1.

For example, the mobile phone 10 connects the PBAP immediately after establishing a communication line with the hands-free apparatus 1, and automatically transfers phone data stored at that time to the hands-free apparatus 1. With this, when the mobile phone 10 is present within the Bluetooth coverage area of the hands-free apparatus 1, the mobile phone 10 automatically transfers the phone data (the phone book data, the outgoing call history data, the incoming call history data, the missed call history data, and the specific data) to the hands-free apparatus 1.

Next, the hands-free apparatus 1 will be described.

The hands-free apparatus 1 includes a control unit 2, a communication unit 3, an operating unit 4, a display unit 5, a working memory 6, a storage memory 7, a microphone 8, and a speaker 9.

The control unit 2 and the communication unit 3, the operating unit 4, the display unit 5, the working memory 6, the storage memory 7, the microphone 8, and the speaker 9 are connected so as to exchange data or signals.

The control unit 2 controls an entire operation such as a communication operation and a data management operation of the hands-free apparatus 1. Details of the control unit 2 will be described below.

The communication unit 3 includes a Bluetooth communication unit 3a and a Wi-fi communication unit 3b.

The Bluetooth communication unit 3a is a wireless communication device that performs near-field wireless communication. In the present embodiment, the Bluetooth communication unit 3a performs near-field wireless communication corresponding to Bluetooth as a wireless communication standard. In the Bluetooth, communication is performed using frequencies in the 2.4 GHz band. In the present embodiment, the Bluetooth communication unit 3a establishes a wireless communication line with the mobile phone 10 present within the Bluetooth coverage area, and performs communication pursuant to the Bluetooth communication standard.

The Bluetooth communication unit 3a connects to and communicates with the mobile phone 10 by using profiles such as the HFP that is a hands-free communication protocol for performing hands-free communication, the PBAP that is a data transfer protocol for transferring phone data, and the A2DP for transmitting/receiving audio data.

Furthermore, the Bluetooth communication unit 3a is configured to be able to make a multi-profile connection. Therefore, the Bluetooth communication unit 3a can be simultaneously connected to the mobile phone 10 by using both the HFP and the PBAP. Furthermore, the Bluetooth communication unit 3a can also be simultaneously connected to the mobile phone 10 by using both the PBAP and the A2DP, for example.

The multi-profile connection may be referred to as simultaneous connection. In Bluetooth, maximum seven slave communication devices can be simultaneously connected to one master communication device by time division multiplexing. That is, a communication channel can perform communication by seven independent time division channels. In such a case, the simultaneous connection uses two of the seven communication channels. For example, the simultaneous connection uses one of the two communication channels in the A2DP and uses the other one thereof in the PBAP. Furthermore, a logical channel of one communication channel may be shared with the A2DP and the PBAP and simultaneously operated as in packet communication.

The Wi-fi communication unit 3b is a wireless communication device that performs near-field wireless communication. In the present embodiment, the Wi-fi communication unit 3b performs near-field wireless communication corresponding to Wi-fi as a wireless communication standard. In the Wi-fi, communication is performed using the frequency band of 2.4 GHz and 5 GHz. In the present embodiment, similarly to the Bluetooth, the Wi-fi communication unit 3b establishes a wireless communication line with the mobile phone 10 present within a Wi-fi coverage area by using the 2.4 GHz band, and performs communication pursuant to the Wi-fi communication standard.

The operating unit 4 accepts user's input. The operating unit 4 includes touch keys formed on the display unit 5, for example, accepts an operating signal representing user's operation content, and outputs the operating signal to the control unit 2.

The display unit 5 displays a display screen on the basis of a display signal accepted from the control unit 2. For example, the display unit 5 displays a display screen for accepting the input of a phone number by the user. The display screen is, for example, a screen in which dial keys corresponding to "0" to "9" are arranged.

The working memory 6 stores various data. In the present embodiment, the working memory 6 stores the phone book data, the outgoing call history data, the incoming call history data, the missed call history data, and the specific data which are phone data automatically transferred from the mobile phone 10. The working memory 6 can store, for example, five data for each of the outgoing call history data, the incoming call history data, and the missed call history data. Note that the number of data storable in the working memory 6 is not limited to 5. The working memory 6 is, for example, a volatile memory.

The storage memory 7 stores various data. The storage memory 7 is composed of, for example, a nonvolatile memory.

The microphone 8 accepts the input of voices emitted by the user when performing a hands-free phone conversation (voice connection by hands free) using the mobile phone 10. The speaker 9 outputs accepted voices of a phone conversation destination when performing the hands-free phone conversation using the mobile phone 10.

The hands-free apparatus 1 may further include various configurations required for a navigation operation. For example, the hands-free apparatus 1 may also include a global positioning system (GPS), a route search unit, a map data reading unit, a vehicle information and communication system (VICS; registered trademark) information reception unit, a voice recognition unit, and the like.

The GPS is a system that detects a current position of its own vehicle. The route search unit is a system that searches for a route from the current position to a destination. The map data reading unit is a system that reads map data from a recording medium. The VICS information reception unit is a system that receives VICS information distributed from a VICS center. The voice recognition unit is a system that voice-recognizes voices emitted by the user.

The hands-free apparatus 1 is configured to supply power and stop the supply of the power in conjunction with the on and off of an ACC switch (accessory power supply) of the vehicle 102, for example. For example, it is assumed that the ACC switch is switched from on to off in accordance with a user's operation. In such a case, when the supply of the power to the hands-free apparatus 1 is stopped. When the supply of the power is stopped, the outgoing call history data, the incoming call history data, the missed call history data, and the phone book data stored in the working memory 6 are deleted. On the other hand, various data such as transfer management data stored in the storage memory 7 are not deleted and are stored as is even after the supply of the power is stopped.

Next, details of the control unit 2 will be described.

Figure 3:
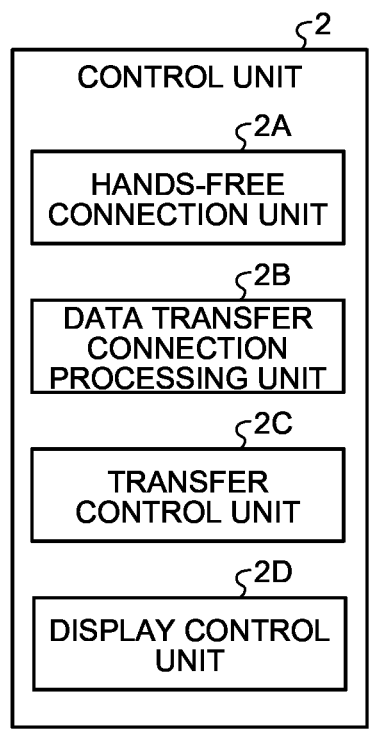
FIG. 3 is a diagram illustrating an example of a functional block diagram of a control unit according to the embodiment.

FIG. 3 is an example of a functional block diagram of the control unit 2. The control unit 2 includes a hands-free connection unit 2A, a data transfer connection processing unit 2B, a transfer control unit 2C, and a display control unit 2D.

The hands-free connection unit 2A, the data transfer connection processing unit 2B, the transfer control unit 2C, and the display control unit 2D are implemented by, for example, one or more processors. For example, each of the elements described above may be implemented by causing a processor such as a central processing unit (CPU) to execute a computer program, that is, software. Each of the elements described above may also be implemented by a processor such as a dedicated integrated circuit (IC), that is, hardware. Each of the elements described above may also be implemented by using software and hardware in combination. When the processors are used, each of the processors may implement one of the elements, or two or more of the elements.

The processor may implement each of the elements described above by reading and executing a computer program stored in the storage memory 7. Note that instead of storing the computer program in the storage memory 7, the computer program may be directly incorporated in a circuit of the processor. In such a case, the processor implements each of the elements described above by reading and executing the computer program incorporated in the circuit.

The hands-free connection unit 2A performs a hands-free connection process of wirelessly connecting to the mobile phone 10 by using the HFP. The hands-free connection process is a process of establishing a wireless communication connection with the mobile phone 10 by using the HFP. That is, the hands-free connection unit 2A establishes the connection of the HFP between the hands-free apparatus 1 and the mobile phone 10.

When the HFP connection is established, the hands-free apparatus 1 is in a state of being able to perform a hands-free phone conversation via the mobile phone 10. Specifically, the hands-free connection unit 2A transmits the voice accepted from the microphone 8 to the mobile phone 10 via the Bluetooth communication unit 3a. The mobile phone 10 transmits the voice accepted from the hands-free apparatus 1 to a mobile phone 10 having an outgoing call destination phone number via the base station 104. Furthermore, the hands-free connection unit 2A receives voice accepted by the mobile phone 10 from the another mobile phone 10 via the Bluetooth communication unit 3a, and outputs the received voice to the speaker 9. Therefore, the hands-free apparatus 1 can perform the hands-free phone conversation. Note that in the present embodiment, the wireless communication connection using the HFP may be referred to as the connection of the HFP or an HFP connection for description.

The data transfer connection processing unit 2B performs a data transfer process (first data transfer process) of making a wireless communication connection (first connection) with the mobile phone 10 by using the PBAP, which is a data transfer protocol for transferring phone data related to phone, via the Bluetooth communication unit 3a, and causing the phone data to be transferred from the mobile phone 10. When the connection of the PBAP is established, the data transfer connection processing unit 2B sequentially transmits each transfer request for the history data, such as the outgoing call history data, the incoming call history data, and the missed call history data, to the mobile phone 10. The mobile phone 10 transfers the history data, which correspond to the transfer request, which is accepted from the hands-free apparatus 1, to a mobile phone 10.

Furthermore, the data transfer connection processing unit 2B transmits a transfer request for the specific data to the mobile phone 10. The mobile phone 10 transmits the specific data to a mobile phone 10 according to the transfer request accepted from the hands-free apparatus 1. Furthermore, the data transfer connection processing unit 2B transmits a transfer request for the phone book data to the mobile phone 10. The mobile phone 10 transfers the phone book data to a mobile phone 10 according to the transfer request accepted from the hands-free apparatus 1.

By these processes, it is possible to automatically or manually transfer the phone data from the mobile phone 10 to the hands-free apparatus 1.

Furthermore, a data transfer connection processing unit 2b makes, for example, an A2DP connection as a second connection with the mobile phone 10 via the Bluetooth communication section 3a. Furthermore, the data transfer connection processing unit 2b makes, for example, a Wi-fi connection as the second connection with the mobile phone 10 via the Wi-fi communication unit 3b. Furthermore, the data transfer connection processing unit 2b may perform a different communication with a communication terminal device or the like, other than the mobile phone 10, having a Bluetooth communication function or a Wi-fi communication function, based on, for example, the A2DP connection, the Wi-fi connection, or the like as the second connection.

Furthermore, the data transfer connection processing unit 2b simultaneously makes, as a different data transfer process than PBAP connection (first data transfer process) for transferring phone data, a plurality of communication connections (second connection and third connection), other than the PBAP connection, with the mobile phone 10, a different communication device, or the like, thereby performing transfer processes (a second data transfer process and a third data transfer process) of various data or the like.

For example, the data transfer connection processing unit 2b can simultaneously perform, as a different data transfer process, a transfer process (second data transfer process or third data transfer process) of music data or the like based on the A2DP connection (second connection or third connection) and a transfer process (second data transfer process or third data transfer process) of content data or the like based on the Wi-fi connection (second connection or third connection) with the mobile phone 10 or a different communication device.

The transfer control unit 2C performs transfer control related to the transfer of various data such as the phone data and the content data. The transfer control is control for causing the mobile phone 10 or a different communication device to transfer the phone data, the content data, or the like to the hands-free apparatus 1. The transfer control unit 2C controls the transmission timing of a transfer request transmitted from the data transfer connection processing unit 2B to the mobile phone 10 or a different communication device, the type of a transfer request to be transmitted, the continuation of transfer, the stop of transfer, the suspension of communication, a communication speed (transfer speed or transmission speed), the discard or retention of transfer data, transfer restart, or the like. Note that the communication speed (transfer speed or transmission speed) is represented in units of bit per second (bps), for example, and can be evaluated by the amount of data that can be transferred per unit time. The type of the transfer request to be transmitted is the type of phone data requested to be transferred. The type of the phone data means each of the outgoing call history data, the incoming call history data, the missed call history data, the all history data, the phone book data, and the specific data.

By the aforementioned control, the transfer control unit 2C performs transfer control for controlling the transfer of the phone data by the data transfer connection processing unit 2B. The transfer control by the transfer control unit 2C controls the type of the phone data transferred from the mobile phone 10 to the hands-free apparatus 1, the order of the transfer, the continuation of transfer, the stop of transfer, and the like.

In the present embodiment, the transfer control unit 2C performs transfer control according to the phone data to be transferred. Specifically, the transfer control unit 2C performs the transfer control according to whether the specific data is included in the phone data to be transferred or the confidential data is included therein.

Specifically, the transfer control unit 2C performs transfer control of at least one of a transfer order and transfer propriety according to the type of the phone data to be transferred.

Regarding the transfer order, when the specific data is included in the phone data to be transferred, the transfer control unit 2C performs transfer control for causing at least the specific data to be transferred. The phone data to be transferred is phone data stored in the mobile phone 10. When the specific data is included in the mobile phone 10, the transfer control unit 2C performs transfer control for causing at least the specific data to be transferred. Specifically, the transfer control unit 2C controls the data transfer connection processing unit 2B to transmit a transfer request for the specific data. Therefore, at the time of automatic transfer of the phone data, at least the specific data is transferred from the mobile phone 10 to the hands-free apparatus 1.

Furthermore, preferably, the transfer control unit 2C performs transfer control for causing the specific data included in the phone data to be transferred at least before the phone book data included in the phone data. In such a case, it is sufficient if the transfer control unit 2C controls the data transfer connection processing unit 2B to transmit a transfer request for the specific data before a transfer request for the phone book data. By such transfer control, at the time of automatic transfer of the phone data, the specific data is transferred to the hands-free apparatus 1 before the phone book data.

The phone book data is highly likely to have a larger amount of data than the history data or the specific data. Therefore, the transfer control unit 2C performs transfer control for causing the specific data to be transferred at least before the phone book data, so that data that is more important can be preferentially transferred to a user.

For example, it is sufficient if the transfer control unit 2C performs transfer control for causing the outgoing/incoming call history data, the specific data, and the phone book data to be transferred in this transfer order. The outgoing/incoming call history data is a general name for the outgoing call history data, the incoming call history data, and the missed call history data. In such a case, it is sufficient if the transfer control unit 2C controls the data transfer connection processing unit 2B to transmit transfer requests in the order of a transfer request for the outgoing/incoming call history data, a transfer request for the specific data, and a transfer request for the phone book data. By such transfer control, at the time of automatic transfer of the phone data, the phone data is transferred to the hands-free apparatus 1 in the order of the outgoing/incoming call history data, the specific data, and the phone book data.

Furthermore, for example, it is sufficient if the transfer control unit 2C performs transfer control for causing the specific data, the outgoing/incoming call history data, and the phone book data to be transferred in this transfer order. In such a case, it is sufficient if the transfer control unit 2C controls the data transfer connection processing unit 2B to transmit transfer requests in the order of a transfer request for the specific data, a transfer request for the outgoing/incoming call history data, and a transfer request for the phone book data. By such transfer control, at the time of automatic transfer of the phone data, the phone data is transferred to the hands-free apparatus 1 in the order of the specific data, the outgoing/incoming call history data, and the phone book data.

As described above, the phone data may include the confidential data. In other words, the confidential data may be stored in the mobile phone 10 as data different from other types of phone data. When the phone data includes the confidential data, it is sufficient if the transfer control unit 2C performs transfer control for causing the confidential data not to be transferred. That is, the transfer control unit 2C performs the transfer control, which causes the confidential data not to be transferred, as transfer control of transfer propriety according to the phone data.

In such a case, it is sufficient if the transfer control unit 2C controls the data transfer connection processing unit 2B not to transmit a transfer request for the confidential data at the time of automatic transfer of the phone data.

Note that a confidential flag may be added to the one or more item data included in the phone data. In such a case, the item data to which the confidential flag has been added is transferred to the hands-free apparatus 1 by a transfer request. Hereinafter, a mode in which the confidential flag is added to the one or more item data included in the phone data will be described as an example.

In addition to the process of transferring the phone data from the mobile phone 10 using the PBAP (first data transfer process), the transfer control unit 2C performs transfer control related to the process of transferring the phone data from the mobile phone 10 using the PBAP or the transfer process of the content data or the like based on the A2DP connection or the Wi-fi connection, depending on the status of the transfer process (the different data transfer process, the second data transfer process, the third data transfer process) of the content data or the like based on the A2DP connection or the Wi-fi connection.

Furthermore, depending on the status of the transfer process (the different data transfer process, the second data transfer process, the third data transfer process) of the content data or the like based on the A2DP connection or the Wi-fi connection in addition to the process (first data transfer process) of transferring the phone data from the mobile phone 10 using the PBAP, the transfer control unit 2C performs transfer control related to the transfer process (the different data transfer process) of the content data or the like based on the A2DP connection or the Wi-fi connection.

In a case where the transfer process (second data transfer process) of the content data or the like based on the A2DP connection or the Wi-fi connection is performed when the transfer process (first data transfer process) of the phone data based on the PBAP connection is to be started, for example, the transfer control unit 2C may perform transfer control for lowering the transfer speed of the transfer process of the phone data based on the PBAP connection.

Thereafter, when the transfer process (second data transfer process) of the content data or the like based on the A2DP connection or the Wi-fi connection is ended, the transfer control unit 2C may perform transfer control for increasing the transfer speed in the transfer process (first data transfer process) of the phone data based on the PBAP connection. For example, the transfer control unit 2C controls the transfer process of the phone data based on the PBAP connection, which has been performed by reducing the communication speed, so as to return to the normal transfer speed.

Furthermore, in a case where the transfer process (second data transfer process) of the content data or the like based on the A2DP connection or the Wi-fi connection is performed, when the transfer process (first data transfer process) of the phone data based on the PBAP connection is to be started, for example, the transfer control unit 2C may perform transfer control for stopping (suspending) the transfer process of the phone data based on the PBAP connection.

Thereafter, when the transfer process (second data transfer process) of the content data or the like based on the A2DP connection or the Wi-fi connection is ended, the transfer control unit 2C may perform transfer control for starting the transfer process (first data transfer process) of the phone data based on the PBAP connection. For example, the transfer control unit 2C performs control so that the transfer process of the phone data based on the PBAP connection, which has been in the transfer suspension state, is restarted.

Furthermore, in a case where the transfer process (first data transfer process) of the phone data based on the PBAP connection is performed, when the transfer process (second data transfer process) of the content data or the like based on the A2DP connection or the Wi-fi connection is to be started, for example, the transfer control unit 2C may perform transfer control for lowering the transfer speed of the transfer process of the phone data based on the PBAP connection.

Thereafter, when the transfer process (second data transfer process) of the content data or the like based on the A2DP connection or the Wi-fi connection is ended, the transfer control unit 2C may perform transfer control for increasing the transfer speed in the transfer process (first data transfer process) of the phone data based on the PBAP connection. For example, the transfer control unit 2C controls the transfer speed of the transfer process of the phone data based on the PBAP connection, which has been performed by reducing the communication speed, so as to return to the normal transfer speed.

Furthermore, in a case where the transfer process (first data transfer process) of the phone data based on the PBAP connection is performed, when the transfer process (second data transfer process) of the content data or the like based on the A2DP connection or the Wi-fi connection is to be started, for example, the transfer control unit 2C may perform transfer control for stopping (suspending) the transfer process of the phone data based on the PBAP connection.

Thereafter, when the transfer process (second data transfer process) of the content data or the like based on the A2DP connection or the Wi-fi connection is ended, the transfer control unit 2C may perform transfer control for starting the transfer process (first data transfer process) of the phone data based on the PBAP connection. For example, the transfer control unit 2C performs control so that the transfer process of the phone data based on the PBAP connection, which has been in the transfer stop state, is restarted.

Moreover, when performing the transfer control for stopping the transfer process of the phone data based on the PBAP connection, the transfer control unit 2C may cause the data transfer connection processing unit 2b to discard transferred phone data. Then, after the transfer process (second data transfer process) of the content data or the like based on the A2DP connection or the Wi-fi connection is ended, the transfer control unit 2C may cause the data transfer connection processing unit 2b to transfer the phone data from the mobile phone 10 from the beginning.

Alternatively, when performing the transfer control for stopping the transfer process of the phone data based on the PBAP connection, the transfer control unit 2C may cause the data transfer connection processing unit 2b to store the transferred phone data in a working memory or the like. Then, after the transfer process (second data transfer process) of the content data or the like based on the A2DP connection or the Wi-fi connection is ended, the transfer control unit 2C may cause the data transfer connection processing unit 2b to transfer the phone data from the mobile phone 10 with respect to remaining phone data that has not been transferred.

Furthermore, for example, in a case where the data transfer connection processing unit 2b performs the transfer process (second data transfer process) of the content data or the like based on the Wi-fi connection (second connection) and the transfer process (third data transfer process) of the content data or the like based on the A2DP connection (third connection), the transfer control unit 2C may perform transfer control for reducing the transfer speed of a data transfer process (second data transfer process) based on the Wi-fi connection, in a case where a data transfer process (third data transfer process) based on the A2DP connection is being performed when the transfer process (second data transfer process) of the content data based on the Wi-fi connection is to be started.

Thereafter, when the transfer process (third data transfer process) of the content data or the like based on the A2DP connection (third connection) is ended, the transfer control unit 2C may perform transfer control for increasing the transfer speed in the transfer process (second data transfer process) of the content data based on the Wi-fi connection. For example, the transfer control unit 2C controls the transfer process of the content data based on the Wi-fi connection, which has been performed by lowering the communication speed, so as to return to the normal transfer speed.

Note that a configuration may be employed in which the A2DP connection is made as the second connection, the data transfer process based on the A2DP connection is performed as the second data transfer process, the Wi-fi connection is made as the third connection, and the data transfer process based on the Wi-fi connection is performed as the third data transfer process. In such a case, in a case where the data transfer process (third data transfer process) based on the Wi-fi connection is being performed when the transfer process (second data transfer process) of the content data based on the A2DP connection is to be started, transfer control may be performed to lower the transfer speed of the data transfer process (second data transfer process) based on the A2DP connection.

Moreover, when the transfer process (third data transfer process) of the content data based on the Wi-fi connection (third connection) is ended, the transfer control unit 2C may perform transfer control for increasing the transfer speed in the transfer process (second data transfer process) of the content data based on the A2DP connection (second connection). For example, the transfer control unit 2C controls the transfer speed of the transfer process of the content data based on the A2DP connection, which has been performed by reducing the communication speed, so as to return to the normal transfer speed.

Furthermore, for example, in a case where the data transfer connection processing unit 2b performs the transfer process (second data transfer process) of the content data or the like based on the Wi-fi connection (second connection) and the transfer process (third data transfer process) of the content data or the like based on the A2DP connection (third connection), the transfer control unit 2C may perform transfer control for causing the data transfer connection processing unit 2b to stop (suspend) the data transfer process (second data transfer process) based on the Wi-fi connection, in a case where the data transfer process (third data transfer process) based on the A2DP connection is being performed when the transfer process (second data transfer process) of the content data based on the Wi-fi connection is to be started.

Thereafter, when the transfer process (third data transfer process) of the content data or the like based on the A2DP connection (third connection) is ended, the transfer control unit 2C may perform transfer control for starting the transfer process (second data transfer process) of the content data based on the Wi-fi connection (second connection). For example, the transfer control unit 2C performs control so that the transfer process of the content data based on the Wi-fi connection, which has been in the transfer suspension state, is restarted.

Note that a configuration may be employed in which the A2DP connection is made as the second connection, the data transfer process based on the A2DP connection is performed as the second data transfer process, the Wi-fi connection is made as the third connection, and the data transfer process based on the Wi-fi connection is performed as the third data transfer process. In such a case, in a case where the data transfer process (third data transfer process) based on the Wi-fi connection is being performed when the transfer process (second data transfer process) of the content data based on the A2DP connection is to be started, transfer control may be performed to stop (suspend) the data transfer process (second data transfer process) based on the A2DP connection.

Moreover, when the transfer process (third data transfer process) of the content data based on the Wi-fi connection (third connection) is ended, the transfer control unit 2C may perform transfer control for starting the transfer process (second data transfer process) of the content data based on the A2DP connection (second connection). For example, the transfer control unit 2C performs control so that the transfer speed of the transfer process of the content data based on the A2DP connection, which has been in the transfer suspension state, is restarted.

Furthermore, for example, in a case where the data transfer connection processing unit 2b performs the transfer process (second data transfer process) of the content data or the like based on the Wi-fi connection (second connection) and the transfer process (third data transfer process) of the content data or the like based on the A2DP connection (third connection), the transfer control unit 2C may perform transfer control for causing the data transfer connection processing unit 2b to lower the transfer speed of the data transfer process (second data transfer process) based on the Wi-fi connection, in a case where the data transfer process (second data transfer process) based on the Wi-fi connection is being performed when the transfer process (third data transfer process) of the content data based on the A2DP connection is to be started.

Thereafter, when the transfer process (third data transfer process) of the content data based on the A2DP connection (third connection) is ended, the transfer control unit 2C may perform transfer control for increasing the transfer speed in the transfer process (second data transfer process) of the content data based on the Wi-fi connection. For example, the transfer control unit 2C controls the transfer process of the content data based on the Wi-fi connection, which has been performed by reducing the communication speed, so as to return to the normal transfer speed.

Note that a configuration may be employed in which the A2DP connection is made as the second connection, the data transfer process based on the A2DP connection is performed as the second data transfer process, the Wi-fi connection is made as the third connection, and the data transfer process based on the Wi-fi connection is performed as the third data transfer process. In such a case, in a case where the data transfer process (second data transfer process) based on the A2DP connection is being performed when the transfer process (third data transfer process) of the content data based on the Wi-fi connection is to be started, transfer control may be performed to lower the transfer speed of the data transfer process (second data transfer process) based on the A2DP connection.

Moreover, when the transfer process (third data transfer process) of the content data based on the Wi-fi connection (third connection) is ended, the transfer control unit 2C may perform transfer control for increasing the transfer speed in the transfer process (second data transfer process) of the content data based on the A2DP connection (second connection). For example, the transfer control unit 2C controls the transfer speed of the transfer process of the content data based on the A2DP connection, which has been performed by reducing the communication speed, so as to return to the normal transfer speed.

Furthermore, for example, in a case where the data transfer connection processing unit 2b performs the transfer process (second data transfer process) of the content data or the like based on the Wi-fi connection (second connection) and the transfer process (third data transfer process) of the content data or the like based on the A2DP connection (third connection), the transfer control unit 2C may perform transfer control for causing the data transfer connection processing unit 2b to stop (suspend) the data transfer process (second data transfer process) based on the Wi-fi connection, in a case where the data transfer process (second data transfer process) based on the Wi-fi connection is being performed when the transfer process (third data transfer process) of the content data based on the A2DP connection is to be started.

Thereafter, when the transfer process (third data transfer process) of the content data or the like based on the A2DP connection (third connection) is ended, the transfer control unit 2C may perform transfer control for starting the transfer process (second data transfer process) of the content data based on the Wi-fi connection (second connection). For example, the transfer control unit 2C performs control so that the transfer process of the content data based on the Wi-fi connection, which has been in the transfer suspension state, is restarted.

Note that a configuration may be employed in which the A2DP connection is made as the second connection, the data transfer process based on the A2DP connection is performed as the second data transfer process, the Wi-fi connection is made as the third connection, and the data transfer process based on the Wi-fi connection is performed as the third data transfer process. In such a case, in a case where the data transfer process (second data transfer process) based on the A2DP connection is being performed when the transfer process (third data transfer process) of the content data based on the Wi-fi connection is to be started, transfer control may be performed to stop (suspend) the data transfer process (second data transfer process) based on the A2DP connection.

Moreover, when the transfer process (third data transfer process) of the content data based on the Wi-fi connection (third connection) is ended, the transfer control unit 2C may perform transfer control for starting the transfer process (second data transfer process) of the content data based on the A2DP connection (second connection). For example, the transfer control unit 2C performs control so that the transfer speed of the transfer process of the content data based on the A2DP connection, which has been in the transfer suspension state, is restarted.

Next, the display control unit 2D will be described. The display control unit 2D controls the display unit 5 to display a display screen by outputting a display instruction to the display unit 5. Note that the display control unit 2D is an example of an announcement control unit and the announcement control unit may control announcement based on voice or the like in addition to the display.

For example, it is assumed that a display request for the outgoing call history data is accepted from the operating unit 4 by the operation of the operating unit 4 by the user. In such a case, the display control unit 2D outputs a display instruction of the outgoing call history data stored in the working memory 6 to the operating unit 4. By accepting the display instruction, the outgoing call history data is displayed on the display unit 5. For example, maximum five outgoing call history data is displayed on the display unit 5.

Furthermore, for example, it is assumed that a display request for the incoming call history data is accepted from the operating unit 4 by the operation of the operating unit 4 by the user. In such a case, the display control unit 2D outputs a display instruction of the incoming call history data stored in the working memory 6 to the display unit 5. By accepting the display instruction, the incoming call history data is displayed on the display unit 5. For example, maximum five incoming call history data is displayed on the display unit 5.

Furthermore, for example, it is assumed that a display request for the missed call history data is accepted from the operating unit 4 by the operation of the operating unit 4 by the user. In such a case, the display control unit 2D outputs a display instruction of the missed call history data stored in the working memory 6 to the display unit 5. By accepting the display instruction, the missed call history data is displayed on the display unit 5. For example, maximum five missed call history data is displayed on the display unit 5.

Furthermore, for example, it is assumed that a display request for the phone book data is accepted from the operating unit 4 by the operation of the operating unit 4 by the user. In such a case, the display control unit 2D outputs a display instruction of the phone book data stored in the working memory 6 to the display unit 5. By accepting the display instruction, the phone book data is displayed on the display unit 5.

Furthermore, for example, it is assumed that a display request for the specific data is accepted from the operating unit 4 by the operation of the operating unit 4 by the user. In such a case, the display control unit 2D outputs a display instruction of the specific data stored in the working memory 6 to the display unit 5. By accepting the display instruction, the specific data is displayed on the display unit 5. The specific contents of these will be described below.

Note that in the present embodiment, various functions of the hands-free apparatus 1 are implemented by one apparatus; however, the present disclosure is not limited thereto and, for example, various functions of the hands-free apparatus 1 may be distributed to a plurality of apparatuses. That is, various functions of the hands-free apparatus 1 may be implemented by a system composed of the apparatuses (in-vehicle hands-free system).

Furthermore, for example, in a case where the transfer process (second data transfer process) of the content data or the like based on the A2DP connection or the Wi-fi connection is performed when the transfer process (first data transfer process) of the phone data based on the PBAP connection is to be started, the display control unit 2D may display a message regarding the possibility of interference between communication in the transfer process (first data transfer process) of the phone data based on the PBAP connection and communication in the transfer process (second data transfer process) of the content data or the like based on the A2DP connection or the Wi-fi connection.

Note that the message regarding the possibility of interference is not limited to a message stating that there is a possibility of communication failure due to interference. It may include, but not limited to, a message urging the transfer process of the phone data based on the PBAP connection not to be performed at that time or causing a user to select an operation for not performing the transfer process.

Next, the operation of the hands-free apparatus 1 of the present embodiment will be described. The present embodiment will be described on the assumption that the mobile phone 10 stores 20 pieces (maximum storable number) of outgoing call history data and incoming call history data, and that the mobile phone 10 in this state is carried by the user or the like and reaches the inside of the vehicle 102 to enter the Bluetooth coverage area of the hands-free apparatus 1.

First, a procedure in which the control unit 2 of the hands-free apparatus 1 receives the outgoing call history data, the incoming call history data, the missed call history data, the specific data, and the phone book data from the mobile phone 10 will be described with reference to FIG. 4. Note that the user has registered the mobile phone 10 as a Bluetooth communication counterpart by the hands-free apparatus 1 in advance.

For example, the user inputs a 4-digit password for each mobile phone 10 to the hands-free apparatus 1 at the time of initial communication setting. The hands-free apparatus 1 and each mobile phone 10 generate a link key to be used for connecting to each other and hold the link key. Then, the hands-free apparatus 1 performs authentication of the link key at the time of initial connection to select a mobile phone 10 to be connected for communication. That is, neither HFP-based communication connection nor PBAP-based communication connection is performed between the hands-free apparatus 1 and an unregistered mobile phone. Basically, the mobile phone 10 of an owner of the vehicle 102 is pre-registered, and Bluetooth communication is performed between the mobile phone 10 and the hands-free apparatus 1. Note that the pre-registration of the mobile phone 10 to be communicated with the hands-free apparatus 1 is an example of the aforementioned method and the present disclosure is not limited thereto.

In the present example, it is assumed that a plurality of mobile phones 10 to be connected for communication have been registered in the hands-free apparatus 1. Furthermore, for example, the user operates an operating unit 14 to set a priority for the mobile phones 10 in advance and the working memory 6 or the storage memory 7 stores the priority. For example, since a driver may possess a plurality of mobile phones 10, the mobile phones 10 can be registered in the hands-free apparatus 1 in this way.

As a premise of the present example, the Bluetooth communication unit 3a of the hands-free apparatus 1 supports both protocols of HFP-based wireless communication and PBAP-based wireless communication and can simultaneously connect these two profiles (multi-profile connection). However, this simultaneous connection processing may be purposely not performed. There are the following three main reasons for this.

(1) The mobile phone 10 as a communication counterpart may support the HFP-based wireless communication and the PBAP-based wireless communication, but may not support the simultaneous connection, similarly to the hands-free apparatus 1.

(2) Although the mobile phone 10 as a communication counterpart may support the HFP-based wireless communication and the PBAP-based wireless communication and may support the simultaneous connection, the software process of the Bluetooth communication unit 3a of the hands-free apparatus 1 is complicated to maintain the simultaneous connection and communication connection may be unstable.

(3) The mobile phone 10 is manufactured by many manufacturers in the world, and the hands-free apparatus 1 is required to connect to all mobile phones that support the HFP-based wireless communication and the PBAP-based wireless communication.

Due to the above reasons, the hands-free apparatus 1 in the present example makes a serial connection, in which the HFP-based wireless communication and the PBAP-based wireless communication are time-divided, as a more reliable processing procedure for the HFP-based wireless communication and the PBAP-based wireless communication to eliminate the simultaneous connection between the HFP-based wireless communication and the PBAP-based wireless communication as much as possible. Note that this is only an example, and it goes without saying that the configuration of making the simultaneous connection may be used, as described below.

In the following, connection by the HFP-based wireless communication may be simply referred to as the connection of the HFP or connecting HFP for description. Similarly, connection by the HF-based wireless communication may be simply referred to as the connection of the HF or connecting HFP for description.

Returning to the description, the hands-free connection unit 2A selects a mobile phone 10 with a high priority as a target to be connected for communication in the HFP-based wireless communication (S1). In the present example, HFP-based initial communication is automatically attempted first to start connection without performing the PBAP-based communication connection.

Next, the hands-free connection unit 2A performs a process of automatically connecting the HFP-based initial communication to the selected mobile phone 10 (S2). Furthermore, the hands-free connection unit 2A determines whether HFP-based wireless communication connection has succeeded (S3).

When it is determined that the HFP-based wireless communication connection has succeeded (Yes at S3), the hands-free connection unit 2A automatically disconnects the connected HFP-based wireless communication (S4).

Next, the data transfer connection processing unit 2B automatically connects the PBAP-based wireless communication to the mobile phone 10 that has succeeded in the HFP-based wireless communication connection (S5).

Next, the transfer control unit 2C controls the data transfer connection processing unit 2B to perform a data transfer process of the history data (step S6). The transfer control unit 2C controls the data transfer connection processing unit 2B to sequentially transmit a transfer request for the history data to the mobile phone 10 by the PBAP. In response to the transfer request, the mobile phone 10 transfers the history data to the hands-free apparatus 1 by wireless communication using the PBAP. By these processes, the history data is automatically transferred from the mobile phone 10 to the hands-free apparatus 1. The transfer control unit 2C stores the history data transferred from the mobile phone 10 in the working memory 6 or the storage memory 7.

Next, the transfer control unit 2C controls the data transfer connection processing unit 2B to perform a data transfer process of the specific data (step S7). The transfer control unit 2C controls the data transfer connection processing unit 2B to transmit a transfer request for the specific data to the mobile phone 10 by the PBAP. In response to the transfer request, the mobile phone 10 transfers the specific data to the hands-free apparatus 1 by wireless communication using the PBAP. Therefore, the specific data is automatically transferred from the mobile phone 10 to the hands-free apparatus 1. The transfer control unit 2C stores the specific data transferred from the mobile phone 10 in the working memory 6 or the storage memory 7.

Next, the transfer control unit 2C controls the data transfer connection processing unit 2B to perform a data transfer process of the phone book data (step S8). The transfer control unit 2C controls the data transfer connection processing unit 2B to transmit a transfer request for the phone book data to the mobile phone 10 by the PBAP. In response to the transfer request, the mobile phone 10 transfers the phone book data to the hands-free apparatus 1 by wireless communication using the PBAP. Therefore, the phone book data is automatically transferred from the mobile phone 10 to the hands-free apparatus 1. The transfer control unit 2C stores the specific data transferred from the mobile phone 10 in the working memory 6 or the storage memory 7.

When the transfer of the phone book data is completed, the data transfer connection processing unit 2B disconnects the PBAP-based wireless communication with the mobile phone 10 (S9).

Next, the data transfer connection processing unit 2B automatically connects the HFP-based wireless communication to the mobile phone 10 again (S10).

Then, when the HFP-based wireless communication with the mobile phone 10 is established, the hands-free connection unit 2A shifts to a hands-free (HF) standby process. During the execution of the hands-free standby process, the hands-free apparatus 1 is enabled to make an outgoing call or receive an incoming call via the mobile phone 10. The hands-free standby process continues until the power of the hands-free apparatus 1 is turned off or the HFP-based wireless communication with the mobile phone 10 is canceled. Examples of the case where the HFP-based wireless communication with the mobile phone 10 is canceled include a case where the user performs an operation of disconnecting the hands-free apparatus 1 or the mobile phone 10 and a case where the mobile phone 10 has left the Bluetooth coverage area of the hands-free apparatus 1.

As described above, in the present embodiment, wireless communication is serially and automatically switched in the order of HFP→PBAP→HFP. This makes it possible to perform a communication process reliably and stably for mobile phones that support the HFP-based wireless communication and the PBAP-based wireless communication of many manufacturers. Furthermore, by such a method, it is possible to reduce the complexity of a software process in the hands-free apparatus 1.

When it is determined that the HFP-based wireless communication connection has not succeeded (failed) (No at S3), the hands-free connection unit 2A determines whether there is any mobile phone 10 with the next highest priority (S11).

When it is determined that there is any mobile phone 10 with the next highest priority (Yes at S11), the hands-free connection unit 2A selects the mobile phone 10 with the next highest priority as a target to be wirelessly connected for communication (S12) and returns to S2 described above to repeat the aforementioned process.

On the other hand, when it is determined that there is no mobile phone 10 with the next highest priority (No at S11), the hands-free connection unit 2A ends the processing of this flowchart.

As described above, in the present embodiment, the transfer control unit 2C performs the transfer control related to transfer according to the phone data to be transferred. Specifically, the transfer control unit 2C performs the transfer control such that the phone data to be transferred is transferred in the transfer order according to the type of the phone data to be transferred. More specifically, when the specific data is included in the phone data to be transferred, the transfer control unit 2C performs the transfer control for causing at least the specific data to be transferred. For example, as described with reference to FIG. 4, the transfer control unit 2C performs the transfer control in the order of the history data, the specific data, and the phone book data.

Therefore, the specific data, which is the item data selected by the user, is transferred from the mobile phone 10 to the hands-free apparatus 1. Furthermore, the specific data is transferred from the mobile phone 10 to the hands-free apparatus 1 prior to the phone book data.

Therefore, the specific data, which is the item data selected by the user, can be transferred to the hands-free apparatus 1 in preference to other phone data.

Note that, preferably, the transfer control unit 2C performs the transfer control such that the specific data is transferred to the hands-free apparatus 1 at least prior to the phone book data. In such a case, it is sufficient if the hands-free apparatus 1 performs the process illustrated in FIG. 5.

Figure 5:
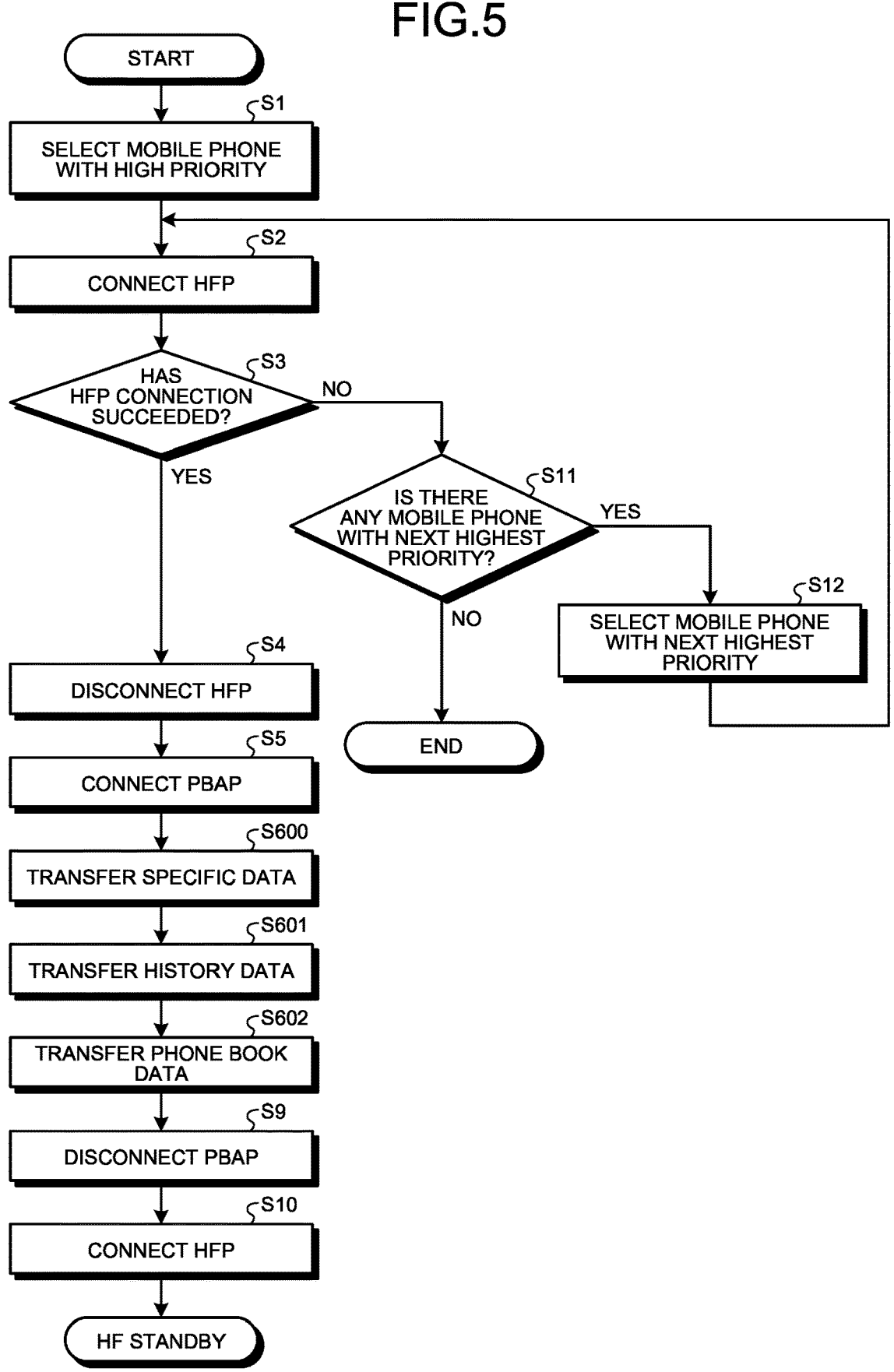
FIG. 5 is a flowchart of the flow of a phone data transfer process according to the embodiment.

FIG. 5 is a flowchart illustrating an example of a procedure in which the control unit 2 of the hands-free apparatus 1 receives the outgoing call history data, the incoming call history data, the missed call history data, the specific data, and the phone book data from the mobile phone 10.

Figure 4:
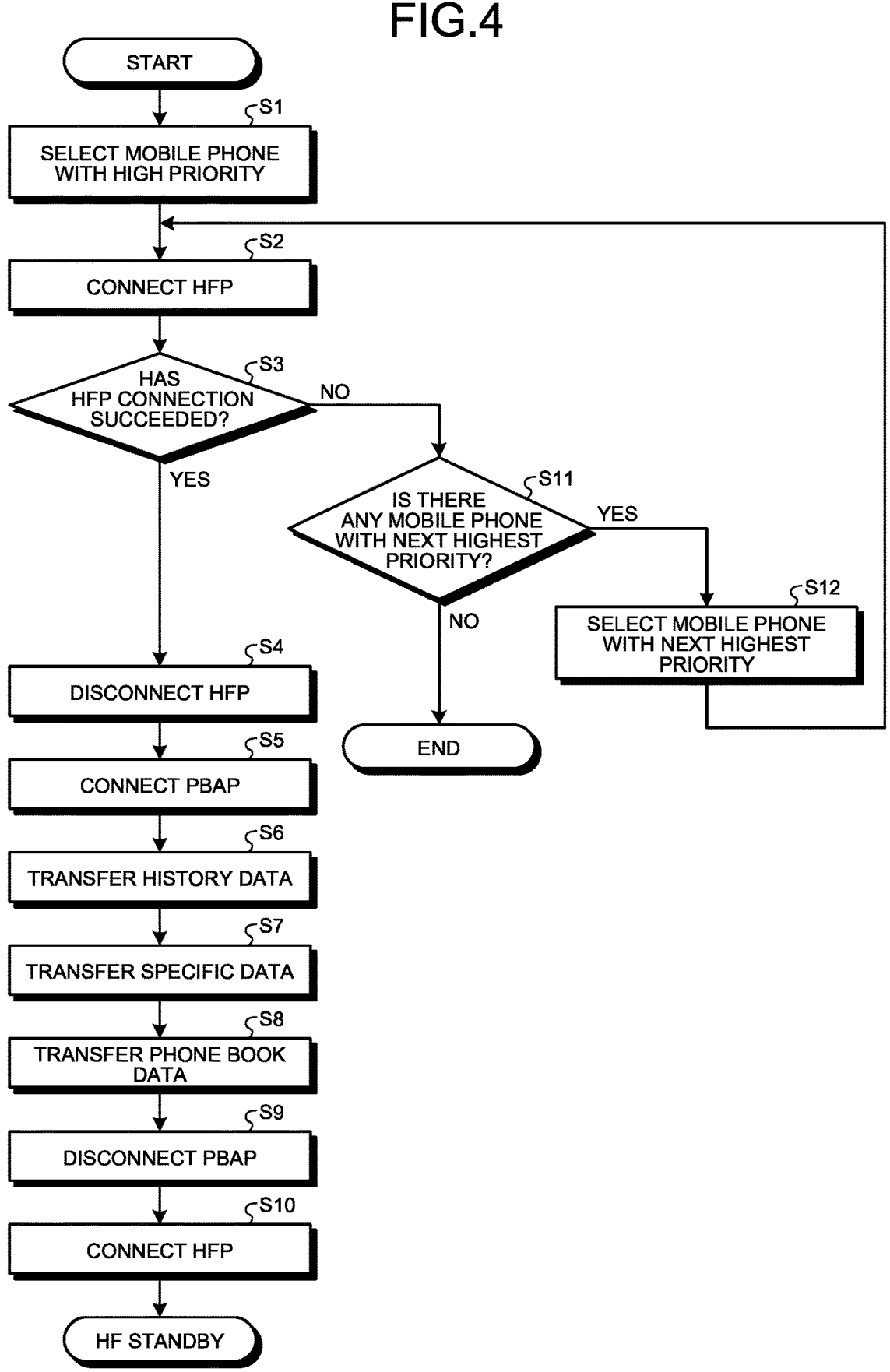
FIG. 4 is a flowchart of the flow of a phone data transfer process according to the embodiment.

The hands-free apparatus 1 performs processes of step S to step S5 in the same manner as in FIG. 4. Next, the transfer control unit 2C controls the data transfer connection processing unit 2B to perform a data transfer process of the specific data (step S600). The transfer control unit 2C controls the data transfer connection processing unit 2B to transmit a transfer request for the specific data to the mobile phone 10 by the PBAP. In response to the transfer request, the mobile phone 10 transfers the specific data to the hands-free apparatus 1 by wireless communication using the PBAP. Therefore, the specific data is automatically transferred from the mobile phone 10 to the hands-free apparatus 1. The transfer control unit 2C stores the specific data transferred from the mobile phone 10 in the working memory 6 or the storage memory 7.

Next, the transfer control unit 2C controls the data transfer connection processing unit 2B to perform a data transfer process of the history data (step S601). The transfer control unit 2C controls the data transfer connection processing unit 2B to sequentially transmit a transfer request for the history data to the mobile phone 10 by the PBAP. In response to the transfer request, the mobile phone 10 transfers the history data to the hands-free apparatus 1 by wireless communication using the PBAP. By these processes, the history data is automatically transferred from the mobile phone 10 to the hands-free apparatus 1. The transfer control unit 2C stores the history data transferred from the mobile phone 10 in the working memory 6 or the storage memory 7.

Next, the transfer control unit 2C controls the data transfer connection processing unit 2B to perform a data transfer process of the phone book data (step S602). The transfer control unit 2C controls the data transfer connection processing unit 2B to transmit a transfer request for the phone book data to the mobile phone 10 by the PBAP. In response to the transfer request, the mobile phone 10 transfers the phone book data to the hands-free apparatus 1 by wireless communication using the PBAP. Therefore, the phone book data is automatically transferred from the mobile phone 10 to the hands-free apparatus 1. The transfer control unit 2C stores the specific data transferred from the mobile phone 10 in the working memory 6 or the storage memory 7.

When the transfer of the phone book data is completed, the data transfer connection processing unit 2B disconnects the PBAP-based wireless communication with the mobile phone 10 (S9). Then, the data transfer connection processing unit 2B automatically connects the HFP-based wireless communication to the mobile phone 10 again (S10). Then, when the HFP-based wireless communication with the mobile phone 10 is established, the hands-free connection unit 2A shifts to the hands-free (HF) standby process. Step S9 and step S10 are the same as in FIG. 4. Furthermore, when a negative determination is made at step S3 (No at step S3), processes of step S11 and step S12 are also the same as in FIG. 4.

As described above, the transfer control unit 2C may perform the transfer control in the order of the specific data, the history data, and the phone book data.

Therefore, the specific data, which is the item data selected by the user, is transferred from the mobile phone 10 to the hands-free apparatus 1. Furthermore, the specific data is transferred from the mobile phone 10 to the hands-free apparatus 1 prior to the phone book data.

Therefore, the specific data, which is the item data selected by the user, can be transferred to the hands-free apparatus 1 in preference to other phone data.

Next, the transfer process described in FIG. 4 and the like will be more specifically described.

FIG. 6A to FIG. 6E are diagrams illustrating an example of a correspondence relation of the phone data according to the embodiment. More specifically, FIG. 6A illustrates an example of the outgoing call history data stored in the mobile phone 10. Furthermore, FIG. 6B illustrates an example of the phone book data stored in the mobile phone 10. Furthermore, FIG. 6C illustrates an example of the specific data stored in the mobile phone 10. Furthermore, FIG. 6D illustrates an example of the outgoing call history data stored or displayed in the hands-free apparatus 1. Furthermore, FIG. 6E illustrates an example of the specific data stored or displayed in the hands-free apparatus 1.

Furthermore, FIG. 7A and FIG. 7B are diagrams illustrating an example of the incoming call history data according to the present embodiment. More specifically, FIG. 7A illustrates an example of the incoming call history data stored in the mobile phone 10. Furthermore, FIG. 7B illustrates an example of the incoming call history data stored or displayed in the hands-free apparatus 1.

Furthermore, FIG. 8A and FIG. 8B are diagrams illustrating an example of the missed call history data according to the present embodiment. More specifically, FIG. 8A illustrates an example of the missed call history data stored in the mobile phone 10. Furthermore, FIG. 8B illustrates an example of the missed call history data stored or displayed in the hands-free apparatus 1.

The data transfer connection processing unit 2B receives the specific data including one or more item data composed of registered names and phone numbers illustrated in FIG. 6C from the mobile phone 10 and causes the working memory 6 or the storage memory 7 to store the received specific data.

Furthermore, the data transfer connection processing unit 2B receives the outgoing call history data including one or more item data composed of registered names, outgoing call phone numbers, and outgoing call dates and times illustrated in FIG. 6A from the mobile phone 10, and causes the working memory 6 or the storage memory 7 to store the received outgoing call history data.

Furthermore, the data transfer connection processing unit 2B receives the incoming call history data including one or more item data composed of registered names, incoming call phone numbers, and incoming call dates and times illustrated in FIG. 7A from the mobile phone 10, and causes the working memory 6 or the storage memory 7 to store the received incoming call history data.

Furthermore, the data transfer connection processing unit 2B receives the missed call history data including one or more item data composed of registered names, missed call phone numbers, and missed call dates and times illustrated in FIG. 8A from the mobile phone 10, and causes the working memory 6 or the storage memory 7 to store the received missed call history data.

Furthermore, the data transfer connection processing unit 2B receives the phone book data including one or more item data composed of registered names and phone numbers illustrated in FIG. 6B from the mobile phone 10, and causes the working memory 6 or the storage memory 7 to store the received phone book data.

When the incoming call history data, the outgoing call history data, and the missed call history data do not include the registered names in the mobile phone 10, the data transfer connection processing unit 2B may correlate the phone numbers included in the incoming call history data, the outgoing call history data, and the missed call history data and the registered names correlated with the phone numbers in the phone book data to add the registered names to the incoming call history data, the outgoing call history data, and the missed call history data and to cause the working memory 6 or the storage memory 7 to store the data with the added registered names.

Then, when there is a request to display the phone book data, the display control unit 2D causes the display unit 5 to display the phone data (the outgoing call history data, the incoming call history data, the missed call history data, the specific data, and the phone book data) stored in the working memory 6 or the storage memory 7. That is, the display control unit 2D can cause the display unit 5 to display the registered names transferred from the mobile phone 10 without reading the registered names from the phone book data stored in the working memory 6 or the storage memory 7.

Note that the incoming call history data, the outgoing call history data, and the missed call history data may be stored in the working memory 6 or the storage memory 7 without including the registered names. In such a case, the display control unit 2D displays the phone numbers included in the incoming call history data, the outgoing call history data, and the missed call history data and the registered names correlated with the phone numbers in the phone book data on the display unit 5 in correlation with each other.

When the hands-free connection unit 2A completes the HFP connection processing described at S10 in FIG. 4 and FIG. 5, the user can perform outgoing call processing and incoming call processing by operating the operating unit 14 of the hands-free apparatus 1 side.

After the data transfer connection processing unit 2B receives the outgoing call history data, the incoming call history data, and the missed call history data from the mobile phone 10 by the connection processing with the mobile phone 10 described in FIG. 4 and FIG. 5, the hands-free apparatus 1 or the mobile phone 10 may perform new outgoing call processing, new incoming call processing, or new missed call processing. Thereafter, in a case where the user makes a request to display the outgoing call history data, the incoming call history data, or the missed call history data by operating the operating unit 14, when a registered name corresponding to an outgoing call phone number, an incoming call phone number, or an missed call phone number subjected to the new outgoing call processing, incoming call processing, or missed call processing is present in the phone book data transferred from the mobile phone 10, the display control unit 2D causes the display unit 5 to display the registered name as illustrated in FIG. 6D, FIG. 7B, and FIG. 8B.

More specifically, it is assumed that the hands-free connection unit 2A has performed outgoing call processing to the phone number of "Ichiro Kato" as the new outgoing call processing. In such a case, when the registered name "Ichiro Kato" has been registered in the phone book data, the display control unit 2D reads the registered name "Ichiro Kato" from the phone book data and causes the display unit 5 to display the registered name as illustrated in FIG. 6D. Furthermore, in a case where there is a call from the phone number of "Ichiro Yoshimoto" as the new incoming call processing, when the incoming call phone number has been registered in the phone book data, the display control unit 2D reads the registered name "Ichiro Yoshimoto" from the phone book data and causes the display unit 5 to display the registered name as illustrated in FIG. 7B. Furthermore, when there is a new missed call from the phone number of "Saburo Watanabe," the display control unit 2D reads the registered name "Saburo Watanabe" from the phone book data and causes the display unit 5 to display the registered name as illustrated in FIG. 8B.

Note that preferably, the display control unit 2D individually displays the phone book data, the specific data, and the outgoing/incoming call history data included in the phone data. For example, as illustrated in FIG. 6D, FIG. 6E, FIG. 7B, and FIG. 8B, "tabs" that indicate each of the outgoing call history data, the phone book data, the incoming call history data, the missed call history data, and the specific data, and the like are displayed. Then, when a corresponding "tab" is selected, it is sufficient if the display control unit 2D displays phone data corresponding to the selected "tab". FIG. 6D illustrates a display example when the "tab" of the outgoing call history data is selected. FIG. 6E illustrates a display example when the "tab" of the specific data is selected. FIG. 7B illustrates a display example when the "tab" of the incoming call history data is selected. FIG. 8B illustrates a display example when the "tab" of the missed call history data is selected. Note that a display mode of the phone data is not limited to the mode in which selection is switched by the tab.

Furthermore, as illustrated in FIG. 6E, when displaying the specific data, the display control unit 2D preferably displays a mark indicating that the displayed data is the specific data. In FIG. 6E, for example, a star-shaped mark is displayed as the mark indicating that the displayed data is the specific data. Note that the mark indicating that the displayed data is the specific data is not limited to the star-shaped mark.

Furthermore, when there is a request to display all history data (all outgoing/incoming call history) that collectively displays the outgoing call history data, the incoming call history data, and the missed call history data in reverse chronological order, the display control unit 2D selects predetermined numbers of incoming call history data and missed call history data from a newer incoming call date and time or missed call date and time in the entire data regardless of whether the incoming call history data and the missed call history data are the same (duplicated) in the incoming call phone number or the missed call phone number, and causes the selected data to be displayed. Furthermore, regarding the outgoing call history data, the display control unit 2D selects only the latest outgoing call history data from outgoing call history data with the same (duplicated) outgoing call phone number, and causes the selected data to be displayed.

FIG. 9 is a diagram illustrating an example of the outgoing call history data, the incoming call history data, the missed call history data, and all history data according to the present embodiment. In the example illustrated in FIG. 9, the outgoing call phone number of "Taro Abe" is duplicated. In such a case, the display control unit 2D causes only the outgoing call history with the latest outgoing call date and time (outgoing call history data with an outgoing call date and time of 12:15 on August 10) among the outgoing call history of "Taro Abe" to be displayed, and prevents outgoing call history whose outgoing call date and time is not the latest from being displayed.

Next, a procedure in which the control unit 2 of the hands-free apparatus 1 receives the phone data from the mobile phone 10 and stores the phone data and a procedure in which the control unit 2 makes an outgoing call using the stored phone data will be described. Note that the outgoing call history data and the incoming call history data are described herein, but the same applies to the missed call history data and the specific data.

Figure 10:
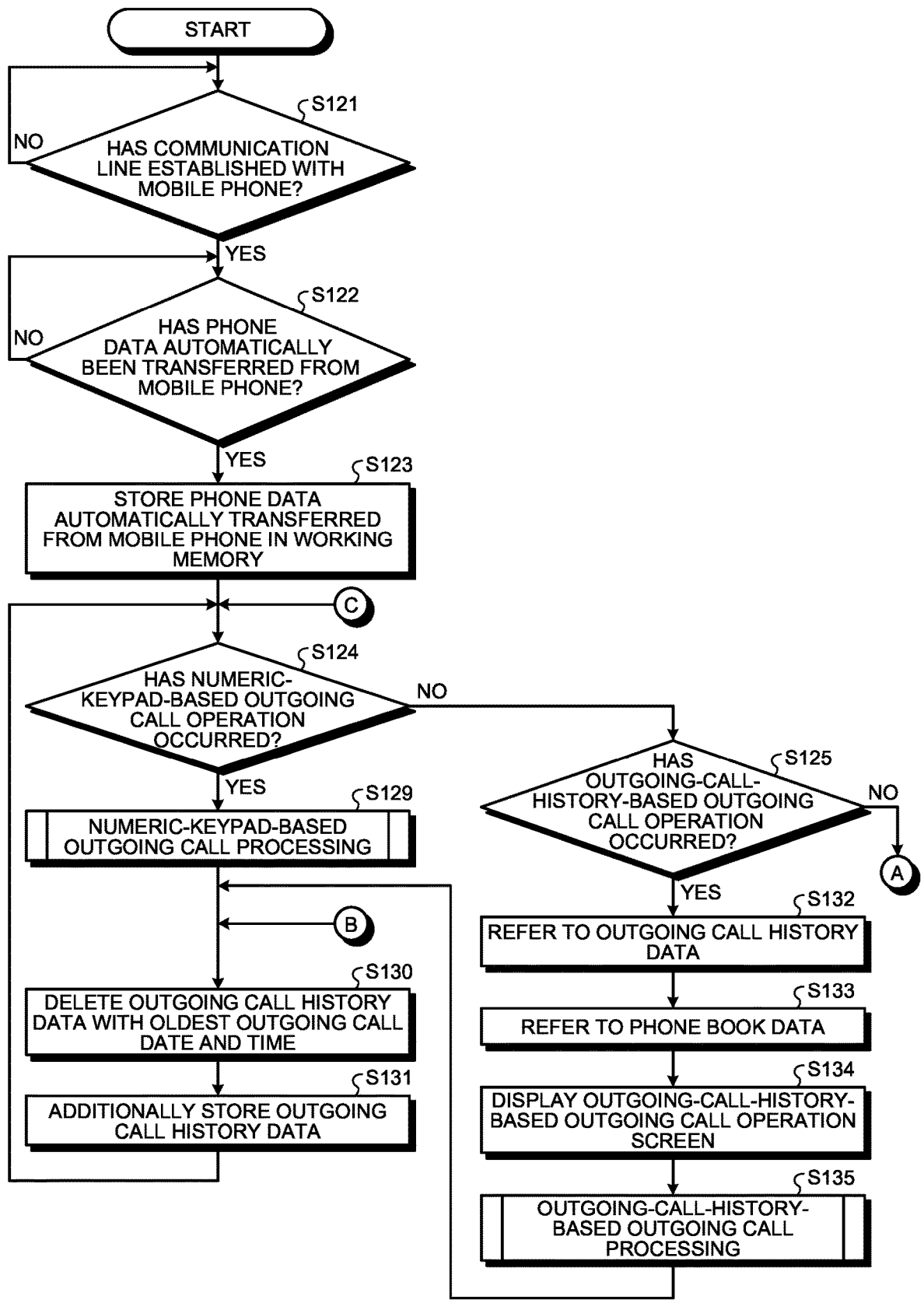
FIG. 10 is a diagram illustrating an example of the flow of a process for making an outgoing call according to the embodiment.
Figure 11:
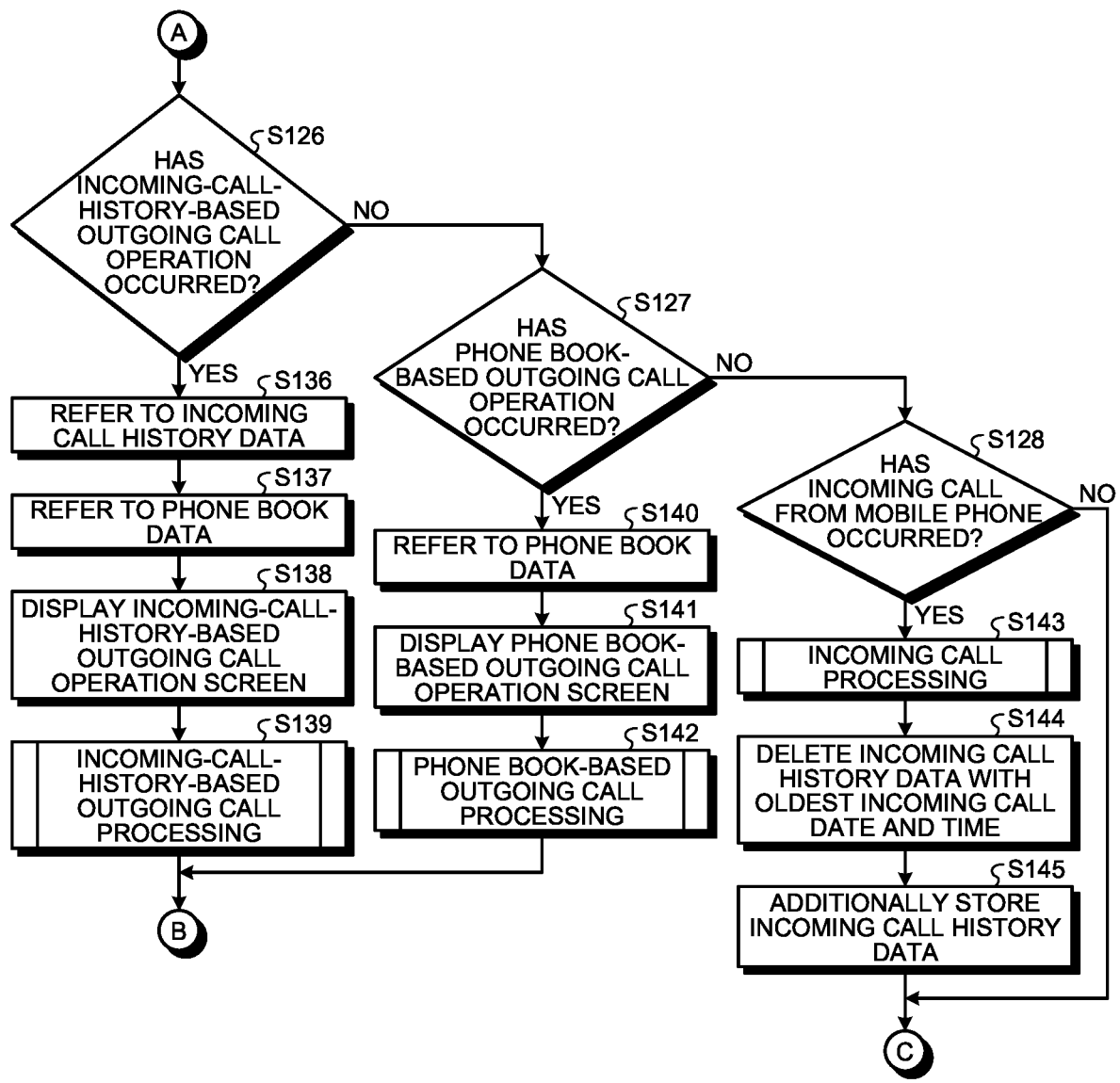
FIG. 11 is a diagram illustrating an example of the flow of a process for making an outgoing call according to the embodiment.
Figure 12:
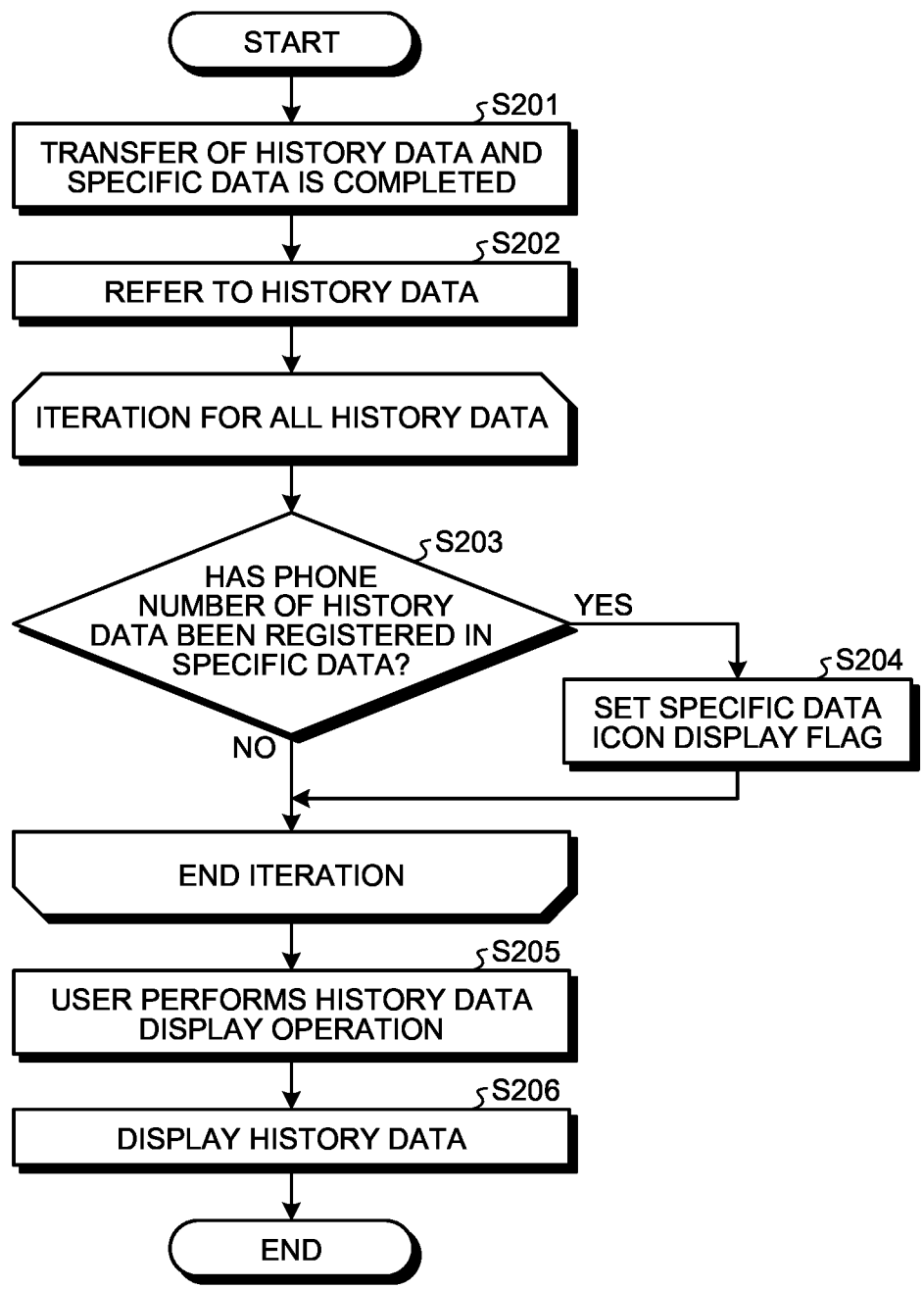
FIG. 12 is a diagram illustrating an example of the flow of an interrupt process according to the embodiment.
Figure 13:
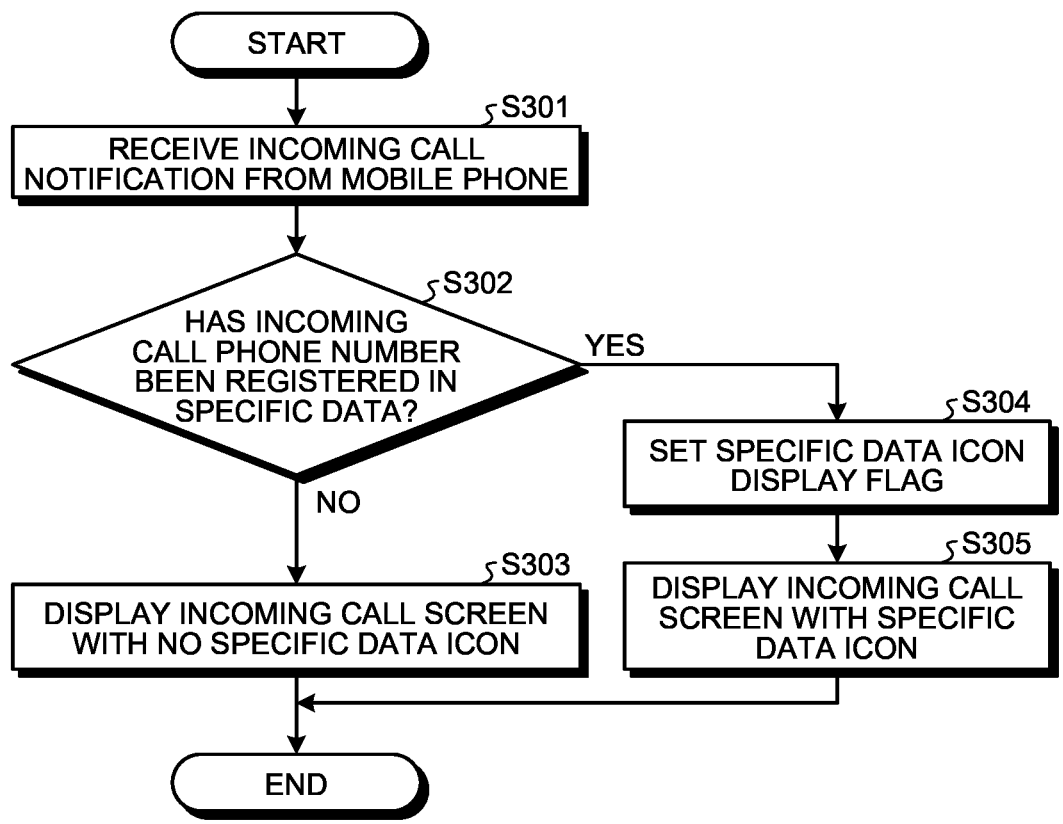
FIG. 13 is a diagram illustrating an example of the flow of an interrupt process according to the embodiment.

FIG. 10 and FIG. 11 are diagrams illustrating an example of the flow of a process for making an outgoing call by using the outgoing call history data, the incoming call history data, and the phone book data, which is performed by the hands-free apparatus 1 of the present embodiment. FIG. 12 and FIG. 13 are diagrams illustrating an example of the flow of an interrupt process in FIG. 10 and FIG. 11. Note that the processes performed by the hands-free apparatus 1 in FIG. 10 to FIG. 13 are, for example, processes implemented by the control unit 2 and the like described in FIG. 3.

Figure 16A:
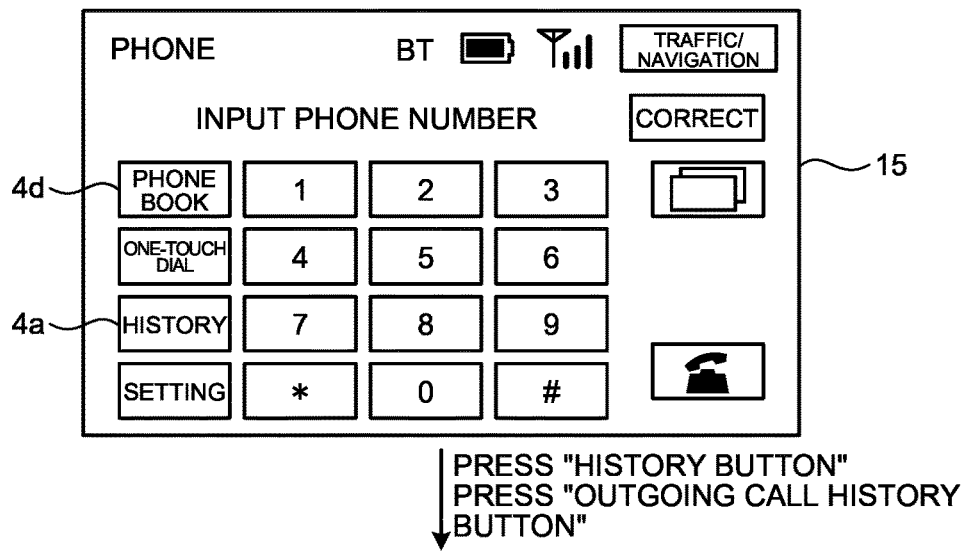
FIG. 16A is a diagram illustrating an example of transition of a display screen according to the embodiment.
Figure 16B:
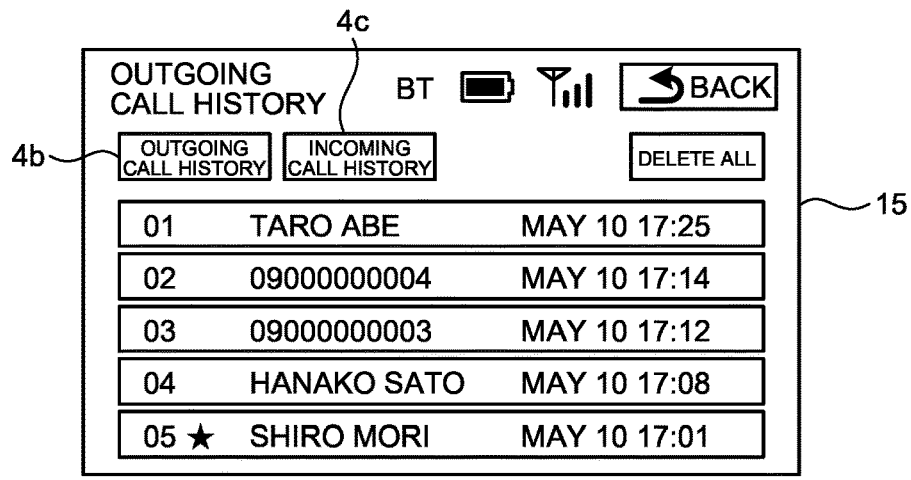
FIG. 16B is a diagram of illustrating an example of transition of a display screen according to the embodiment.
Figure 16C:
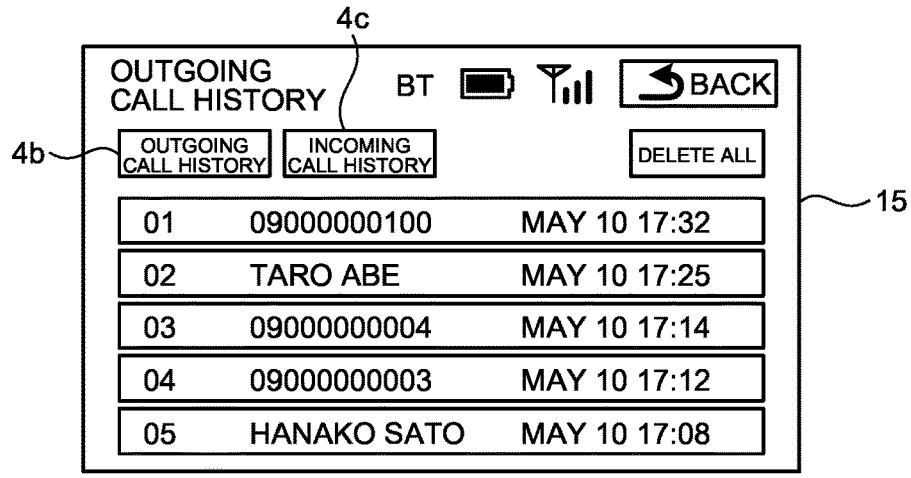
FIG. 16C is a diagram illustrating an example of transition of a display screen according to the embodiment.
Figure 17A:
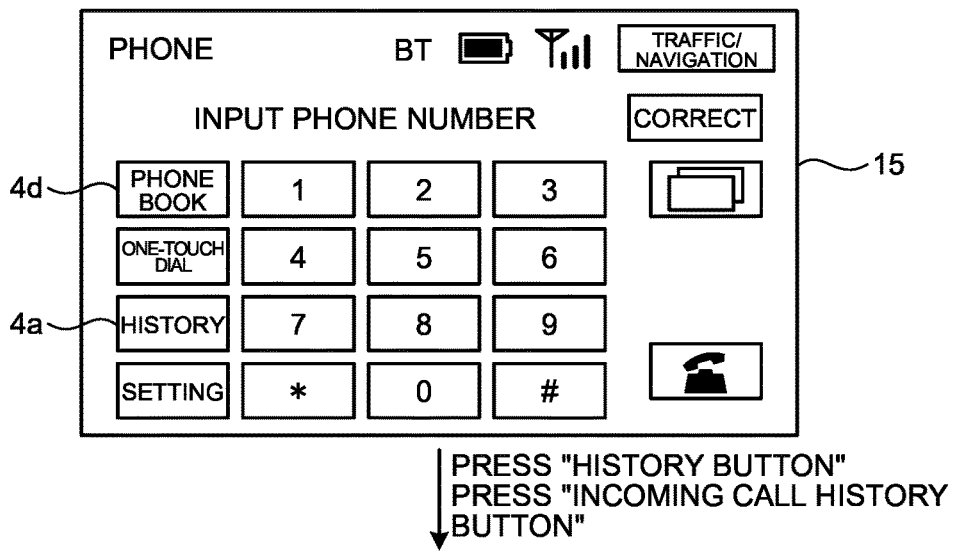
FIG. 17A is a diagram illustrating an example of transition of a display screen according to the embodiment.
Figure 17B:
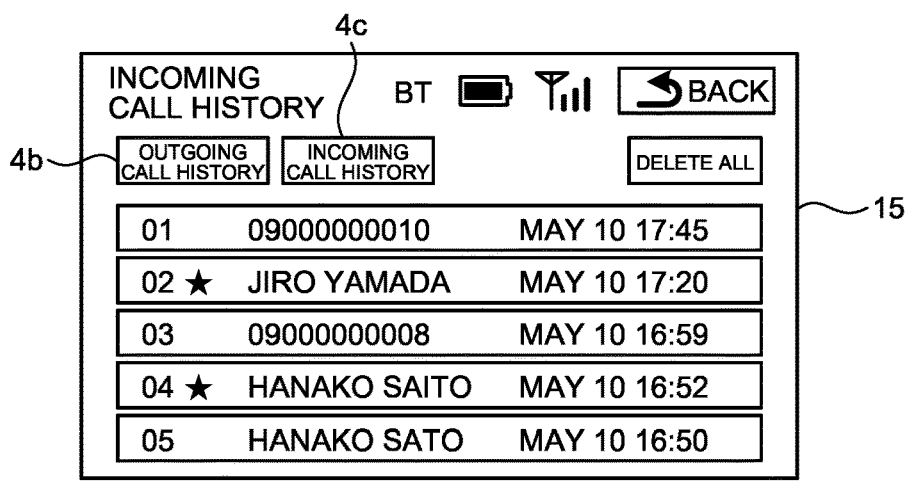
FIG. 17B is a diagram illustrating an example of transition of a display screen according to the embodiment.
Figure 17C:
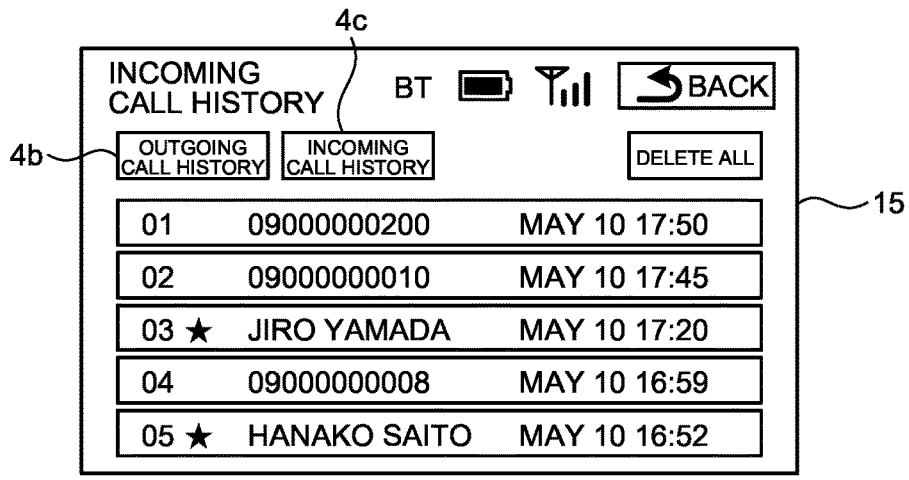
FIG. 17C is a diagram illustrating an example of transition of a display screen according to the embodiment.
Figure 18A:
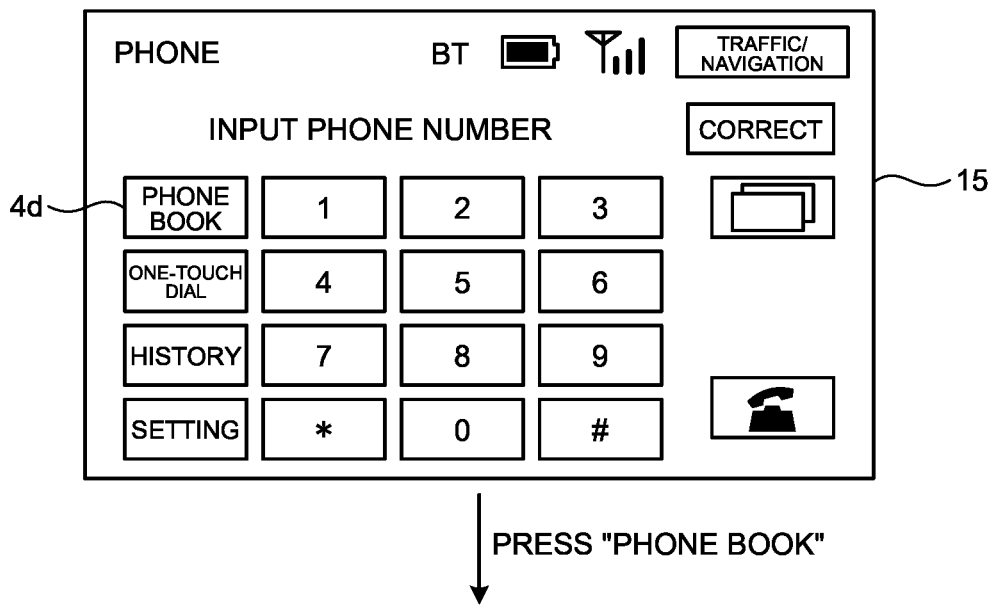
FIG. 18A is a diagram illustrating an example of transition of a display screen according to the embodiment.
Figure 18B:
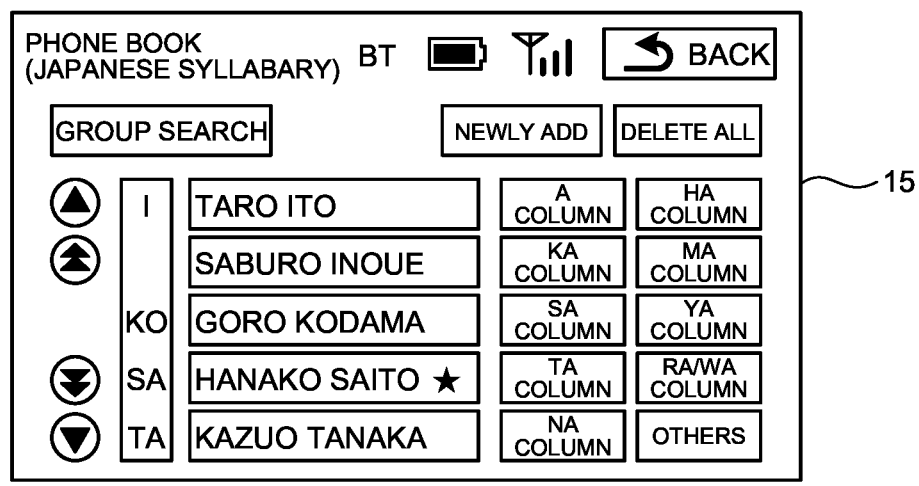
FIG. 18B is a diagram illustrating an example of transition of a display screen according to the embodiment.
Figure 20:
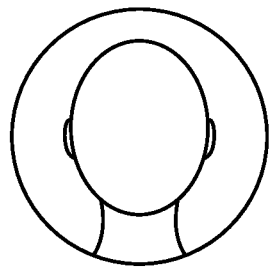
FIG. 20 is a diagram illustrating an example of a display screen according to the embodiment.

FIG. 14A and FIG. 14B to be described in FIG. 10 to FIG. 13 are diagrams illustrating an example of the outgoing call history data according to the present embodiment. Furthermore, FIG. 15A and FIG. 15B are diagrams illustrating an example of the incoming call history data according to the present embodiment. Furthermore, FIG. 16A to FIG. 16C are diagrams illustrating an example of transition of display screens when the user performs an outgoing call operation from the outgoing call history according to the present embodiment. Furthermore, FIG. 17A to FIG. 17C are diagrams illustrating an example of transition of display screens when the user performs an outgoing call operation from the incoming call history according to the present embodiment. Furthermore, FIG. 18A and FIG. 18B are diagrams illustrating an example of transition of display screens when the user performs an outgoing call operation from a phone book according to the present embodiment. FIG. 19 is a diagram illustrating an example of the phone book data according to the present embodiment. Furthermore, FIG. 20 is a diagram illustrating an example of a display screen when an incoming call occurs from a phone conversation destination specified by the item data included in the specific data.

Referring to the flowchart in FIG. 10, first, when it is determined that the mobile phone 10 is present within the Bluetooth coverage area of the hands-free apparatus 1 and the Bluetooth communication unit 3a has established a communication line with the mobile phone 10 (Yes at S121), the control unit 2 of the hands-free apparatus 1 waits for the phone data to be automatically transferred to the Bluetooth communication unit 3a from the mobile phone 10 (S122).

Then, when it is determined that the phone data have been automatically transferred from the mobile phone 10 (Yes at S122), the control unit 2 causes the working memory 6 or the storage memory 7 to store the phone data automatically transferred from the mobile phone 10 (S123).

It is assumed that the numbers of the outgoing call history data and the incoming call history data automatically transferred from the mobile phone 10 are each 20, for example. Furthermore, it is also assumed that the numbers of the outgoing call history data and the incoming call history data that can be stored in the working memory 6 are each five, for example. That is, the number of the outgoing call history data or the incoming call history data that can be stored in the working memory 6 is smaller than the number of the outgoing call history data or the incoming call history data automatically transferred from the mobile phone 10.

In such a case, for example, the control unit 2 discards outgoing call history data with an old outgoing call date and time among the outgoing call history data automatically transferred from the mobile phone 10, and causes the working memory 6 to preferentially store five outgoing call history data with new outgoing call dates and times among the 20 outgoing call history data automatically transferred from the mobile phone 10, as the mobile-phone-side outgoing call history data. Furthermore, the control unit 2 discards incoming call history data with an old incoming call date and time among the incoming call history data and causes the working memory 6 to preferentially store five incoming call history data with new incoming call dates and times among the 20 incoming call history data automatically transferred from the mobile phone 10, as the mobile-phone-side incoming call history data.

Immediately after the outgoing call history data is automatically transferred from the mobile phone 10, the control unit 2 stores the outgoing call history data illustrated in FIG. 14A as the outgoing call history data of the working memory 6. Furthermore, when the user performs an operation for displaying the outgoing call history data in this state, the control unit 2 causes the display unit 5 to display the display screen illustrated in FIG. 16B. Furthermore, immediately after the incoming call history data is automatically transferred from the mobile phone 10, the control unit 2 stores the incoming call history data illustrated in FIG. 15A as the incoming call history data of the working memory 6. When the user performs an operation for displaying the incoming call history data in this state, the control unit 2 causes the display unit 5 to display the display screen illustrated in FIG. 17B.

With this, when the mobile phone 10 and the hands-free apparatus 1 establish the Bluetooth communication line, the outgoing call history data and the incoming call history data stored by the mobile phone 10 before the Bluetooth communication line is established are automatically transferred to the working memory 6 of the hands-free apparatus 1 and the mobile phone 10 and the hands-free apparatus 1 constitute one phone system, so that the hands-free phone conversation can be performed by this phone system. Once the mobile phone 10 and the hands-free apparatus 1 constitute the one phone system in this way, the user can perform an outgoing call operation by selecting any one of a dial-key-input-based outgoing call operation, an outgoing-call-history-based outgoing call operation, an incoming-call-history-based outgoing call operation, and a phone book-based outgoing call operation, and can wait for an incoming call from the mobile phone network.

In the present embodiment, as a procedure for the Bluetooth communication, serial profile switching is performed, in which the PBAP-based wireless communication connection is made at S5 illustrated in the flowcharts of FIG. 4 and FIG. 5, the PBAP-based wireless communication is disconnected at S9, and then the HFP-based wireless communication connection is made at S10. Therefore, after the HFP-based wireless communication connection at S10, when there is a new incoming call to the mobile phone 10 or when new outgoing call processing is performed by the operating unit 14, the mobile phone 10 stores the incoming call history data and the outgoing call history data including the incoming call and the outgoing call in its own memory because the incoming call history data and the outgoing call history data are its own history data after all. Accordingly, the control unit 2 of the hands-free apparatus 1 can also perform the PBAP-based wireless communication again during the HFP-based wireless communication (simultaneous connection) in order to acquire the latest outgoing/incoming call history data from the mobile phone 10.

However, when the simultaneous connection is avoided as much as possible, if the HFP-based wireless communication connection is disconnected and the PBAP-based wireless communication connection is made in the serial connection, the mobile phone 10 and the hands-free apparatus 1, which constitute the one phone system for performing the hands-free phone conversation, are substantially separated from each other during that time, resulting in a state in which the hands-free phone conversation is not possible. In this regard, in the present embodiment, when the HFP-based wireless communication connection is made at S25, the hands-free apparatus 1 continues to self-acquire and self-manage the latest outgoing/incoming call history data only by the HFP-based wireless communication connection. This will be described below.

Returning back to the flowchart of FIG. 10, the control unit 2 determines whether the user has performed the dial-key-input-based outgoing call operation (S124) and determines whether the user has performed the outgoing-call-history-based outgoing call operation (S125). Subsequently, in the flowchart of FIG. 11, the control unit 2 determines whether the user has performed the incoming-call-history-based outgoing call operation (S126), determines whether the user has performed the phone book-based outgoing call operation (S127), and determines whether there is an incoming call from the mobile phone network (S128).

When it is determined that the user has performed the dial-key-input-based outgoing call operation (Yes at S124), the control unit 2 performs outgoing call processing for transmitting a phone number input by the user by the dial key as an outgoing call phone number (S129). Then, when the user ends the dial key input-based outgoing call processing, the control unit 2 deletes outgoing call history data with the oldest outgoing call date and time among the outgoing call history data stored in the working memory 6 at that time as illustrated in FIG. 14B (S130), and causes the working memory 6 to additionally store the latest outgoing call history data of the apparatus representing the dial key input-based outgoing call as self-outgoing call history data (S131).

That is, when the user operates the dial keys to input a phone number "09000000100," for example, and performs an operation for making an outgoing call using the phone number "09000000100" as an outgoing call phone number, the control unit 2 causes the working memory 6 to additionally store outgoing call history data representing the phone number "09000000100" as self-outgoing call history data as illustrated in FIG. 14B. In such a case, the control unit 2 stores, as a time stamp, a date and time acquired by the GPS device of the hands-free apparatus 1 as an outgoing call date and time corresponding to the phone number "09000000100". That is, in FIG. 14B, the outgoing call date and time of the latest phone number "09000000100" is the date and time acquired by the GPS device of the hands-free apparatus 1, and the outgoing call dates and times of the remaining four phone numbers are dates and times acquired by the timepiece unit of the mobile phone 10. Note that when the user performs an operation for displaying the outgoing call history data in this state, the control unit 2 causes the display unit 5 to display the display screen illustrated in FIG. 16C.

Furthermore, when it is determined that the user has performed the outgoing-call-history-based outgoing call operation by pressing a "history button" 4a and then pressing an "outgoing call history button" 4b (Yes at S125), the control unit 2 refers to the outgoing call history data stored in the working memory 6 (S132), refers to the phone book data stored in the working memory 6 (S133), and causes the display unit 5 to display an outgoing-call-history-based outgoing call operation screen as illustrated in FIG. 16B and FIG. 16C (S134). In such a case, when the outgoing call phone number of the outgoing call history data has been registered in the phone book data, the control unit 2 causes the display unit 5 to display a registered name corresponding to the phone number. On the other hand, when the outgoing call phone number of the outgoing call history data has not been registered in the phone book data, the control unit 2 causes the display unit 5 to display the phone number.

Next, the control unit 2 performs outgoing call processing for transmitting a phone number selected by the user as an outgoing call phone number (S135). Then, when the user ends the outgoing-call-history-based outgoing call processing, the control unit 2 also deletes outgoing call history data with the oldest outgoing call date and time among the outgoing call history data stored in the working memory 6 at that time (S130), and causes the working memory 6 to additionally store the latest outgoing call history data of the apparatus representing the outgoing-call-history-based outgoing call as self-outgoing call history data (S131). Also in such a case, the control unit 2 stores, as a time stamp, a date and time acquired by the GPS device of the hands-free apparatus 1 as an outgoing call date and time corresponding to the outgoing call phone number.

Furthermore, when it is determined that the user has performed the incoming-call-history-based outgoing call operation by pressing the "history button" 4a and then pressing an "incoming call history button" 4c (Yes at S126), the control unit 2 refers to the incoming call history data stored in the working memory 6 (S136), refers to the phone book data stored in the working memory 6 (S137), and causes the display unit 5 to display an incoming-call-history-based outgoing call operation screen as illustrated in FIG. 17B and FIG. 17C (S138). In such a case, when the outgoing call phone number of the incoming call history data has been registered in the phone book data, the control unit 2 causes the display unit 5 to display a registered name corresponding to the phone number. On the other hand, when the outgoing call phone number of the incoming call history data has not been registered in the phone book data, the control unit 2 causes the display unit 5 to display the phone number.

Next, the control unit 2 performs outgoing call processing for transmitting a phone number selected by the user as an outgoing call phone number (S139). Then, when the user ends the incoming-call-history-based outgoing call processing, the control unit 2 also deletes outgoing call history data with the oldest outgoing call date and time among the outgoing call history data stored in the working memory 6 at that time (S130), and causes the working memory 6 to additionally store the latest outgoing call history data of the apparatus representing the incoming-call-history-based outgoing call as self-outgoing call history data (S131). Also in such a case, the control unit 2 stores, as a time stamp, a date and time acquired by the GPS device of the hands-free apparatus 1 as an outgoing call date and time corresponding to the outgoing call phone number.

When it is determined that the user has performed the phone book-based outgoing call operation by pressing a "phone book" button 4d (Yes at S127), the control unit 2 refers to the phone book data stored in the working memory 6 (S140), and causes the display unit 5 to display a phone book-based outgoing call operation screen as illustrated in FIG. 18B (S141). Next, the control unit 2 performs outgoing call processing for transmitting a phone number selected by the user from the phone book-based outgoing call operation screen as an outgoing call phone number (S142). Then, when the user ends the phone book-based outgoing call processing, the control unit 2 also deletes outgoing call history data with the oldest outgoing call date and time among the outgoing call history data stored in the working memory 6 at that time (S130), and causes the working memory 6 to additionally store the latest outgoing call history data of the apparatus representing the phone book-based outgoing call as self-outgoing call history data (S131). Also in such a case, the control unit 2 stores, as a time stamp, a date and time acquired by the GPS device of the hands-free apparatus 1 as an outgoing call date and time corresponding to the outgoing call phone number.

Moreover, when it is determined via the Bluetooth communication unit 3a that there is an incoming call in the mobile phone 10 from the mobile phone network (Yes at S128), the control unit 2 performs incoming call processing such as announcement for announcing the incoming call (S143). When the incoming call processing ends, the control unit 2 deletes incoming call history data with the oldest incoming call date and time among the incoming call history data stored in the working memory 6 at that time (S144), and causes the working memory 6 to additionally store the latest incoming call history data of the apparatus representing the incoming call as self-incoming call history data (S145).

That is, when a phone number "09000000200" is received from the mobile phone network as an incoming call phone number via the Bluetooth communication unit 3a, the control unit 2 causes the working memory 6 to additionally store incoming call history data representing the phone number "09000000200" as self-incoming call history data.

By doing so, even though the PBAP-based wireless communication connection is not performed after the HFP-based wireless communication connection at S25, when there is new incoming call processing or outgoing call processing at S1 or later, the self-outgoing/incoming call history data can be added and displayed on the display unit 5. As a consequence, it is not necessary to perform HPF-and-PBAP simultaneous connection, and after the HFP-based wireless communication connection at S25, it is not necessary to disconnect the HFP-based wireless communication connection and to connect the PBAP-based wireless communication, so that it is possible to prevent the mobile phone 10 and the hands-free apparatus 1 constituting the one phone system from being substantially separated from each other.

Next, a display process of the outgoing/incoming call history data received by the PBAP-based wireless communication and the outgoing/incoming call history data generated by the outgoing call processing and the incoming call processing performed at S25 or later will be described.

In the HFP wireless-connection state at S25, the mobile phone 10 transmits the incoming call phone number to the hands-free apparatus 1 at the time of an incoming call, but does not transmit incoming call date and time information at this time. Therefore, the control unit 2 stores, as a time stamp, a date and time acquired by the GPS device of the hands-free apparatus 1 as an incoming call date and time corresponding to the phone number "09000000200". That is, in FIG. 15B, the incoming call date and time of the latest phone number "09000000200" is the date and time acquired by the GPS device of the hands-free apparatus 1, and the incoming call dates and times of the remaining four phone numbers are dates and times acquired by the timepiece unit of the mobile phone 10. Note that when the user performs an operation for displaying the incoming call history data in this state, the control unit 2 causes the display unit 5 to display the display screen illustrated in FIG. 17C.

The above has described a case where when the number of the outgoing call history data or the incoming call history data that can be stored in the working memory 6 is smaller than the number of the outgoing call history data or the incoming call history data automatically transferred from the mobile phone 10, outgoing call history data or incoming call history data with an old outgoing call date and time or incoming call date and time is discarded among the outgoing call history data or the incoming call history data automatically transferred from the mobile phone 10, and outgoing call history data or incoming call history data with a new outgoing call date and time or incoming call date and time is preferentially stored in the working memory 6 among the outgoing call history data or the incoming call history data automatically transferred from the mobile phone 10. However, the hands-free apparatus 1 may designate a number (five in the present embodiment) to be automatically transferred from the mobile phone 10 when the PBAP-based wireless communication connection is made, and causes the outgoing call history data or the incoming call history data with a new outgoing call date and time or incoming call date and time to be preferentially stored in the working memory 6.

Furthermore, the aforementioned configuration has described a case where when new outgoing call processing or new incoming call processing is performed in the hands-free apparatus 1, the oldest outgoing call history data or the oldest incoming call history data is deleted among the outgoing call history data or the incoming call history data stored in the working memory 6. However, from the viewpoint of the user, since there are following requests, the control unit 2 may perform alternative processing to be described below. This is processing required when the PBAP-based wireless communication connection is not made at S25 and later as in the present example.

That is, when comparing the date and time measured by the timepiece unit of the mobile phone 10 with the date and time acquired by the GPS device of the hands-free apparatus 1, the date and time measured by the timepiece unit of the mobile phone 10 may have a larger error and may not be accurate as compared with the date and time acquired by the GPS device, and can be arbitrarily set by the user. Thus, the user may intentionally set the date and time earlier or, conversely, later by a predetermined time (for example, 10 minutes).

Consequently, if the user sets the date and time of the mobile phone 10 earlier by the predetermined time and the hands-free apparatus 1 stores the set date and time in the working memory 6, when the outgoing call history data and the incoming call history data automatically transferred from the mobile phone 10 and the outgoing call history data and the incoming call history data of the hands-free apparatus 1 itself are rearranged in chronological order from this state, even though outgoing call history data or incoming call history data subjected to new outgoing call processing or new incoming call processing in the hands-free apparatus 1 is the latest on the time axis, the outgoing call history data or the incoming call history data is not displayed in the top column on a display screen in a list form and is displayed in a column other than the top column (for example, a second or third column). In such a case, the time axis kept in mind by the user and the time axis displayed by the display unit 5 may be deviated from each other, so that the user may feel uncomfortable.

In order to solve such a problem, the control unit 2 causes the outgoing call history data and the incoming call history data automatically transferred from the mobile phone 10 to be arranged in chronological order and displayed in columns other than the top column only within the range thereof, and causes the new outgoing call history data and the new incoming call history data of the apparatus to be displayed in the top column. With this, the outgoing call history data and the incoming call history data can be displayed in harmony with the time axis kept in mind by the user, so that the user can be prevented from feeling uncomfortable.

Note that in the case where the outgoing call history data and the incoming call history data automatically transferred from the mobile phone 10 are displayed so as to be arranged in chronological order, even though the outgoing call history data and the incoming call history data are sorted based on date and time data included therein, when the outgoing call history data and the incoming call history data include outgoing call order data representing an outgoing call order and incoming call order data representing an incoming call order, respectively, the control unit 2 may causes the outgoing call history data and the incoming call history data to be displayed side by side based on the outgoing call order data and the incoming call order data.

Furthermore, even when the outgoing call order data and the incoming call order data are not explicitly included, when data is transmitted from the mobile phone 10 in a list form as in FIG. 6A, FIG. 7A, and FIG. 8A and is received by the hands-free apparatus 1, the data may be displayed based on the rule that the data higher in the list is more recent. That is, the mobile phone 10 transmits the data in such a manner that an actual outgoing call order and incoming call order can be identified by the hands-free apparatus 1.

In such a case, for example, depending on the mobile phone 10, in a case where there is an incoming call from Mr. A at 12:00:00, and an incoming call from Mr. B at 12:00:30, when the time stamp is set to minutes instead of seconds, they are exactly the same 12:00, which are stored as the incoming call history data of the mobile phone 10. Then, even though these data are received by the hands-free apparatus 1 and sorted in chronological order, they are not ranked, and thus it is convenient for the mobile phone 10 side to add the outgoing call order data and the incoming call order data or transmit them in the list form described above. With this, the outgoing call history data and the incoming call history data can be displayed in harmony with the time axis kept in mind by the user, so that the user can be prevented from feeling uncomfortable.

In such cases, the date and time data included in the outgoing call history data and the incoming call history data is secondary, and the outgoing call order data and the incoming call order data described above are actual incoming call order and outgoing call order of the user. Note that the mobile phone 10 repeats the incoming call processing and the outgoing call processing in its single operation, but since it is its own single operation, the order of incoming and outgoing calls can be grasped and outgoing/incoming call history can be managed in that order. Therefore, regardless of the outgoing call date and time and the incoming call date and time by the own timepiece unit, the mobile phone 10 adds the outgoing call order data and the incoming call order data for each outgoing call and each incoming call, and transmits the data to the hands-free apparatus 1, and the hands-free apparatus 1 processes the outgoing/incoming call history data so as to be arranged based on the incoming call order data and the outgoing call order data. Alternatively, the aforementioned list formed with an actual outgoing call order and incoming call order determined by the mobile phone 10 without adding the outgoing call order data and the incoming call order data is transmitted to the hands-free apparatus 1, and the hands-free apparatus 1 processes the outgoing/incoming call history data so as to be arranged in the order of actual outgoing and incoming calls in accordance with the aforementioned rule.

By doing so, if the timepiece of the mobile phone 10 is set forward or backward at a certain timing, when an outgoing call or an incoming call occurs immediately after this, outgoing call history display and incoming call history display in the mobile phone 10 are displayed in an actual order. However, the outgoing call date and time and the incoming call date and time added to each data are different from this display order. Consequently, when such outgoing/incoming call history data is sorted by the hands-free apparatus 1 based on the outgoing call date and time and the incoming call date and time, they are displayed in an order different from the actual one. Therefore, it can be said that the method of the outgoing call order data and the incoming call order data or the list form method is convenient for arranging the outgoing/incoming call history data in the actual outgoing/incoming call orders.

As a consequence, the control unit 2 can display the data on the display unit 5 as the actual outgoing call order and incoming call order in the mobile phone 10. After performing such data processing, when performing the outgoing call processing by its own dial key input, the outgoing-call-history-based outgoing call processing, the incoming-call-history-based outgoing call processing, and the phone book data-based outgoing call processing as described above, the hands-free apparatus 1 deletes outgoing call history data with the oldest outgoing call order data or outgoing call history data with the outgoing call order data regarded as being the oldest among the outgoing call history data stored in the working memory 6 at that time, and causes the working memory 6 to additionally store the latest outgoing call history data of the apparatus representing the outgoing call by the outgoing call history as self-outgoing call history data. On the other hand, when new incoming call processing occurs, the control unit 2 deletes outgoing call history data with the oldest incoming call order data or incoming call history data with the incoming call order data regarded as being the oldest among the incoming call history data stored in the working memory 6 at that time, and causes the working memory 6 to additionally store the latest incoming call history data of the apparatus representing the incoming call by the incoming call history as self-incoming call history data.

In the case of these outgoing call processing and incoming call processing, the control unit 2 stores, as a time stamp, the date and time acquired by the GPS device of the hands-free apparatus 1 as the outgoing call date and time corresponding to the outgoing call phone number and the incoming call date and time corresponding to the incoming call phone number. With this, the outgoing call history data and the incoming call history data can be displayed in harmony with the time axis kept in mind by the user, so that the user can be prevented from feeling uncomfortable.

Furthermore, when there is a request to display all history data collectively representing the outgoing call history data and the incoming call history data, the control unit 2 requires a predetermined sorting process as compared with the case where only the outgoing call history data or only the incoming call history data is displayed. That is, in a case where the incoming call history data and the outgoing call history data are transmitted from the mobile phone 10 according to the actual time axis as described above so that the latest order including the outgoing call order data and the incoming call order data can be known or transmitted in the aforementioned list form without including these data, when displaying the received data in the order as notified not based on the outgoing call date and time and the incoming call date and time included in the received data as described above, the hands-free apparatus 1 displays the received data as the display order in the mobile phone 10 in the case of only the outgoing call history display and only the incoming call history display.

When displaying all history data, the hands-free apparatus 1 can grasp the latest data of the outgoing call history data and the latest data of the incoming call history data, but may have difficulty in actually specifying the latest one of the two latest data. In this regard, in the present example, when displaying all history data, the control unit 2 compares the outgoing call date and time included in the outgoing call history data and the incoming call date and time included in the incoming call history data and displays one with the latest date and time as the latest data. For example, in the case of five incoming call history data and five outgoing call history data, the control unit 2 sorts the ten data in the order of date and time and displays them in this order. Thus, in most cases, the outgoing call history data and the incoming call history data can be displayed in order almost as the actual time axis of the user. However, in a case where the time stamp function of the mobile phone 10 is up to "minutes," when there is an incoming call from Mr. A at 12:00:00 and an outgoing call is made to Mr. B at 12:00:30, the outgoing call date and time and the incoming call date and time are exactly the same 12:00. Thus, in such a case, the control unit 2 performs a predetermined sorting process such as displaying the outgoing call as the latest compared with the incoming call or vice versa.

Furthermore, when the latest order of three incoming call history data (A to C) received by the PBAP-based wireless communication can be grasped as described above, and the latest order of outgoing call history data (D to F) received by PBAP can be grasped, the control unit 2 compares the dates and times of the outgoing call history data and the incoming call history data as follows and performs a sorting process.

First, the control unit 2 compares the dates and times of A and D and sets the new one to be the first (for example, A) and then compares B and D and sets the new one to be the second (for example, B). Next, the control unit 2 compares C and D and sets the new one to be the third (for example, D) and then compares the dates and times of C and E and sets the new one to be the fourth (for example, C). Next, since E is the latest of the remaining E and F, the control unit 2 sets the fifth to E and sets the sixth to F. When the compared dates and times are the same, the control unit 2 sorts the incoming call history data and the outgoing call history data such that the outgoing call is preferential to the incoming call or vice versa according to a predetermined sorting rule.

Furthermore, in the mobile phone 10, when transferring the phone book data, it is necessary to convert a data format of the phone book data into a data format of "vCard" defined in the Bluetooth communication standard and to transfer the phone book data, and the phone book data is generally updated less frequently than the outgoing call history data and the incoming call history data. In this regard, the control unit 2 may first receive the outgoing call history data and the incoming call history data from the mobile phone 10 via the Bluetooth communication unit 3a and then receive the phone book data from the mobile phone 10 via the Bluetooth communication unit 3a. Furthermore, the control unit 2 may receive the outgoing call history data and the incoming call history data from the mobile phone 10 via the Bluetooth communication unit 3a and then receive the phone book data from the mobile phone 10 via the Bluetooth communication unit 3a only when the user performs a predetermined operation on the operating unit 14.

Furthermore, whether to transfer or automatically transfer the phone book data by such a user operation may be set by the user who selects manual transfer or automatic transfer in the hands-free apparatus 1, and a transfer process may be performed in accordance with this setting. In a state in which the setting for automatic transfer is set to "not transfer", it is possible to transfer only the phone book data by a manual transfer operation of the user after the HFP-based wireless connection at S9. However, by such a manual transfer operation, the HFP-based wireless communication connection at S9 is disconnected, and the PBAP-based wireless communication connection is made, and when the data transfer ends, the HFP-based wireless communication is again connected to the mobile phone 10 to enable the hands-free phone conversation.

When this "not transfer" is set, the outgoing call history data and the incoming call history data with high data update frequency can be received with a higher priority than the phone book data with low data update frequency. Furthermore, since data conversion is not required to transfer the outgoing call history data and the incoming call history data, but data conversion is required to transfer the phone book data, the outgoing call history data and the incoming call history data with a short transfer time can be received with higher priority than the phone book data with a long transfer time. By transferring only the outgoing call history data and the incoming call history data, it is possible to reduce the amount of data to be transferred. As a consequence, transfer protocol-based communication can be performed early, and subsequent hands-free protocol-based communication can be performed early. Thus, when the mobile phone is brought into a vehicle, it is possible to reduce the time until the hands-free phone conversation is performed. Moreover, whether to receive the phone book data with low data update frequency and long transfer time can be selected as needed, which can improve convenience.

In a case where the phone book data is transferred as needed by the user's manual transfer operation, when the transfer ends, the hands-free protocol-based communication is automatically performed. Thus, when an outgoing call is made using the phone book data, the hands-free phone conversation can be performed, which improves convenience. Moreover, when the phone book data is transferred by the manual transfer operation, only the phone book data may be stored in the nonvolatile storage memory 7, and the stored data may be read from the storage memory 7 at the time of the next startup of the hands-free apparatus 1 and be used as phone book data.

Furthermore, the control unit 2 may cause the working memory 6 to store the outgoing call history data, the incoming call history data, and the phone book data received from the mobile phone 10 in a distinguished manner for each mobile phone 10. In such a case, the control unit 2 correlates the mobile phone 10 and the data stored in the working memory 6 as follows, for example. That is, when the outgoing call history data, the incoming call history data, and the phone book data received from the mobile phone 10 are stored in the working memory 6, a link key is generated based on a mobile phone ID individually added to the mobile phone 10 and received from the mobile phone 10 and an apparatus ID individually added to the hands-free apparatus 1, and the generated link key is stored in the working memory 6 in correlation with various data. Thereafter, when the mobile phone ID is received from the mobile phone 10, the control unit 2 regenerates a link key based on the received mobile phone ID and the apparatus ID and updates various data stored in the working memory 6 in correlation with the generated link key.

Next, with reference to FIG. 12, the flow of the interrupt process in the processes of FIG. 10 and FIG. 11 will be described.

When the transfer of the outgoing/incoming call history data and the specific data to the hands-free apparatus 1 is completed (step S201), the display control unit 2D refers to the outgoing/incoming call history data (step S202). Then, the display control unit 2D performs processes of step S03 and step S204 for each of all the item data included in the transferred outgoing/incoming call history data.

Specifically, the display control unit 2D determines whether the item data included in the outgoing/incoming call history data has been registered in the specific data (step S203). When the item data has not been registered in the specific data (No at step S203), the present iterative process ends. When the item data has been registered in the specific data (Yes at step S203), the routine proceeds to step S204.

At step S204, the display control unit 2D adds a specific data icon display flag to the item data (step S204). The specific data icon display flag is a flag for displaying an icon indicating that the data is specific data.

The display control unit 2D performs the processes of step S203 and step S204 for each of a plurality of item data included in the outgoing/incoming call history data, thereby adding the specific data icon display flag to the item data registered as the specific data.

Next, it is assumed that a display instruction of the outgoing/incoming call history data is input by the operation of the operating unit 4 by the user (step S205). Step S205 corresponds to Yes at step S125 of FIG. 10 and Yes at step S126 of FIG. 11.

Then, the display control unit 2D, causes the display unit 5 to display the outgoing/incoming call history data while adding an icon indicating that the item data to which the specific data icon display flag has been added is specific data (step S206). Then, the present routine ends.

Therefore, as illustrated in FIG. 16B, FIG. 16C, FIG. 17B, and FIG. 17C, a mark indicating that the data is specific data is displayed on the item data that is the specific data. In FIG. 16B, FIG. 16C, FIG. 17B, and FIG. 17C, a star-shaped mark is illustrated as an example of the mark indicating that the data is specific data. Note that the mark indicating that the data is specific data is not limited to the star-shaped mark.

Note that also for the phone book data, the display control unit 2D may add the specific data icon display flag to the item data registered in the specific data. In such a case, it is assumed that a display instruction of the phone book data is input by the operation of the operating unit 4 by the user. This corresponds to Yes at step S127 of FIG. 11. The display control unit 2D causes the display unit 5 to display the phone book data to add the icon indicating that the data is specific data to item data to which the specific data icon display flag has been added.

Therefore, as illustrated in FIG. 18B, the mark (for example, the star-shaped mark) indicating that the data is specific data is displayed on the item data that is the specific data.

Note that it is sufficient if the display control unit 2D displays the item data to which the specific data icon display flag has been added in a display form indicating that item data is specific data; however, the present disclosure is not limited to the icon display. For example, the display control unit 2D may display the item data, to which the specific data icon display flag has been added, in a display form such as a color, blinking, and animation display that encourage the user's attention.

Next, with reference to FIG. 13, the flow of the interrupt process in the processes of FIG. 10 and FIG. 11 will be described.

It is assumed that the hands-free connection unit 2A receives an incoming call notification from the mobile phone 10 (step S301). Step S301 corresponds to Yes at step S128 of FIG. 11. In such a case, the display control unit 2D determines whether a received phone number has been registered in the specific data (step S302).

When the phone number has not been registered (No at step S302), the display control unit 2D displays an incoming call screen without a specific data icon on the display unit 5.

On the other hand, when the phone number has been registered (Yes at step S302), the display control unit 2D adds the specific data icon display flag to item data, in the incoming call history data, including the received phone number (step S304).

Then, the display control unit 2D displays an incoming call screen with an icon indicating that the data is specific data on the display unit 5 (step S305). Then, the present routine ends.

Therefore, as illustrated in FIG. 20, when an incoming call is received from a phone number registered as the specific data, an incoming call screen including the mark (for example, the star-shaped mark) indicating that the data is specific data is displayed.

Note that also for making an outgoing call from the mobile phone 10, when a phone number included in item data registered in the specific data is used as an outgoing call destination, the display control unit 2D may also display the incoming call screen including the mark indicating that the data is specific data on the display unit 5.

As described above, when an outgoing/incoming call to/from a phone conversation destination specified by the item data included in the specific data occurs in the mobile phone 10, the display control unit 2D displays phone conversation destination information of the phone conversation destination in a display form indicating that the information is specific data.

Therefore, it is possible to provide the user in an easy-to-understand manner that displayed data is the specific data.

Next, the HFP processing at S2 in the flowcharts of FIG. 4 and FIG. 5 described above will be described in detail. FIG. 21 is a flowchart illustrating details of the flow of the HFP processing according to the present embodiment.

When it is determined that a communication line has been established with the mobile phone 10 present within the Bluetooth coverage area, the hands-free connection unit 2A makes (starts up) the HFP-based wireless communication connection (S151) and determines whether the mobile phone 10 is in a phone conversation (S152). Note that whether the mobile phone 10 is in a phone conversation or on standby is notified by the HFP-based wireless communication, is received by the hands-free apparatus 1, and is determined by the received communication state. Note that S151 corresponds to the process of S2.

When it is determined that the mobile phone 10 is not in the phone conversation, that is, has been on standby waiting for an incoming call (No at S152), the hands-free connection unit 2A disconnects (ends) the connected HFP-based wireless communication (S154), and the data transfer connection processing unit 2B connects the PBAP-based wireless communication (S155). That is, when the mobile phone 10 is not in the phone conversation, the hands-free connection unit 2A quickly and automatically disconnects the connected HFP-based wireless communication and automatically connects the PBAP-based wireless communication, thereby causing the Bluetooth communication unit 3a to receive the outgoing call history data, the incoming call history data, and the phone book data transmitted from the mobile phone 10.

Furthermore, when it is determined that the mobile phone 10 is in the phone conversation (Yes at S152), the hands-free connection unit 2A maintains the HFP-based wireless communication in consideration of the possibility that a phone conversation may be executed as a hands-free phone conversation using the hands-free apparatus 1. Note that whether to perform this phone conversation basically depends on the mobile phone 10, and when the HFP-based wireless communication connection is made during the phone conversation of the mobile phone 10, received voice may be automatically transmitted to the Bluetooth communication unit 3a, or may be transmitted to the Bluetooth communication unit 3a by an operation of the mobile phone 10.

Then, the hands-free connection unit 2A determines whether the mobile phone 10 has ended the phone conversation (S153). When it is determined that the mobile phone 10 has ended the phone conversation (Yes at S153), the hands-free connection unit 2A disconnects (ends) the connected HFP-based wireless communication (No at S154). Then, the data transfer connection processing unit 2B connects the PBAP-based wireless communication (S155). That is, when the mobile phone 10 is in the phone conversation, the hands-free connection unit 2A disconnects the connected HFP-based wireless communication after the phone conversation ends and connects the PBAP-based wireless communication, thereby causing the Bluetooth communication unit 3a to receive the outgoing call history data, the incoming call history data, and the phone book data transmitted from the mobile phone 10 after the user ends the hands-free phone conversation. Note that S152 and S153 correspond to the process between S3 and S4.

When the mobile phone 10 is connected to the hands-free apparatus 1 in this way, the hands-free apparatus 1 determines whether the mobile phone 10 is in a phone conversation. When the mobile phone 10 is in the phone conversation, if the HFP-based wireless communication is switched to the PBAP-based wireless communication connection, since the phone conversation is not able to be shifted to a hands-free phone conversation, the HFP-based wireless communication is maintained and the PBAP-based wireless communication connection is not performed during the phone conversation of the mobile phone 10. When it is determined that the phone conversation has ended, the HFP-based wireless communication is disconnected, and the PBAP-based wireless communication connection is made. As a consequence, when the mobile phone 10 is holding a phone conversation alone, the phone conversation can be smoothly switched to the hands-free phone conversation.

Furthermore, the control unit 2 may receive incoming call history responded as the incoming call history data and non-responded incoming call (missed call) history from the mobile phone 10 and store them in a distinguished manner.

Figure 22A:
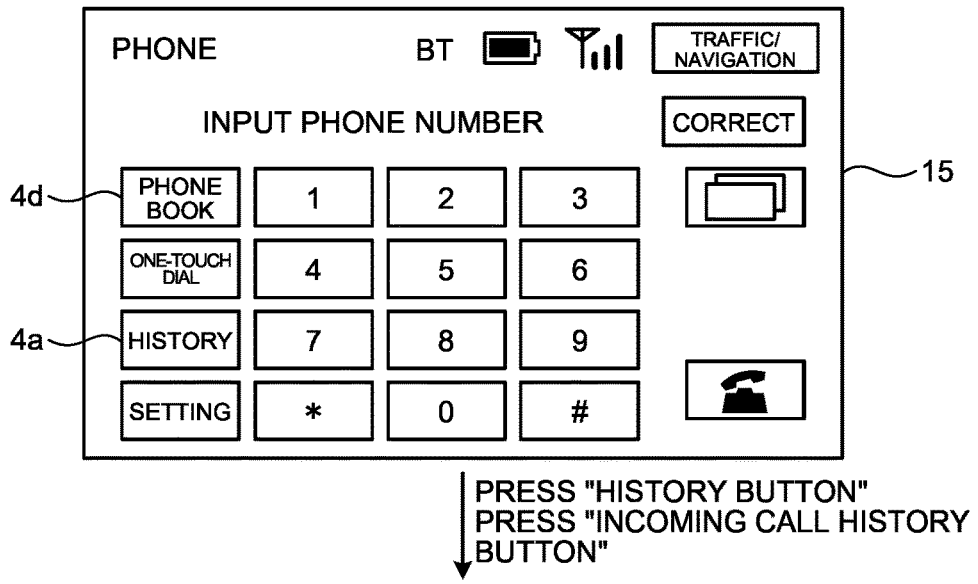
FIG. 22A is a diagram illustrating another example of transition of a display screen according to the embodiment.
Figure 22B:
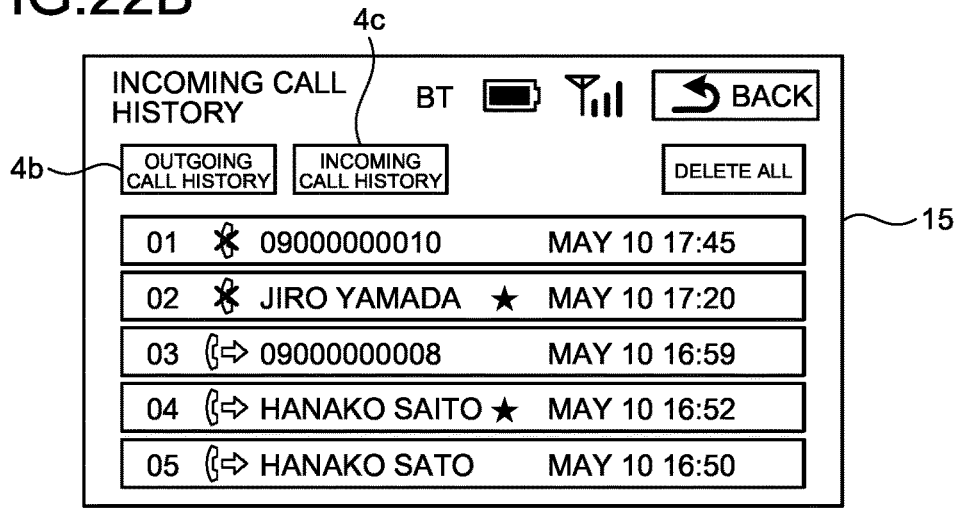
FIG. 22B is a diagram illustrating another example of transition of a display screen according to the embodiment.
Figure 22C:
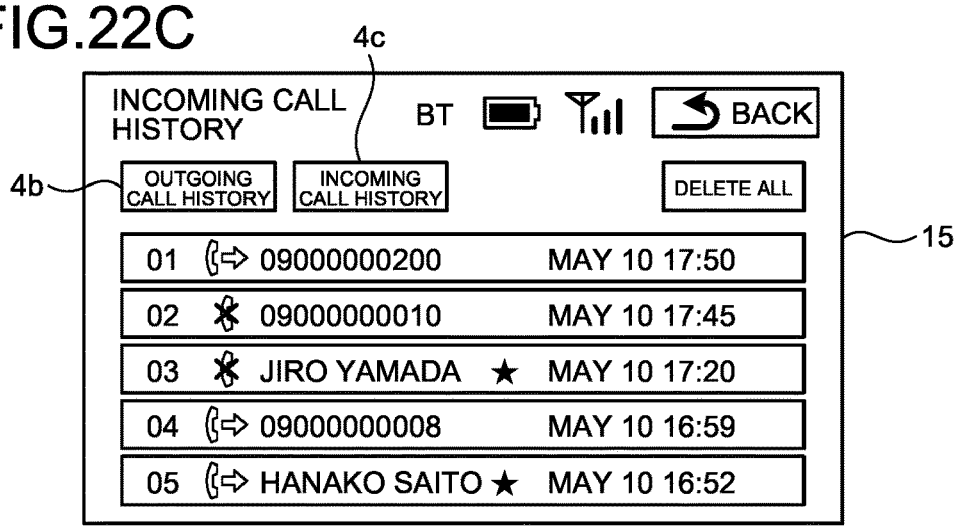
FIG. 22C is a diagram illustrating another example of transition of a display screen according to the embodiment.

FIG. 22A to FIG. 22C are diagrams illustrating an example of transition of a display screen when the user performs an outgoing call operation from the incoming call history according to the embodiment. It is assumed that the user presses the "history button" 4a and then presses the "incoming call history button" 4c. When it is determined that the user has performed the incoming-call-history-based outgoing call operation, the control unit 2 refers to the incoming call history data stored in the working memory 6, refers to the phone book data stored in the working memory 6, and causes the display unit 5 to display an incoming-call-history-based outgoing call operation screen as illustrated in FIGS. 22B and 22C.

In such a case, the display control unit 2D causes either an icon figure indicating a responded incoming call (a figure as a combination of a handset and an arrow) or an icon figure indicating a non-responded incoming call (a missed call) (a figure as a combination of a handset and a x mark) to be displayed for each data. Furthermore, the display control unit 2D causes the display unit 5 to display the mark (for example, the star-shaped mark) indicating that the data is specific data on the item data registered in the specific data.

Note that as described above, the phone data transferred from the mobile phone 10 may include the item data with the confidential flag indicating that the data is confidential data. In such a case, it is sufficient if the display control unit 2D performs display control for causing the item data, which is the confidential data, not to be displayed.

For example, it is assumed that the outgoing call history data, the incoming call history data, the missed call history data, the phone book data and the like may include the item data to which the confidential flag has been added. In such a case, at the time of display of outgoing call history, the incoming call history, the missed call history, and the phone book data, it is sufficient if the display control unit 2D displays item data, other than the item data to which the confidential flag has been added, on the display unit 5.

Furthermore, when there is an outgoing/incoming call to/from a phone conversation destination specified by the item data included in the confidential data, it is sufficient if the display control unit 2D performs display control for causing phone conversation destination information of the phone conversation destination not to be displayed. Specifically, for example, when receiving a call from a phone number registered as the confidential data, it is sufficient if the display control unit 2D displays an incoming call screen, in which at least one of a registered name and a phone number is hidden, on the display unit 5.

However, as described above, the hands-free apparatus 1 can simultaneously connect a plurality of profiles (multi-profile connection). The multi-profile connection is not limited to the simultaneous connection between the HFP and the PBAP, and for example, it is also possible to simultaneously connect the PBAP and the A2DP. Furthermore, since the hands-free apparatus 1 also includes the Wi-fi communication unit 3b as a part of the communication unit 3, the simultaneous connection between the PBAP and the Wi-fi or the simultaneous connection between the A2DP and the Wi-fi are also possible. Hereinafter, an example of a case, where the hands-free apparatus 1 simultaneously connects a plurality of wireless communications and transfers data, will be described with reference to FIG. 23 to FIG. 28.

Note that since details of the process for the HFP connection to the mobile phone 10, the automatic or manual transfer process of the phone data based on the PBAP connection, and the like are the same as those of the processes described with reference to FIG. 1 to FIG. 5, FIG. 6A to FIG. 6E, FIG. 7A and FIG. 7B, FIG. 8A and FIG. 8B, FIG. 9 to FIG. 13, FIG. 14A and FIG. 14B, FIG. 15A and FIG. 15B, FIG. 16A to FIG. 16C, FIG. 17A to FIG. 17C, FIG. 18A and FIG. 18B, FIG. 19 to FIG. 21, and FIG. 22A to FIG. 22C as an example, description thereof will be omitted here. Furthermore, processes to be described with reference to FIG. 23 to FIG. 28 may be performed in combination with the processes described with reference to FIG. 1 to FIG. 5, FIG. 6A to FIG. 6E, FIG. 7A and FIG. 7B, FIG. 8A and FIG. 8B, FIG. 9 to FIG. 13, FIG. 14A and FIG. 14B, FIG. 15A and FIG. 15B, FIG. 16A to FIG. 16C, FIG. 17A to FIG. 17C, FIG. 18A and FIG. 18B, FIG. 19 to FIG. 21, and FIG. 22A to FIG. 22C, and are not particularly limited.

FIG. 23 is a diagram illustrating an example of a processing flow in the case of connecting a plurality of wireless communications and transferring data according to the embodiment. FIG. 23 illustrates an example in which the hands-free apparatus 1 makes the PBAP connection and the A2DP connection with the mobile phone 10. Note that regarding the A2DP connection, the hands-free apparatus 1 may be configured to communicate with a different communication device than the mobile phone 10 by the A2DP connection.

The data transfer connection processing unit 2B makes the PBAP connection (first connection) with the mobile phone 10 (step S401). Subsequently, when attempting to start the transfer process (first data transfer process) of the phone data based on the PBAP connection, the transfer control processing unit 2C determines whether music playback based on the A2DP connection is being performed, that is, the transfer process (second data transfer process) of the music data is being performed (step S402).

When the data transfer connection processing unit 2B makes the A2DP connection (second connection) with the mobile phone 10 or the like and performs the transfer process (second data transfer process) of the music data, the transfer control processing unit 2C determines that the music playback based on the A2DP connection is being performed (Yes at step S402).

In such a case (Yes at step S402), the transfer control processing unit 2C performs transfer control for reducing (lowering) the communication speed in the transfer process (first data transfer process) of the phone data based on the PBAP connection (step S403). Alternatively, the transfer control processing unit 2C may perform transfer control for suspending communication for the transfer process of the phone data (step S403). Moreover, the display control unit 2D may make an announcement by causing the display unit 5 to display a message that there is a possibility of interference between communication based on the PBAP connection (first connection) and communication based on the A2DP connection (second connection).

The message to be displayed on the display unit 5 may be a message for announcing that the communication speed of the phone data transfer based on the PBAP connection is lowered or that the communication for the phone data transfer based on the PBAP connection is suspended. Alternatively, the display control unit 5 may present a button for cancelling the transfer of the phone data based on the PBAP connection, together with the display unit 5 configured as a touch panel.

Thereafter, the transfer control processing unit 2C determines whether the music playback based on the A2DP connection has stopped (step S404). When it is determined that the music playback based on the A2DP connection has not stopped (No at step S404), the transfer control processing unit 2C again determines whether the music playback based on the A2DP connection has stopped, after a predetermined time lapses.

Then, when it is determined that the music playback based on the A2DP connection has stopped (Yes at step S404), the transfer control processing unit 2C performs transfer control so that the transfer of the phone data based on the PBAP connection by the data transfer connection processing unit 2B is performed at the normal communication speed (step S405). That is, when the control for lowering the communication speed in the transfer process of the phone data is performed at step S403, the transfer control processing unit 2C performs control for increasing the lowered communication speed and returning the communication speed to the normal communication speed. Furthermore, when the control for suspending the communication for the transfer process of the phone data is performed at step S403, the transfer control processing unit 2C performs control so that the suspended communication is restarted and the phone data is transferred at the normal communication speed.

Note that the transfer control processing unit 2C may cause transferred phone data to be discarded when the control for causing the data transfer connection processing unit 2B to suspend the communication for the transfer process of the phone data has been performed at step S403, and cause the phone data to be transferred from the beginning when the suspended communication is restarted. Alternatively, the transfer control processing unit 2C may cause transferred phone data to be held when the control for causing the data transfer connection processing unit 2B to suspend the communication for the transfer process of the phone data has been performed at step S403, and cause remaining phone data, which has not been transferred, to be transferred when the suspended communication is restarted.

Furthermore, when the data transfer connection processing unit 2B does not perform the transfer process (second data transfer process) of the music data based on the A2DP connection (second connection) with the mobile phone 10 or the like, the transfer control processing unit 2C determines that the music playback based on the A2DP connection is not being performed (No at step S402).

Also in such a case (No at step S402), the transfer control processing unit 2C performs transfer control so that the transfer of the phone data based on the PBAP connection by the data transfer connection processing unit 2B is performed at the normal communication speed (step S405).

FIG. 24 is a diagram illustrating an example of a processing flow in the case of connecting a plurality of wireless communications and transferring data according to the embodiment. FIG. 24 illustrates an example in which the hands-free apparatus 1 makes the PBAP connection and the A2DP connection with the mobile phone 10. Note that regarding the A2DP connection, the hands-free apparatus 1 may be configured to communicate with a different communication device than the mobile phone 10 by the A2DP connection.

The data transfer connection processing unit 2B makes the A2DP connection (second connection) with the mobile phone 10 in order to start data transfer for music playback (step S501). Subsequently, when attempting to start data transfer (second data transfer process) for music playback based on the A2DP connection, the transfer control processing unit 2C determines whether communication for the transfer process (first data transfer process) of the phone data based on the PBAP connection is being performed (step S502).

When the data transfer connection processing unit 2B makes the PBAP connection (first connection) with the mobile phone 10 or the like and performs the transfer process (first data transfer process) of the phone data, the transfer control processing unit 2C determines that the communication for the transfer process of the phone data based on the PBAP connection is being performed (Yes at step S502).

In such a case (Yes at step S502), the transfer control processing unit 2C performs transfer control for reducing (lowering) the communication speed in the transfer process (first data transfer process) of the phone data based on the PBAP connection (step S503). Alternatively, the transfer control processing unit 2C may perform transfer control for suspending the communication for the transfer process of the phone data (step S503). On the other hand, the data transfer connection processing unit 2B performs the data transfer process for the music playback based on the A2DP connection.

Thereafter, the transfer control processing unit 2C determines whether the music playback based on the A2DP connection has stopped (step S504). When it is determined that the music playback based on the A2DP connection has not stopped (No at step S504), the transfer control processing unit 2C again determines whether the music playback based on the A2DP connection has stopped, after a predetermined time lapses.

Then, when it is determined that the music playback based on the A2DP connection has stopped (Yes at step S504), the transfer control processing unit 2C performs transfer control so that the transfer of the phone data based on the PBAP connection by the data transfer connection processing unit 2B is performed at the normal communication speed (step S505). That is, when the control for lowering the communication speed in the transfer process of the phone data is performed at step S503, the transfer control processing unit 2C performs control for increasing the lowered communication speed and returning the communication speed to the normal communication speed. Furthermore, when the control for suspending the communication for the transfer process of the phone data is performed at step S503, the transfer control processing unit 2C performs control so that the suspended communication is restarted and the phone data is transferred at the normal communication speed.

Note that the transfer control processing unit 2C may cause transferred phone data to be discarded when the control for causing the data transfer connection processing unit 2B to suspend the communication for the transfer process of the phone data has been performed at step S503, and cause the phone data to be transferred from the beginning when the suspended communication is restarted. Alternatively, the transfer control processing unit 2C may cause transferred phone data to be held when the control for causing the data transfer connection processing unit 2B to suspend the communication for the transfer process of the phone data has been performed at step S503, and cause remaining phone data, which has not been transferred, to be transferred when the suspended communication is restarted.

Furthermore, when the data transfer connection processing unit 2B does not perform the transfer process (first data transfer process) of the phone data based on the PBAP connection (first connection) with the mobile phone 10 or the like, the transfer control processing unit 2C determines that the communication for the transfer process of the phone data based on the PBAP connection is not being performed (No at step S502). In such a case (No at step S502), the transfer control processing unit 2C starts the data transfer for the music playback by the data transfer connection processing unit 2B as is.

Figure 25:
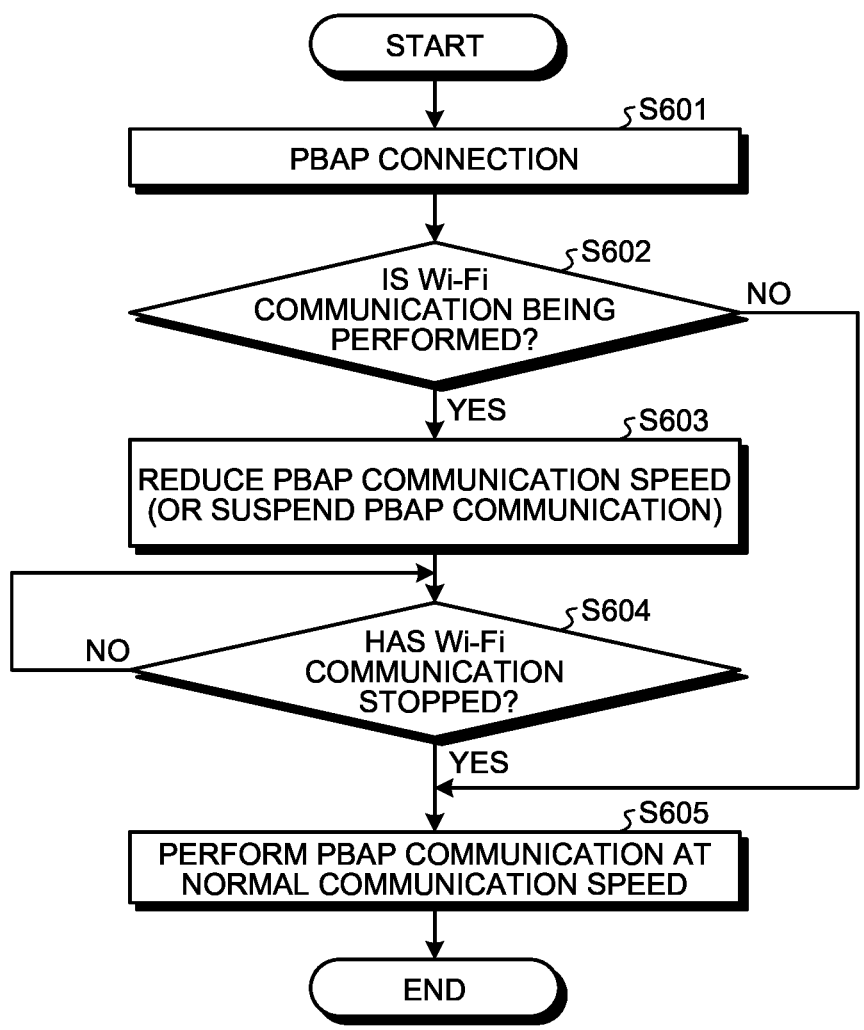
FIG. 25 is a diagram illustrating an example of a processing flow in the case of connecting a plurality of wireless communications and transferring data according to the embodiment.

FIG. 25 is a diagram illustrating an example of a processing flow in the case of connecting a plurality of wireless communications and transferring data according to the embodiment. FIG. 25 illustrates an example in which the hands-free apparatus 1 makes the PBAP connection and the Wi-fi connection with the mobile phone 10. Note that regarding the Wi-fi connection, the hands-free apparatus 1 may be configured to communicate with a different communication device than the mobile phone 10 by the Wi-fi connection.

The data transfer connection processing unit 2B makes the PBAP connection (first connection) with the mobile phone 10 (step S601). Subsequently, when attempting to start the transfer process (first data transfer process) of the phone data based on the PBAP connection, the transfer control processing unit 2C determines whether communication based on the Wi-fi connection is being performed, that is, the transfer process (second data transfer process) of the content data or the like is being performed (step S602).

When the data transfer connection processing unit 2B makes the Wi-fi connection (second connection) with the mobile phone 10 or the like and performs the transfer process (second data transfer process) of the content data or the like, the transfer control processing unit 2C determines that the communication based on the Wi-fi connection is being performed (Yes at step S602).

In such a case (Yes at step S602), the transfer control processing unit 2C performs transfer control for reducing (lowering) the communication speed in the transfer process (first data transfer process) of the phone data based on the PBAP connection (step S603). Alternatively, the transfer control processing unit 2C may perform transfer control for suspending communication for the transfer process of the phone data (step S603). Moreover, the display control unit 2D may make an announcement by causing the display unit 5 to display a message that there is a possibility of interference between communication based on the PBAP connection (first connection) and communication based on the A2DP connection (second connection).

The message to be displayed on the display unit 5 may be a message for announcing that the communication speed of the phone data transfer based on the PBAP connection is lowered or that the communication for the phone data transfer based on the PBAP connection is suspended. Alternatively, the display control unit 5 may present a button for cancelling the transfer of the phone data based on the PBAP connection, together with the display unit 5 configured as a touch panel.

Thereafter, the transfer control processing unit 2C determines whether the communication based on the Wi-fi connection has stopped (step S604). When it is determined that the communication based on the Wi-fi connection has not stopped (No at step S604), the transfer control processing unit 2C again determines whether the communication based on the Wi-fi connection has stopped, after a predetermined time lapses.

Then, when it is determined that the communication based on the Wi-fi connection has stopped (Yes at step S604), the transfer control processing unit 2C performs transfer control so that the transfer of the phone data based on the PBAP connection by the data transfer connection processing unit 2B is performed at the normal communication speed (step S605). That is, when the control for lowering the communication speed in the transfer process of the phone data has been performed at step S603, the transfer control processing unit 2C performs control for increasing the lowered communication speed and returning the communication speed to the normal communication speed. Furthermore, when the control for suspending the communication for the transfer process of the phone data has been performed at step S603, the transfer control processing unit 2C performs control so that the suspended communication is restarted and the phone data is transferred at the normal communication speed.

Note that the transfer control processing unit 2C may cause transferred phone data to be discarded when the control for causing the data transfer connection processing unit 2B to suspend the communication for the transfer process of the phone data has been performed at step S603, and cause the phone data to be transferred from the beginning when the suspended communication is restarted. Alternatively, the transfer control processing unit 2C may cause transferred phone data to be held when the control for causing the data transfer connection processing unit 2B to suspend the communication for the transfer process of the phone data has been performed at step S603, and cause remaining phone data, which has not been transferred, to be transferred when the suspended communication is restarted.

Furthermore, when the data transfer connection processing unit 2B is not communicating with the mobile phone 10 or the like by the Wi-fi connection (second connection) and is not performing the transfer process (second data transfer process) of the content data, the transfer control processing unit 2C determines that the communication based on the Wi-fi connection is not being performed (No at step S602).

Also in such a case (No at step S602), the transfer control processing unit 2C performs transfer control so that the transfer of the phone data based on the PBAP connection by the data transfer connection processing unit 2B is performed at the normal communication speed (step S605).

Figure 26:
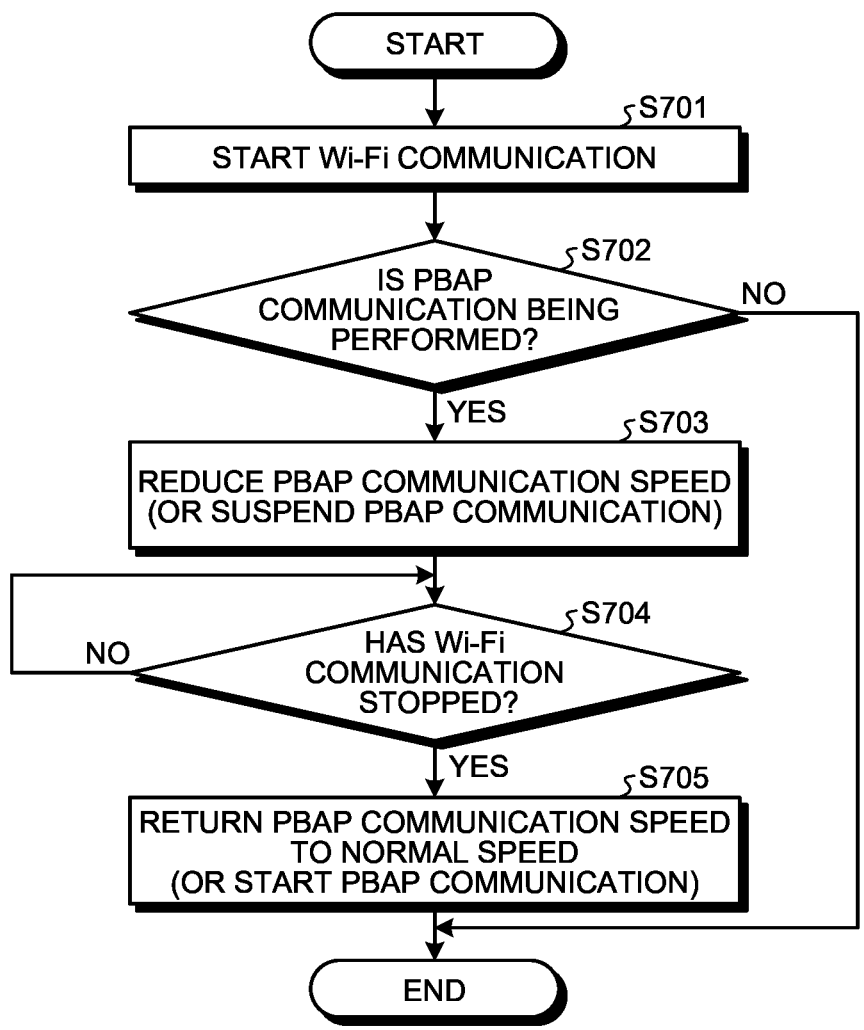
FIG. 26 is a diagram illustrating an example of a processing flow in the case of connecting a plurality of wireless communications and transferring data according to the embodiment.

FIG. 26 is a diagram illustrating an example of a processing flow in the case of connecting a plurality of wireless communications and transferring data according to the embodiment. FIG. 26 illustrates an example in which the hands-free apparatus 1 makes the PBAP connection and the Wi-fi connection with the mobile phone 10. Note that regarding the Wi-fi connection, the hands-free apparatus 1 may be configured to communicate with a different communication device than the mobile phone 10 by the Wi-fi connection.

The data transfer connection processing unit 2B makes the A2DP connection (second connection) with the mobile phone 10 in order to start data transfer for music playback (step S701). Subsequently, when attempting to start the transfer process (second data transfer process) of the content data based on the Wi-fi connection, the transfer control processing unit 2C determines whether communication for the transfer process (first data transfer process) of the phone data based on the PBAP connection is being performed (step S702).

When the data transfer connection processing unit 2B makes the PBAP connection (first connection) with the mobile phone 10 or the like and performs the transfer process (first data transfer process) of the phone data, the transfer control processing unit 2C determines that the communication for the transfer process of the phone data based on the PBAP connection is being performed (Yes at step S702).

In such a case (Yes at step S702), the transfer control processing unit 2C performs transfer control for reducing (lowering) the communication speed in the transfer process (first data transfer process) of the phone data based on the PBAP connection (step S703). Alternatively, the transfer control processing unit 2C may perform the transfer control for suspending the communication for the transfer process of the phone data (step S703). On the other hand, the data transfer connection processing unit 2B performs the transfer process of the content data based on the Wi-fi connection.

Thereafter, the transfer control processing unit 2C determines whether the communication for the content data transfer based on the Wi-fi connection has stopped (step S704). When it is determined that the communication for the content data transfer based on the Wi-fi connection has not stopped (No at step S704), the transfer control processing unit 2C again determines whether the communication for the content data transfer based on the Wi-fi connection has stopped, after a predetermined time lapses.

Then, when it is determined that the communication for the content data transfer based on the Wi-fi connection has stopped (Yes at step S704), the transfer control processing unit 2C performs transfer control so that the transfer of the phone data based on the PBAP connection by the data transfer connection processing unit 2B is performed at the normal communication speed (step S705). That is, when the control for lowering the communication speed in the transfer process of the phone data has been performed at step S703, the transfer control processing unit 2C performs control for increasing the lowered communication speed and returning the communication speed to the normal communication speed. Furthermore, when the control for suspending the communication for the transfer process of the phone data has been performed at step S703, the transfer control processing unit 2C performs control so that the suspended communication is restarted and the phone data is transferred at the normal communication speed.

Note that the transfer control processing unit 2C may cause transferred phone data to be discarded when the control for causing the data transfer connection processing unit 2B to suspend the communication for the transfer process of the phone data has been performed at step S703, and cause the phone data to be transferred from the beginning when the suspended communication is restarted. Alternatively, at step S703, the transfer control processing unit 2C may cause the transferred phone data to be held when the control for causing the data transfer connection processing unit 2B to suspend the communication for the transfer process of the phone data has been performed, and cause remaining phone data, which has not been transferred, to be transferred when the suspended communication is restarted.

Furthermore, when the data transfer connection processing unit 2B does not perform the transfer process (first data transfer process) of the phone data based on the PBAP connection (first connection) with the mobile phone 10 or the like, the transfer control processing unit 2C determines that the communication for the transfer process of the phone data based on the PBAP connection is not being performed (No at step S702). In such a case (No at step S702), the transfer control processing unit 2C starts the transfer process of the content data based on the Wi-fi connection by the data transfer connection processing unit 2B as is.

Figure 27:
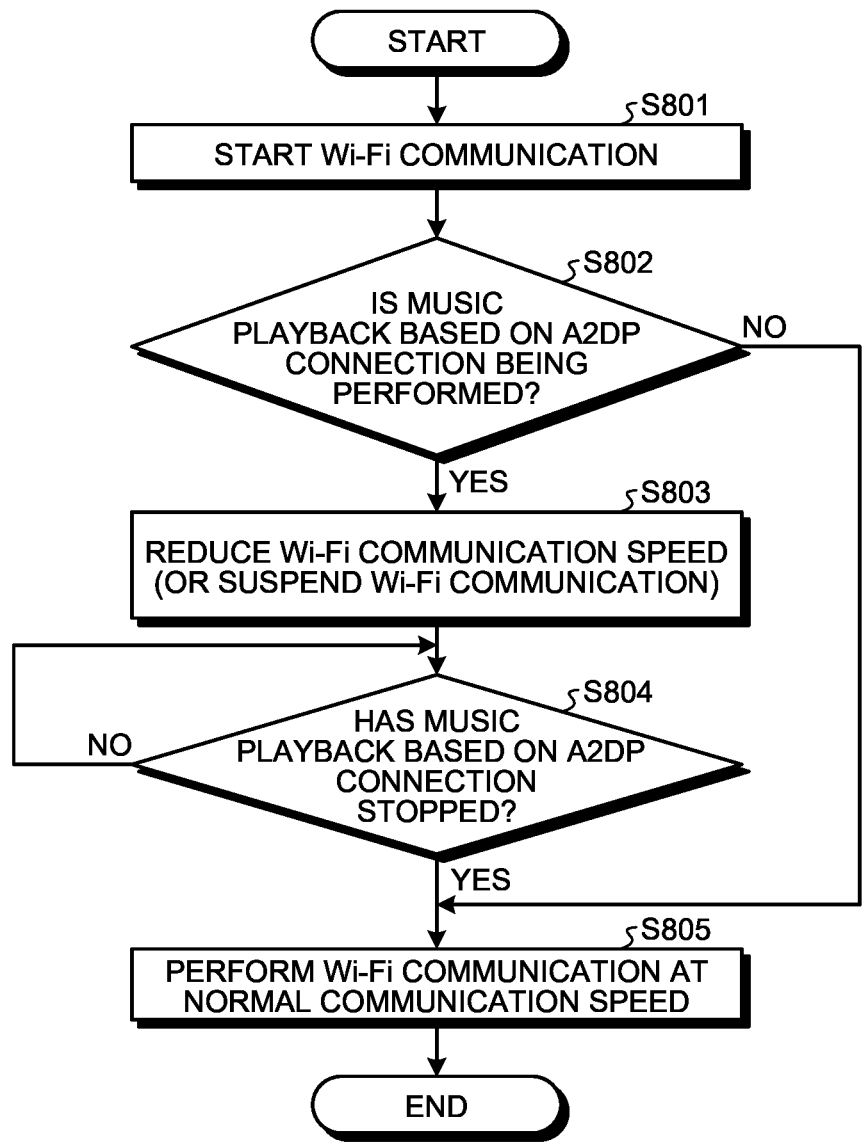
FIG. 27 is a diagram illustrating an example of a processing flow in the case of connecting a plurality of wireless communications and transferring data according to the embodiment.

FIG. 27 is a diagram illustrating an example of a processing flow in the case of connecting a plurality of wireless communications and transferring data according to the embodiment. FIG. 27 illustrates an example in which the hands-free apparatus 1 makes the A2DP connection and the Wi-fi connection with the mobile phone 10. Note that regarding the A2DP connection and the Wi-fi connection, the hands-free apparatus 1 may be configured to communicate with a different communication device than the mobile phone 10 by the A2DP connection and the Wi-fi connection. Furthermore, as described so far, the hands-free apparatus 1 has a function of performing the transfer process (first data transfer process) of the phone data based on the PBAP connection (first connection), but does not need to perform the transfer process of the phone data based on the PABAP connection when performing the process illustrated in FIG. 27.

The data transfer connection processing unit 2B makes the Wi-fi connection (second connection) with the mobile phone 10 or the like (step S801). Subsequently, when attempting to start the transfer process (second data transfer process) of the content data based on the Wi-fi connection, the transfer control processing unit 2C determines whether communication based on the A2DP connection (third connection) is being performed, that is, the transfer process (third data transfer process) of the music data or the like is being performed (step S802).

When the data transfer connection processing unit 2B makes the A2DP connection (third connection) with the mobile phone 10 or the like and performs the transfer process (third data transfer process) of the music data or the like, the transfer control processing unit 2C determines that music playback based on the A2DP connection is being performed (Yes at step S802).

In such a case (Yes at step S802), the transfer control processing unit 2C performs transfer control for reducing (lowering) the speed of the Wi-fi communication in the transfer process (second data transfer process) of the content data based on the Wi-fi connection (step S803). Alternatively, the transfer control processing unit 2C may perform transfer control for suspending the Wi-fi communication for the transfer process of the content data (step S803).

Thereafter, the transfer control processing unit 2C determines whether the communication for the music playback based on the A2DP connection has stopped (step S804). When it is determined that the communication for the music playback based on the A2DP connection has not stopped (No at step S804), the transfer control processing unit 2C again determines whether the communication for the music playback based on the A2DP connection has stopped, after a predetermined time lapses.

Then, when it is determined that the communication based on the A2DP connection has stopped (Yes at step S804), the transfer control processing unit 2C performs transfer control so that the transfer of the content data based on the Wi-fi connection by the data transfer processing unit 2B is performed at the normal communication speed (step S805). That is, when the control for lowering the Wi-fi communication speed in the transfer process of the content data has been performed at step S803, the transfer control processing unit 2C performs control for increasing the lowered Wi-fi communication speed and returning the communication speed to the normal communication speed. Furthermore, when the control for suspending the communication for the transfer process of the content data has been performed at step S803, the transfer control processing unit 2C performs control so that the suspended Wi-fi communication is restarted and the content data is transferred at the normal communication speed.

Furthermore, when the data transfer connection processing unit 2B is not communicating with the mobile phone 10 or the like by the A2DP connection and is not performing the transfer process of the music data, the transfer control processing unit 2C determines that the communication based on the A2DP connection is not being performed (No at step S802).

Also in such a case (No at step S802), the transfer control processing unit 2C performs transfer control so that the transfer of the content data based on the Wi-fi connection by the data transfer connection processing unit 2B is performed at a normal Wi-fi communication speed (step S805).

Note that in the example illustrated in FIG. 27, the configuration, in which the Wi-fi connection is made as the second connection, the data transfer process based on the Wi-fi connection is performed as the second data transfer process, the A2DP connection is made as the third connection, and the data transfer process based on the A2DP connection is performed as the third data transfer process, has been described.

However, a configuration may be employed in which the A2DP connection is made as the second connection, the data transfer process based on the A2DP connection is performed as the second data transfer process, the Wi-fi connection is made as the third connection, and the data transfer process based on the Wi-fi connection is performed as the third data transfer process. That is, in a case where the third transfer process based on the Wi-fi connection as the third connection is performed when the second transfer process based on the A2DP connection as the second connection is to be started, the transfer process based on the A2DP connection may be slowed down or may be suspended. Thereafter, after the transfer process based on the Wi-fi connection is ended, the transfer process based on the A2DP connection may be performed at the normal communication speed.

Figure 28:
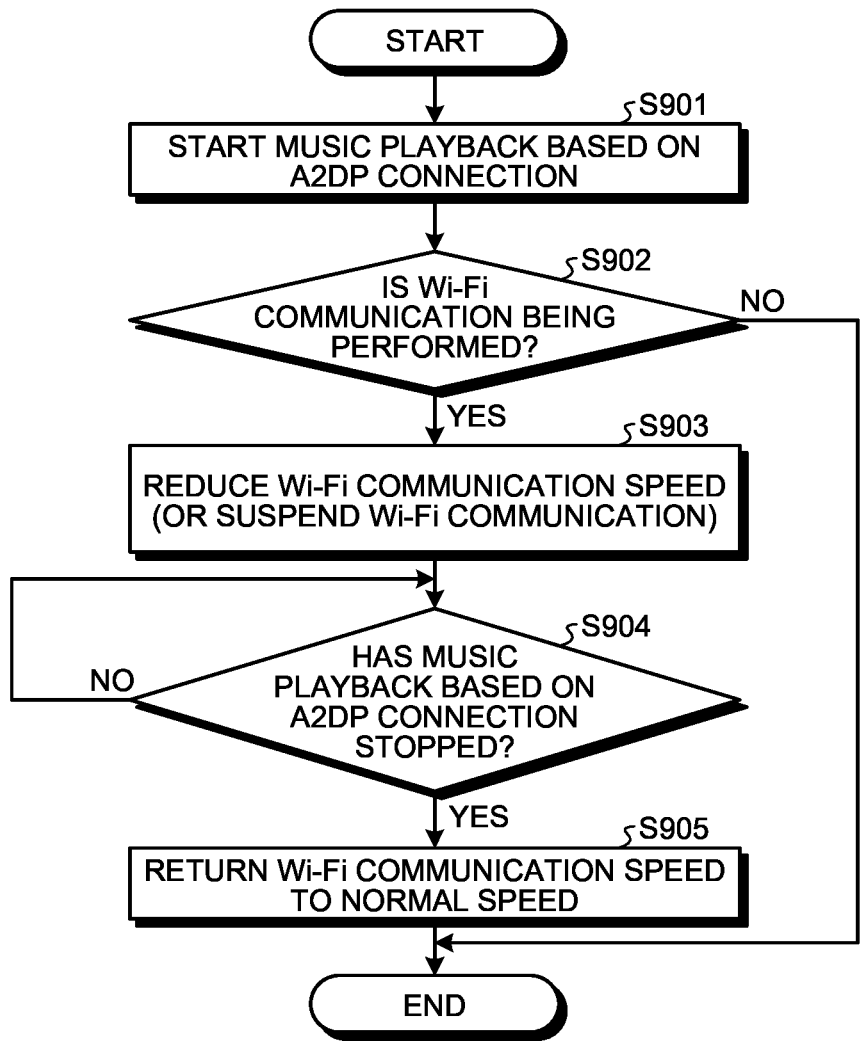
FIG. 28 is a diagram illustrating an example of a processing flow in the case of connecting a plurality of wireless communications and transferring data according to the embodiment.

FIG. 28 is a diagram illustrating an example of a processing flow in the case of connecting a plurality of wireless communications and transferring data according to the embodiment. FIG. 28 illustrates an example in which the hands-free apparatus 1 makes the A2DP connection and the Wi-fi connection with the mobile phone 10. Note that regarding the A2DP connection and the Wi-fi connection, the hands-free apparatus 1 may be configured to communicate with a different communication device than the mobile phone 10 by the A2DP connection and the Wi-fi connection. Furthermore, as described so far, the hands-free apparatus 1 has a function of performing the transfer process (first data transfer process) of the phone data based on the PBAP connection (first connection), but does not need to perform the transfer process of the phone data based on the PABAP connection when performing the process illustrated in FIG. 28.

The data transfer connection processing unit 2B makes the A2DP connection (third connection) with the mobile phone 10 or the like in order to start data transfer for music playback (step S901). Subsequently, when attempting to start the transfer process (third data transfer process) of the music data based on the A2DP connection, the transfer control processing unit 2C determines whether communication for the transfer process (second data transfer process) of the content data based on the Wi-fi connection is being performed (step S902).

When the data transfer connection processing unit 2B makes the Wi-fi connection (second connection) with the mobile phone 10 or the like and performs the transfer process (second data transfer process) of the content data, the transfer control processing unit 2C determines that the communication for the transfer process of the content data based on the Wi-fi connection is being performed (Yes at step S902).

In such a case (Yes at step S902), the transfer control processing unit 2C performs transfer control for reducing (lowering) the communication speed in the transfer process (second data transfer process) of the content data based on the Wi-fi connection (step S903). Alternatively, the transfer control processing unit 2C may perform transfer control for suspending the communication for the transfer process of the content data (step S903). On the other hand, the data transfer connection processing unit 2B performs the transfer process of the music data based on the A2DP connection.

Thereafter, the transfer control processing unit 2C determines whether the communication for the music data transfer based on the A2DP connection has stopped (step S904). When it is determined that the communication for the music data transfer based on the A2DP connection has not stopped (No at step S904), the transfer control processing unit 2C again determines whether the communication for the music data transfer based on the A2DP connection has stopped, after a predetermined time lapses.

Then, when it is determined that the communication for the music data transfer based on the A2DP connection has stopped (Yes at step S904), the transfer control processing unit 2C performs transfer control so that the transfer of the content data based on the Wi-fi connection by the data transfer connection processing unit 2B is performed at the normal communication speed (step S905). That is, when the control for lowering the Wi-fi communication speed in the transfer process of the content data has been performed at step S903, the transfer control processing unit 2C performs control for increasing the lowered Wi-fi communication speed and returning the communication speed to the normal communication speed. Furthermore, when the control for suspending the Wi-fi communication for the transfer process of the content data has been performed at step S903, the transfer control processing unit 2C performs control so that the suspended Wi-fi communication is restarted and the content data is transferred at the normal Wi-fi communication speed.

Furthermore, when the data transfer connection processing unit 2B does not perform the transfer process (second data transfer process) of the content data based on the Wi-fi connection (second connection) with the mobile phone 10 or the like, the transfer control processing unit 2C determines that the communication for the transfer process of the content data based on the Wi-fi connection is not being performed (No at step S902). In such a case (No at step S902), the transfer control processing unit 2C starts the transfer process of the music data based on the A2DP connection by the data transfer connection processing unit 2B as is.

Note that in the example illustrated in FIG. 28, the configuration, in which the Wi-fi connection is made as the second connection, the data transfer process based on the Wi-fi connection is performed as the second data transfer process, the A2DP connection is made as the third connection, and the data transfer process based on the A2DP connection is performed as the third data transfer process, has been described.

However, a configuration may be employed in which the A2DP connection is made as the second connection, the data transfer process based on the A2DP connection is performed as the second data transfer process, the Wi-fi connection is made as the third connection, and the data transfer process based on the Wi-fi connection is performed as the third data transfer process. That is, in a case where the second transfer process based on the A2DP connection as the second connection is performed when the third transfer process based on the Wi-fi connection as the third connection is to be started, the transfer process based on the A2DP connection may be slowed down or may be suspended. Thereafter, after the transfer process based on the Wi-fi connection is ended, the transfer process based on the A2DP connection may be performed at the normal communication speed.

As described above, the hands-free apparatus 1 of the present embodiment includes the hands-free connection unit 2A, the data transfer connection processing unit 2B, and the transfer control unit 2C. The hands-free connection unit 2A performs the hands-free connection process of connecting to the mobile phone 10 by using the hands-free communication protocol (HFP) for performing a hands-free phone conversation. The data transfer connection processing unit 2B performs the data transfer process of connecting to the mobile phone 10 by using the data transfer protocol (PBAP) for transferring the phone data related to phone, and causing the phone data to be transferred from the mobile phone 10. The transfer control unit 2C performs the transfer control related to the data transfer processes based on the PBAP connection or connections, other than the PBAP connection, according to the status of the data transfer process other than the PBAP connection.

In this way, the hands-free apparatus 1 of the present embodiment performs the transfer control related to the data transfer processes based on the PBAP connection or connections, other than the PBAP connection, according to the status of the data transfer process other than the PBAP connection.

With this, when a plurality of communication connections, other than the PBAP connection, are simultaneously made, for example, control for suspending transfer or reducing a transfer speed is performed for communication based on the PBAP connection or communication other than the PBAP connection, so that it is possible to restrain the influence of interference between a plurality of communications.

Consequently, the hands-free apparatus 1 of the present embodiment can reduce the deterioration of communication quality due to the simultaneous connection between a plurality of communications.

Note that the present embodiment has described the case where the outgoing call history data, the incoming call history data, and the phone book data transferred from the mobile phone 10 are stored in the working memory 6 and the case where the phone book data is stored in the storage memory 7; however, the outgoing call history data, the incoming call history data, and the phone book data transferred from the mobile phone 10 may be stored in the storage memory 7. In such a configuration, even when the power of the hands-free apparatus 1 is turned off, the outgoing call history data, the incoming call history data, and the phone book data stored in the storage memory 7 are retained.

Furthermore, the hands-free apparatus 1 of the present embodiment makes a serial connection, in which the HFP and the PBAP are time-divided, as a more reliable processing procedure in the HFP and the PBAP in order to eliminate the simultaneous connection between the HFP and the PBAP as much as possible. With this, it is possible to perform a communication process reliably and stably for mobile phones compatible with the HFP and the PBAP of many manufacturers. Furthermore, it is possible to perform processing of the PBAP and the HFP by a simple process without complicating the processing in the hands-free apparatus 1.

Furthermore, when making an outgoing call to the mobile phone network or receiving an incoming call from the mobile phone network at the time of the HFP-based wireless communication connection after PBAP-based wireless communication is disconnected, the hands-free apparatus 1 of the present embodiment deletes outgoing call history data and incoming call history data with the oldest outgoing call date and time and incoming call date and time among the outgoing call history data and the incoming call history data stored in the working memory 6 at that time, and causes the working memory 6 to additionally store the outgoing call history data and the incoming call history data of the apparatus. With this, whenever making an outgoing call to the mobile phone network or receiving an incoming call from the mobile phone network, it is possible to store the latest outgoing call history data and incoming call history data of the apparatus.

Furthermore, the hands-free apparatus 1 of the present embodiment establishes a communication line with the mobile phone 10, connects the HFP at S2, and then determines whether the mobile phone 10 is in a phone conversation. When the mobile phone 10 is in the phone conversation, the hands-free apparatus 1 connects the PBAP-based wireless communication and receives the outgoing call history data, the incoming call history data, and the phone book data from the mobile phone 10 after the phone conversation ends. With this, it is possible to perform a hands-free phone conversation without being affected by the influence due to the transfer of the outgoing call history data, the incoming call history data, and the phone book data from the mobile phone 10.

Furthermore, when the hands-free apparatus 1 of the present embodiment establishes a Bluetooth communication line with the mobile phone 10 and receives, from the mobile phone 10, outgoing call history data and incoming call history data stored in the mobile phone 10 before the Bluetooth communication line is established, the hands-free apparatus 1 stores the outgoing call history data and the incoming call history data in the working memory 6 in the same manner as the outgoing call history data and the incoming call history data of the apparatus and thereafter enables an outgoing call operation based on the outgoing call history data and the incoming call history data stored in the working memory 6. With this, a desired phone number can be selected from the outgoing call history data and the incoming call history data automatically transferred from the mobile phone 10 to make an outgoing call, and a desired phone number can be selected from the outgoing call history data and the incoming call history data of the apparatus to make an outgoing call, resulting in an increase in convenience.

Furthermore, when there is a display request for the outgoing call history data and the incoming call history data, if the same phone number as an outgoing/incoming call phone number stored as outgoing call history data and incoming call history data is stored in the working memory 6, the hands-free apparatus 1 of the present embodiment displays a registered name corresponding to the phone number. With this, the outgoing call history data and the incoming call history data received from the mobile phone 10 can be displayed by a registered name stored in the phone book data.

Furthermore, whenever an outgoing call processing is performed, the hands-free apparatus 1 of the present embodiment displays the outgoing call history data of the apparatus on a display screen, in which a list of outgoing call history data is displayed, as outgoing call history data with the latest outgoing call date and time. Furthermore, whenever an incoming call processing is performed, the hands-free apparatus 1 of the present embodiment displays the incoming call history data of the apparatus on a display screen, in which a list of incoming call history data is displayed, as incoming call history data with the latest incoming call date and time. With this, even when the date and time acquired by the mobile phone 10 and the date and time acquired by the hands-free apparatus 1 do not coincide with each other and the outgoing call date and time and the incoming call date and time of the outgoing call history data and the incoming call history data automatically transferred from the mobile phone 10 do not coincide with the outgoing call date and time and the incoming call date and time of the outgoing call history data and the incoming call history data of the apparatus on the time axis, it is possible to prevent the user from feeling uncomfortable due to the difference in dates and times between devices.

Furthermore, the hands-free apparatus 1 of the present embodiment distinguishes the outgoing call history data, the incoming call history data, and the phone book data for each mobile phone 10 and stores them in the working memory 6. With this, it is possible to manage the outgoing call history data, the incoming call history data, and the phone book data for each mobile phone 10. Furthermore, the hands-free apparatus 1 of the present embodiment distinguishes the outgoing call history data, the incoming call history data, and the phone book data for each mobile phone 10 and stores them in the storage memory 7. With this, it is not necessary to receive the phone book data from the mobile phone 10 whenever the apparatus is powered on, and the user can quickly use phone book data stored and retained corresponding to his/her mobile phone 10, so that it is possible to significantly improve convenience when using a phone book function.

Moreover, when the outgoing call history data, the incoming call history data, and the missed call history data are collectively displayed as all history data, the hands-free apparatus 1 of the present embodiment displays only a phone number with the latest outgoing call date and time for outgoing call history data having the same (duplicated) phone number. With this, it is possible to increase history information.

A computer program executed by the hands-free apparatus 1 of the aforementioned each embodiment is provided by being incorporated in a ROM and the like in advance. The computer program executed by the hands-free apparatus 1 of the aforementioned each embodiment may be configured to be provided by being recorded on a computer-readable recording medium, such as a CD-ROM, a flexible disk (FD), a CD-R, or a digital versatile disc (DVD), in an installable or executable file.

Moreover, the computer program executed by the hands-free apparatus 1 of the aforementioned each embodiment may be configured to be stored on a computer connected to a network such as the Internet and to be provided by being downloaded via the network. Furthermore, the computer program executed by the hands-free apparatus 1 of the aforementioned each embodiment may be configured to be provided or distributed via the network such as the Internet.

Other Embodiments

Although the embodiments have been described above, these embodiments have been presented by way of example only and are not intended to limit the scope of the present disclosure. The aforementioned novel embodiments can be implemented in various other forms, and various omissions, substitutions, and changes in the form of the embodiments described herein may be made without departing from the spirit of the inventions. The aforementioned embodiments are included in the scope or spirit of the present disclosure and are included in the accompanying claims and the equivalents thereof.

For example, the present invention is not limited to the aforementioned each embodiment and can be modified or extended as follows.

The hands-free apparatus 1 may be composed of a hands-free dedicated apparatus that mainly implements a hands-free function or may be an apparatus in which a hands-free function is installed in a vehicle audio apparatus for reproducing CDs or radio. Furthermore, the hands-free apparatus 1 may have a portable (portable type) configuration.

The present disclosure is not limited to the configuration in which the mobile phone 10 and the hands-free apparatus 1 perform Bluetooth communication, and may have a configuration of performing other near-field wireless communication or a configuration of performing wired communication.

The hands-free apparatus 1 may be configured to store the outgoing call history data, the incoming call history data, and the phone book data received from the mobile phone 10 in the storage memory 7, and to update and store the outgoing call history data, the incoming call history data, and the phone book data whenever outgoing call history data, incoming call history data, and phone book data are received from the mobile phone 10. Furthermore, the hands-free apparatus 1 may be configured to store the outgoing call history data, the incoming call history data, and the phone book data received from the mobile phone 10 in both the working memory 6 and the storage memory 7 and to use the storage memory 7 as a backup memory.

The number of the outgoing call history data or the incoming call history data that can be stored in the working memory 6 may be one. In such a case, when the hands-free apparatus 1 performs the outgoing call processing or the incoming call processing, the outgoing call history data or the incoming call history data received by the PBAP-based wireless communication connection is necessarily deleted.

Furthermore, the hands-free apparatus 1 simultaneously displays a plurality of outgoing call history data and a plurality of incoming call history data; however, they may be displayed one by one. In such a case, for example, the latest data may be displayed first, and then the second latest data may be displayed in order by an operation of the operating unit 14.

The number of the outgoing call history data or the incoming call history data that can be stored in the working memory 6 may be one. In such a case, when the hands-free apparatus 1 performs the outgoing call processing or the incoming call processing, the outgoing call history data or the incoming call history data received by the PBAP-based wireless communication connection is necessarily deleted.

The present disclosure is not limited to the configuration in which when the mobile phone 10 and the hands-free apparatus 1 establish a Bluetooth communication line, the outgoing call history data and the incoming call history data are automatically transferred, and may have a configuration in which the outgoing call history data, the incoming call history data, and the phone book data are transferred on condition that the user operates the hands-free apparatus 1 or the mobile phone 10.

When the outgoing call history data, the incoming call history data, and the phone book data received from the mobile phone 10 are distinguished for each mobile phone 10 and are stored in the working memory 6, the mobile phone 10 and the data stored in the working memory 6 may be correlated with each other by a method of generating the link key or by other methods.

Note that the computer program for executing the aforementioned processing in the aforementioned embodiments has a module configuration including each of the aforementioned functional units. As actual hardware, for example, a CPU (processor circuit) reads and executes an information processing program from a ROM or an HDD, so that each of the aforementioned functional units is loaded into a RAM (main memory) and is generated on the RAM (main memory). Note that a part or all of each of the aforementioned functional units can also be implemented using dedicated hardware such as an application specific integrated circuit (ASIC) and a field-programmable gate array (FPGA).

Although some embodiments of the present invention have been described, these embodiments have been presented by way of example only and are not intended to limit the scope of the invention. These embodiments may be embodied in a variety of other forms; furthermore, various omissions, substitutions and changes may be made without departing from the spirit of the invention. These embodiments and modifications thereof fall within the scope and the spirit of the invention and within the scope of the invention defined in the appended claims and equivalents thereof.

In accordance with the hands-free apparatus according to the present disclosure, the data transfer method, and the computer-readable medium according to the present disclosure, it is possible to reduce the deterioration of communication quality due to the simultaneous connection between a plurality of communications.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free apparatus, comprising:
a memory; and
a hardware processor coupled to the memory, the hardware processor being configured to:
perform a hands-free connection process of connecting to a mobile phone by using a hands-free communication protocol for performing a hands-free phone conversation;
perform a first data transfer process after making a first connection with the mobile phone by using a data transfer protocol for transferring phone data related to the mobile phone, and causing the phone data to be transferred from the mobile phone;
depending on a status of a different data transfer process than the first data transfer process, perform transfer control related to transfer by at least one of the first data transfer process and the different data transfer process;
make a second connection with the mobile phone or a different communication device, and perform a second data transfer process based on the second connection as the different data transfer process;
in a case where the first data transfer process is being performed when the second data transfer process is to be started, perform one of transfer control for lowering a transfer speed in the first data transfer process and transfer control for stopping the first data transfer process;
when performing the transfer control for stopping the first data transfer process that is being performed, cause the transferred phone data to be discarded; and
when performing transfer control for starting the first data transfer process after the second data transfer process is ended, cause the phone data to be transferred from a beginning.

2. The hands-free apparatus according to claim 1, wherein the hardware processor is configured to:
in a case where the second data transfer process is being performed when the first data transfer process is to be started, perform one of the transfer control for lowering the transfer speed in the first data transfer process and the transfer control for stopping the first data transfer process.

3. The hands-free apparatus according to claim 2, wherein the hardware processor is configured to: when the second data transfer process is ended, perform one of transfer control for increasing the transfer speed in the first data transfer process and transfer control for starting the first data transfer process.

4. The hands-free apparatus according to claim 1, wherein the hardware processor is configured to: when the second data transfer process is ended, perform one of transfer control for increasing the transfer speed in the first data transfer process and transfer control for starting the first data transfer process.

5. The hands-free apparatus according to claim 1, wherein the hardware processor is further configured to announce a message regarding possibility of interference between communication based on the first connection and communication based on the second connection in a case where the second data transfer process is being performed when the first data transfer process is to be started.

6. A hands-free apparatus, comprising:
a memory; and
a hardware processor coupled to the memory, the hardware processor being configured to:
   perform a hands-free connection process of connecting to a mobile phone by using a hands-free communication protocol for performing a hands-free phone conversation;
   perform a first data transfer process after making a first connection with the mobile phone by using a data transfer protocol for transferring phone data related to the mobile phone, and causing the phone data to be transferred from the mobile phone;
   depending on a status of a different data transfer process than the first data transfer process, perform transfer control related to transfer by at least one of the first data transfer process and the different data transfer process;
   make a second connection with the mobile phone or a different communication device, and perform a second data transfer process based on the second connection as the different data transfer process;
   in a case where the first data transfer process is being performed when the second data transfer process is to be started, perform one of transfer control for lowering a transfer speed in the first data transfer process and transfer control for stopping the first data transfer process;
   when performing the transfer control for stopping the first data transfer process that is being performed, cause the transferred phone data to be held; and
   when performing transfer control for starting the first data transfer process after the second data transfer process is ended, cause remaining phone data, which has not been transferred, to be transferred.

7. A hands-free apparatus, comprising:
a memory; and
a hardware processor coupled to the memory, the hardware processor being configured to:
   perform a hands-free connection process of connecting to a mobile phone by using a hands-free communication protocol for performing a hands-free phone conversation;
   perform a first data transfer process after making a first connection with the mobile phone by using a data transfer protocol for transferring phone data related to the mobile phone, and causing the phone data to be transferred from the mobile phone;
   depending on a status of a different data transfer process than the first data transfer process, perform transfer control related to transfer by at least one of the first data transfer process and the different data transfer process;
   make a second connection and a third connection with the mobile phone or a different communication device, and perform a second data transfer process based on the second connection and a third data transfer process based on the third connection as the different data transfer process; and
   in a case where the third data transfer process is being performed when the second data transfer process is to be started, perform one of transfer control for lowering a transfer speed in the second data transfer process and transfer control for stopping a transfer process of the second data transfer process.

8. The hands-free apparatus according to claim 7, wherein the hardware processor is configured to: when the third data transfer process is ended, perform one of transfer control for increasing the transfer speed in the second data transfer process and transfer control for starting the second data transfer process.

9. A hands-free apparatus, comprising:
a memory; and
a hardware processor coupled to the memory, the hardware processor being configured to:
   perform a hands-free connection process of connecting to a mobile phone by using a hands-free communication protocol for performing a hands-free phone conversation;
   perform a first data transfer process after making a first connection with the mobile phone by using a data transfer protocol for transferring phone data related to the mobile phone, and causing the phone data to be transferred from the mobile phone;
   depending on a status of a different data transfer process than the first data transfer process, perform transfer control related to transfer by at least one of the first data transfer process and the different data transfer process;
   make a second connection and a third connection with the mobile phone or a different communication device, and perform a second data transfer process based on the second connection and a third data transfer process based on the third connection as the different data transfer process; and
   in a case where the second data transfer process is being performed when the third data transfer process is to be started, perform one of transfer control for lowering a transfer speed in the second data transfer process and transfer control for stopping a transfer process of the second data transfer process.

10. The hands-free apparatus according to claim 9, wherein the hardware processor is configured to: when the third data transfer process is ended, perform one of transfer control for increasing the transfer speed in the second data transfer process and transfer control for starting the second data transfer process.

11. A data transfer method performed by a computer, the data transfer method comprising:
   performing a hands-free connection process of connecting to a mobile phone by using a hands-free communication protocol for performing a hands-free phone conversation;
   performing a first data transfer process after making a first connection with the mobile phone by using a data transfer protocol for transferring phone data related to the mobile phone, and causing the phone data to be transferred from the mobile phone;
   depending on a status of a different data transfer process than the first data transfer process, performing transfer control related to transfer by at least one of the first data transfer process and the different data transfer process;
making a second connection with the mobile phone or a different communication device, and performing a second data transfer process based on the second connection as the different data transfer process;
in a case where the first data transfer process is being performed when the second data transfer process is to be started, performing one of transfer control for lowering a transfer speed in the first data transfer process and transfer control for stopping the first data transfer process;
when performing the transfer control for stopping the first data transfer process that is being performed, causing the transferred phone data to be discarded; and
when performing transfer control for starting the first data transfer process after the second data transfer process is ended, causing the phone data to be transferred from a beginning.

12. A non-transitory computer-readable medium on which an executable program is recorded, the program instructing a computer to carry out:
performing a hands-free connection process of connecting to a mobile phone by using a hands-free communication protocol for performing a hands-free phone conversation;
performing a first data transfer process after making a first connection with the mobile phone by using a data transfer protocol for transferring phone data related to the mobile phone, and causing the phone data to be transferred from the mobile phone;
depending on a status of a different data transfer process than the first data transfer process, performing transfer control related to transfer by at least one of the first data transfer process and the different data transfer process;
making a second connection with the mobile phone or a different communication device, and performing a second data transfer process based on the second connection as the different data transfer process;
in a case where the first data transfer process is being performed when the second data transfer process is to be started, performing one of transfer control for lowering a transfer speed in the first data transfer process and transfer control for stopping the first data transfer process;
when performing the transfer control for stopping the first data transfer process that is being performed, causing the transferred phone data to be discarded; and
when performing transfer control for starting the first data transfer process after the second data transfer process is ended, causing the phone data to be transferred from a beginning.

13. A data transfer method performed by a computer, the data transfer method comprising:
performing a hands-free connection process of connecting to a mobile phone by using a hands-free communication protocol for performing a hands-free phone conversation;
performing a first data transfer process after making a first connection with the mobile phone by using a data transfer protocol for transferring phone data related to the mobile phone, and causing the phone data to be transferred from the mobile phone;
depending on a status of a different data transfer process than the first data transfer process, performing transfer control related to transfer by at least one of the first data transfer process and the different data transfer process;
making a second connection with the mobile phone or a different communication device, and performing a second data transfer process based on the second connection as the different data transfer process;
in a case where the first data transfer process is being performed when the second data transfer process is to be started, performing one of transfer control for lowering a transfer speed in the first data transfer process and transfer control for stopping the first data transfer process;
when performing the transfer control for stopping the first data transfer process that is being performed, causing the transferred phone data to be held; and
when performing transfer control for starting the first data transfer process after the second data transfer process is ended, cause remaining phone data, which has not been transferred, to be transferred.

14. A data transfer method performed by a computer, the data transfer method comprising:
performing a hands-free connection process of connecting to a mobile phone by using a hands-free communication protocol for performing a hands-free phone conversation;
performing a first data transfer process after making a first connection with the mobile phone by using a data transfer protocol for transferring phone data related to the mobile phone, and causing the phone data to be transferred from the mobile phone;
depending on a status of a different data transfer process than the first data transfer process, performing transfer control related to transfer by at least one of the first data transfer process and the different data transfer process;
making a second connection and a third connection with the mobile phone or a different communication device, and performing a second data transfer process based on the second connection and a third data transfer process based on the third connection as the different data transfer process; and
in a case where the third data transfer process is being performed when the second data transfer process is to be started, performing one of transfer control for lowering a transfer speed in the second data transfer process and transfer control for stopping a transfer process of the second data transfer process.

15. A data transfer method performed by a computer, the data transfer method comprising:
performing a hands-free connection process of connecting to a mobile phone by using a hands-free communication protocol for performing a hands-free phone conversation;
performing a first data transfer process after making a first connection with the mobile phone by using a data transfer protocol for transferring phone data related to the mobile phone, and causing the phone data to be transferred from the mobile phone;
depending on a status of a different data transfer process than the first data transfer process, performing transfer control related to transfer by at least one of the first data transfer process and the different data transfer process;
making a second connection and a third connection with the mobile phone or a different communication device, and performing a second data transfer process based on the second connection and a third data transfer process based on the third connection as the different data transfer process; and
in a case where the second data transfer process is being performed when the third data transfer process is to be started, performing one of transfer control for lowering a transfer speed in the second data transfer process and transfer control for stopping a transfer process of the second data transfer process.

* * * * *